(12) United States Patent
Kato

(10) Patent No.: US 9,387,859 B2
(45) Date of Patent: Jul. 12, 2016

(54) SLIP RATIO ESTIMATION DEVICE AND SLIP RATIO ESTIMATION METHOD

(71) Applicant: PIONEER CORPORATION, Kanagawa (JP)

(72) Inventor: Masahiro Kato, Kanagawa (JP)

(73) Assignee: PIONEER CORPORATION, Kanagawa (JP)

( * ) Notice: Subject to any disclaimer, the term of this patent is extended or adjusted under 35 U.S.C. 154(b) by 0 days.

(21) Appl. No.: 14/429,163

(22) PCT Filed: Sep. 20, 2012

(86) PCT No.: PCT/JP2012/074022
§ 371 (c)(1),
(2) Date: Mar. 18, 2015

(87) PCT Pub. No.: WO2014/045365
PCT Pub. Date: Mar. 27, 2014

(65) Prior Publication Data
US 2015/0251658 A1  Sep. 10, 2015

(51) Int. Cl.
*B60W 40/06* (2012.01)
*B60L 3/10* (2006.01)
(Continued)

(52) U.S. Cl.
CPC .............. *B60W 40/064* (2013.01); *B60L 3/102* (2013.01); *B60L 15/38* (2013.01); *B60W 40/068* (2013.01);
(Continued)

(58) Field of Classification Search
CPC ........... B60L 3/10; B60L 3/102; B60L 3/104; B60T 2210/12; B60W 40/064; B60W 40/068; B60W 2550/148
See application file for complete search history.

(56) References Cited

U.S. PATENT DOCUMENTS 4,999,778 A * 3/1991 Ruhl ...................... B60K 28/16
180/197
5,376,868 A * 12/1994 Toyoda .................... B60L 3/00
318/52

(Continued)

FOREIGN PATENT DOCUMENTS

DE 102008003206 A1 * 7/2009 ............ B60W 40/13
JP 11334555 A * 12/1999
(Continued)

OTHER PUBLICATIONS

Fujii, Kiyoshi et al., "Traction Control Based on Slip Ratio Estimation without Detecting Vehicle Speed for Electric Vehicle", IEEE Power Conversion Conference—Nagoya, 2007. PCC '07, Apr. 2-5, 2007, pp. 688-693.*

(Continued)

*Primary Examiner* — Behrang Badii
*Assistant Examiner* — David Testardi
(74) *Attorney, Agent, or Firm* — Young & Thompson

(57) ABSTRACT

An acquisition part acquires the rotational speeds of a plurality of driving wheels of a moving vehicle, and normal reaction forces acting on the plurality of driving wheels. Subsequently, a friction coefficient information calculation part calculates friction coefficients relating to the plurality of driving wheels on the basis of torque command values for the plurality of driving wheels transmitted from a torque control part and the results of acquisition by the acquisition part. A slip ratio calculation part calculates the slip ratios of the plurality of driving wheels on the basis of the calculated friction coefficients, and the rotational speeds acquired by the acquisition part. Consequently, the slip ratios of the respective driving wheels are easily, rapidly, and accurately estimated.

12 Claims, 20 Drawing Sheets

(51) Int. Cl.
  *B60W 40/064* (2012.01)
  *B60W 40/068* (2012.01)
  *B60L 15/38* (2006.01)

(52) U.S. Cl.
  CPC ......... *B60T 2210/12* (2013.01); *B60W 2520/28* (2013.01); *B60W 2520/30* (2013.01); *B60W 2720/403* (2013.01); *B60W 2720/406* (2013.01)

(56) References Cited

U.S. PATENT DOCUMENTS

| | | | | |
|---|---|---|---|---|
| 5,419,624 | A * | 5/1995 | Adler | B60K 28/16 180/197 |
| 6,015,192 | A * | 1/2000 | Fukumura | B60T 8/172 303/140 |
| 6,122,585 | A * | 9/2000 | Ono | B60T 8/172 180/197 |
| 6,264,292 | B1 * | 7/2001 | Umeno | B60T 8/172 303/163 |
| 6,418,369 | B2 * | 7/2002 | Matsumoto | B60T 8/172 180/197 |
| 7,440,834 | B2 * | 10/2008 | Yamaguchi | B60K 17/356 180/233 |
| 8,170,768 | B2 * | 5/2012 | Fujimoto | B60L 3/10 701/90 |
| 8,498,775 | B2 * | 7/2013 | Yngve | B60W 40/064 701/32.9 |
| 2007/0016354 | A1 * | 1/2007 | Engel | B60T 8/172 701/80 |
| 2009/0210128 | A1 | 8/2009 | Fujimoto et al. | |
| 2013/0253755 | A1 * | 9/2013 | Xu | B60L 3/10 701/29.1 |
| 2013/0345917 | A1 * | 12/2013 | Ozaki | B60L 15/20 701/22 |

FOREIGN PATENT DOCUMENTS

| | | |
|---|---|---|
| JP | 2006-034012 | 2/2006 |
| JP | 2007-282406 | 10/2007 |
| JP | 2008-236914 | 10/2008 |
| JP | 2009-142108 | 6/2009 |
| JP | 2009142108 A * | 6/2009 |
| JP | 2009149201 A * | 7/2009 |
| JP | 2010-051160 | 3/2010 |
| JP | 2010-209990 | 9/2010 |
| JP | 4538642 | 9/2010 |
| JP | 2010-236883 | 10/2010 |
| WO | WO 2008/029524 | 3/2008 |

OTHER PUBLICATIONS

Fujii, Kiyoshi et al., "Slip ratio estimation and control without detection of vehicle speed for electric vehicle", Proc. IEE of Japan, Technical Meeting Record, IIC-06-01, pp. 1-6 (2006) (in Japanese).*
International Search Report, PCT/JP2012/074022, Nov. 6, 2012.

* cited by examiner

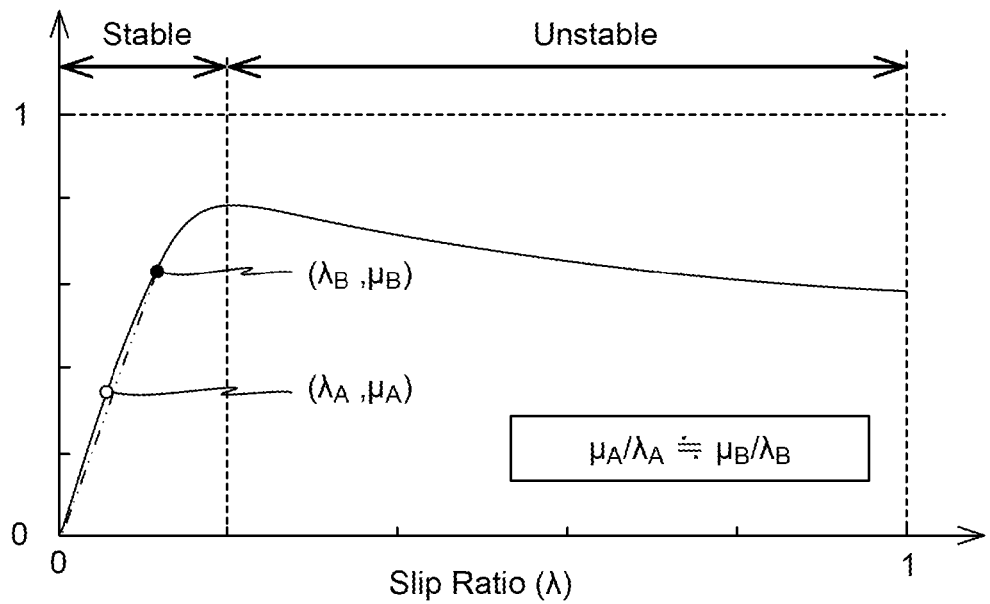
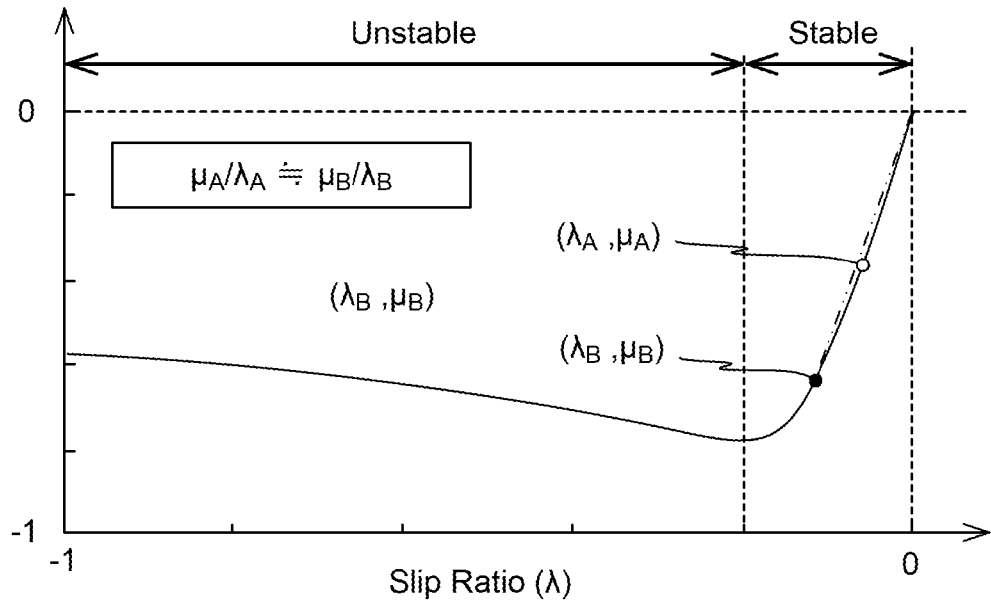

Fig. 8
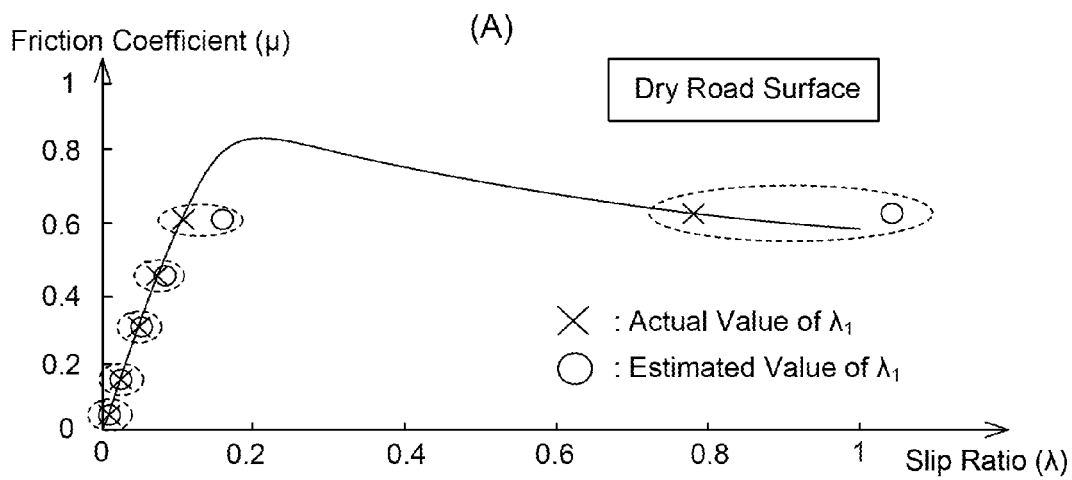
(A) Dry Road Surface
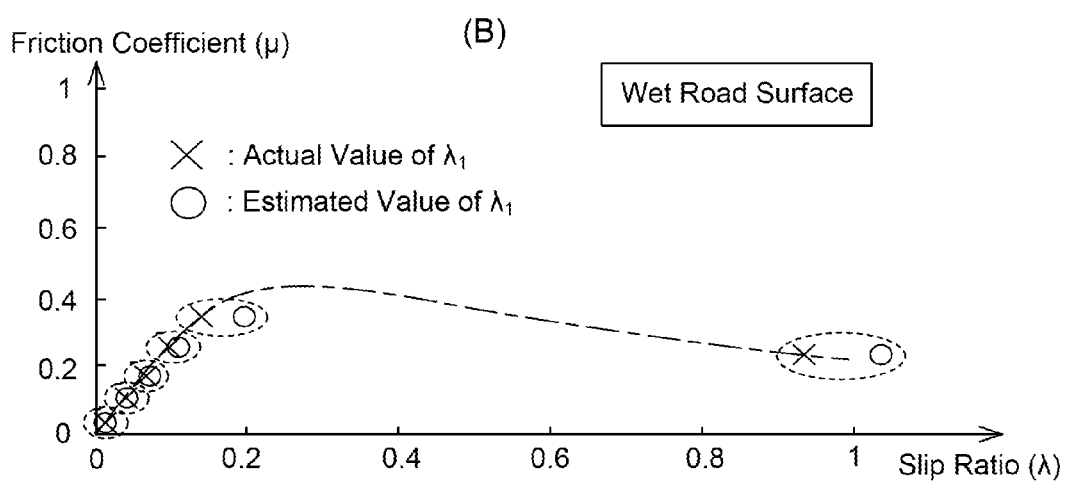
(B) Wet Road Surface
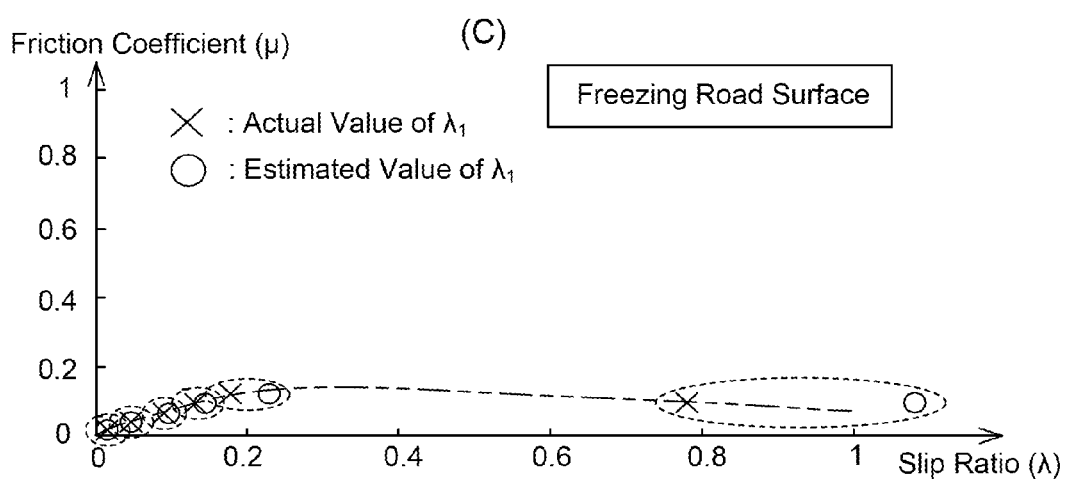
(C) Freezing Road Surface BC = H·tan θ
AE = AC·cos θ = (AB + BC)·cos θ = (L_F + BC)·cos θ
DF = CD·cos θ = (BD - BC)·cos θ = (L_R - BC)·cos θ

SLIP RATIO ESTIMATION DEVICE AND SLIP RATIO ESTIMATION METHOD

TECHNICAL FIELD

The present invention relates to a slip ratio estimation device, to a slip ratio estimation method, to a slip ratio estimation program, and to a recording medium on which such a slip ratio estimation program is recorded.

BACKGROUND ART

From the past, a traction control technique has been employed for preventing and eliminating the free spinning state of the tires of a moving vehicle that has a plurality of driving wheels, such as a four wheeled vehicle or the like. For implementing this kind of traction control, the slip ratios of the respective driving wheels are very important variables. Due to this, techniques of various types have been proposed for estimating these slip ratios.

For example, a technique in which the slip ratios are calculated on the basis of the time integrated values of motor torque and the rotational speeds of the driving wheels (refer to Patent Document #1, hereinafter termed "Prior Art Example #1") and a technique in which the speed of the vehicle body is obtained by time integrating the output of an acceleration sensor, and the slip ratios are calculated by employing the rotational speeds of the driving wheels (refer to Patent Document #2, hereinafter termed "Prior Art Example #2") have been proposed.

Furthermore, a technique in which the vehicle body speed is obtained from the rotational speed of a vehicle wheel that is not being driven, and the slip ratios are calculated by employing the rotational speeds of the driving wheels (refer to Patent Document #3, hereinafter termed "Prior Art Example #3") and a technique in which the drive characteristics of the driving wheels are modeled, the speeds of the ground contact surfaces of the driving wheels are calculated, and the slip ratios are calculated from the results of the above calculations and from the rotational speeds of the driving wheels (refer to Patent Document #4, hereinafter termed "Prior Art Example #4") have also been proposed.

PRIOR ART DOCUMENT

Patent Documents

Patent Document #1: Japanese Laid-Open Patent Publication 2006-034012
Patent Document #2: Japanese Laid-Open Patent Publication 2007-282406
Patent Document #3: Japanese Laid-Open Patent Publication 2008-236914
Patent Document #4: Japanese Laid-Open Patent Publication 2010-236883

SUMMARY OF THE INVENTION

Problems to be Solved by the Invention

With the techniques of Prior Art Examples #1 and #2 described above, in some cases it is not possible to estimate the slip ratios with good accuracy, since the offset values at each time point accumulate as errors due to the process of obtaining the time integrated values. Moreover, with the techniques of Prior Art Examples #1 and #2 described above, the slip ratios cannot be estimated very rapidly, since it is not possible to calculate the slip ratios if the integration interval has not yet elapsed.

And while, with the technique of Prior Art Example #3 described above, it is necessary to provide at least one non-driving wheel, it is impracticable to install a fifth wheel in the case of a four wheel drive four wheeled vehicle. Moreover while, with the technique of Prior Art Example #4 described above, it is necessary to model the drive characteristics of the tires, modeling technique has not yet advanced to the level of being able to calculate the slip ratios with good accuracy, so that, in the present state of progress, it is not necessarily possible to estimate the slip ratios under different traveling conditions (type of the vehicle, positions of the people riding in the vehicle, and so on) for each of the many possible types of vehicle with good accuracy.

The present invention has been conceived in consideration of the circumstances described above, and its object is to provide a slip ratio estimation device and a slip ratio estimation method that are capable of estimating a slip ratio for each driving wheel easily and rapidly and moreover with good accuracy.

Means for Solving the Problems

When considered from a first aspect, the present invention is a slip ratio estimation device that estimates a slip ratio of each of a plurality of driving wheels possessed by a moving vehicle, comprising: a rotational speed acquisition part acquiring rotational speed of each of said plurality of driving wheels; a normal reaction force information acquisition part acquiring an information of normal reaction force upon each of said plurality of driving wheels; a friction coefficient information calculation part configured to calculate friction coefficient information related to each of said plurality of driving wheels, on the basis of a torque instruction value for each of said plurality of driving wheels, the results of acquisition by said rotational speed acquisition part, and the results of acquisition by said normal reaction force information acquisition part; and a slip ratio calculation part configured to calculate the slip ratio of each of said plurality of driving wheels, on the basis of the rotational speeds acquired by said rotational speed acquisition part and the results of calculation by said friction coefficient information calculation part.

Furthermore, when considered from a second aspect, the present invention is a slip ratio estimation method for estimating a slip ratio of each of a plurality of driving wheels possessed by a moving vehicle, comprising the steps of: a rotational speed acquisition step of acquiring the rotational speed of each of said plurality of driving wheels; a normal reaction force information acquisition step of acquiring information corresponding to the normal reaction force upon each of said plurality of driving wheels; a friction coefficient information calculation step of calculating friction coefficient information related to each of said plurality of driving wheels, on the basis of a torque instruction value for each of said plurality of driving wheels, the results of acquisition by said rotational speed acquisition process, and the results of acquisition by said normal reaction force information acquisition process; and a slip ratio calculation step of calculating the slip ratio of each of said plurality of driving wheels, on the basis of the rotational speeds acquired by said rotational speed acquisition process and the results of calculation by said friction coefficient information calculation process.

Moreover, when considered from a third aspect, the present invention is a slip ratio estimation program, wherein it causes a calculation part to execute the slip ratio estimation method of the present invention.

And, when considered from a fourth aspect, the present invention is a recording medium, wherein the slip ratio estimation program of the present invention is recorded thereupon in a form that can be read by a calculation part.

BRIEF DESCRIPTION OF THE DRAWINGS

FIG. 4 is a figure for explanation of the ratio between friction coefficient and slip ratio in a stable region during driving;

FIG. 5 is a figure for explanation of the ratio between friction coefficient and slip ratio in a stable region during braking;

FIG. 8 is a figure for explanation of the difference between an actual value of and an estimated value of $\lambda_1$;

EMBODIMENTS FOR CARRYING OUT THE INVENTION

In the following, an embodiment of the present invention will be explained with reference to FIG. 1 through FIG. 14. Note that, in the following explanation and drawings, the same reference symbols will be appended to elements that are the same or equivalent, and duplicated explanation will be omitted.

[Theory of the Method of Estimating the Slip Ratios]

First, the theory of the method employed in the embodiment for estimating the slip ratios will be explained.

Figure 1:
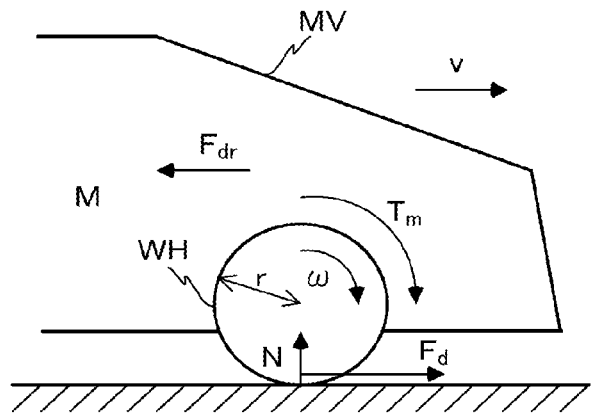
FIG. 1 is a figure showing variables in a driving wheel model.

The variables in a driving wheel model of a driving wheel WH that is comprised in a moving vehicle MV are shown in FIG. 1. In FIG. 1, "M" is the apportioned mass borne by the driving wheel WH, "$F_d$" is the drive force of the driving wheel WH, and "$F_{dr}$" is the apportioned traveling resistance acting upon the driving wheel WH. Moreover, "$T_m$" is the torque upon the driving wheel WH, "v" is the speed of the moving vehicle MV (in other words, the translational speed of the driving wheel WH), and "ω" is the rotational speed of the driving wheel WH. Yet further, "N" is the normal reaction force acting upon the driving wheel WH, while "r" is the radius of the driving wheel WH.

In the driving wheel model shown in FIG. 1, the equation of motion of the moving vehicle MV is given by the following Equation (1):

$$M \cdot (dv/dt) = F_d - F_{dr} \quad (1)$$

Moreover, if the moment of inertia of the driving wheel WH is termed "$J_W$", then the equation of motion of the driving wheel WH is given by the following Equation (2):

$$J_W (d\omega/dt) = T_m - r \cdot F_d \quad (2)$$

And, if the coefficient of friction between the driving wheel WH and the road surface is termed "μ", then the relationship between the drive force $F_d$ and the normal reaction force N is given by the following Equation (3):

$$\mu = F_d / N \quad (3)$$

Here, by providing a load sensor that detects the load imposed upon the driving wheel WH, for example, the normal reaction force N may be acquired rapidly and moreover with good accuracy. Furthermore, the drive force $F_d$ can be acquired rapidly and with good accuracy by a known drive force observer on the basis of the torque $T_m$ and the rotational speed ω. Due to this, in the case of an electric automobile in which case it is possible to generate a torque $T_m$ that is faithful to the torque instruction value, it is possible to calculate the friction coefficient t rapidly and with good accuracy by, for example, in addition to the load sensor described above, providing a rotational speed sensor that detects the rotational speed of the driving wheel WH.

Note that a drive force observer is described in, for example, Japanese Laid-Open Patent Publication 2010-051160 or the like.

Now, in the driving wheel model described above, the slip ratio λ that is the subject of estimation by the invention of the present application is given by the following Equation (4):

$$\lambda = (r \cdot \omega - v) / \text{Max}(r \cdot \omega, v) \quad (4)$$

Note that Max(r·ω,v) means that one of (r·ω) and v that has the larger numerical value. During driving, since (r·ω) is greater than v, accordingly Max(r·ω,v)=r·ω. On the other hand, during braking, since v is greater than (r·ω), accordingly Max(r·ω,v)=v.

Figure 2:
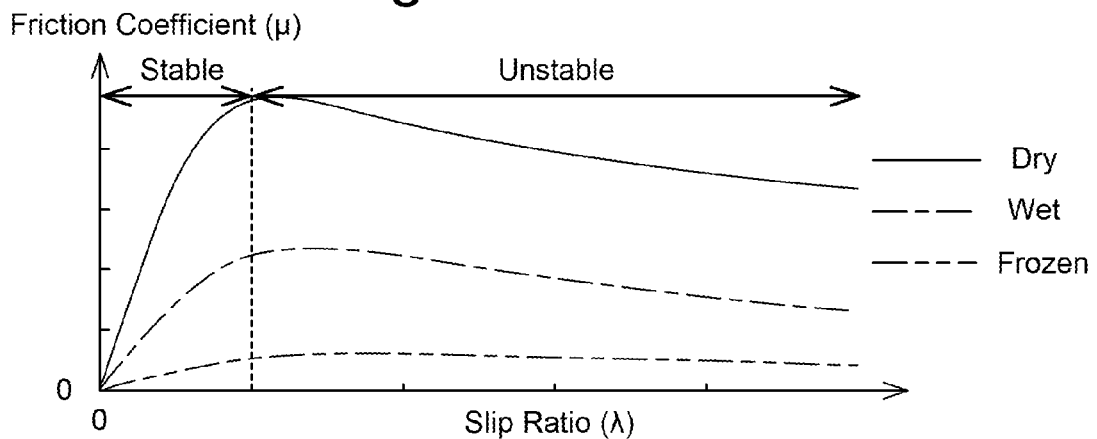
FIG. 2 is a figure showing a relationship between slip ratio and friction coefficient during driving.
Figure 3:
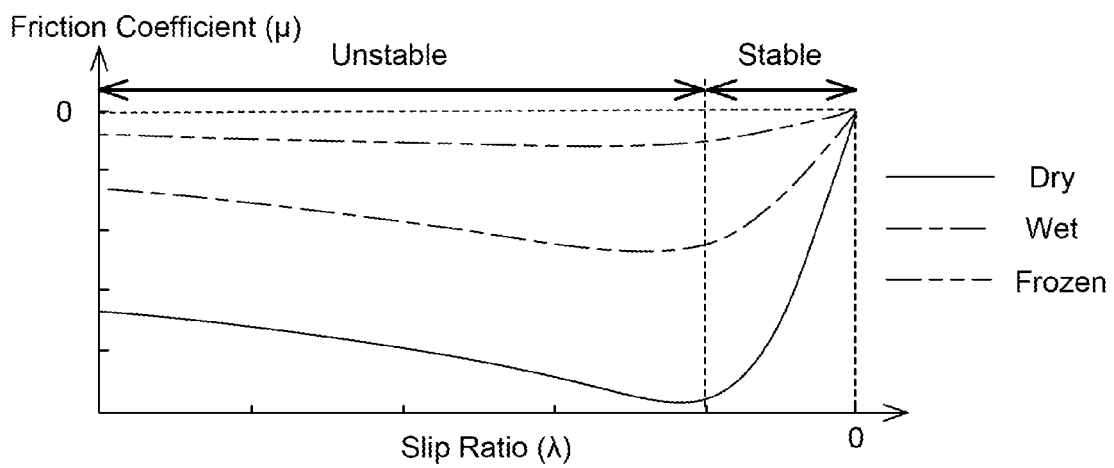
FIG. 3 is a figure showing a relationship between slip ratio and friction coefficient during braking.

In the driving wheel model described above, generally, the friction coefficient μ (for which, as has been explained, there is a possibility that it can be calculated rapidly and with good accuracy) and the slip ratio λ have a relationship as shown in FIG. 2 during driving, and they have the relationship as shown in FIG. 3 during vehicle braking. Note that, in the change of the friction coefficient t along with increase of the slip ratio during driving shown in FIG. 2, states in which the slip ratio is less than or equal to its value at which the friction coefficient μ becomes maximum are states in which the moving vehicle MV can travel in a stable manner (hereinafter termed "stable states"). On the other hand, states in which the slip ratio is greater than its value at which the friction coefficient t becomes maximum are states in which the phenomena of free spinning or of locking of the driving wheel WH occur (hereinafter termed "unstable states"). In the following, the region in which the state is stable will be termed the "stable region", while the region in which the state is unstable will be termed the "unstable region".

Moreover, in the change of the friction coefficient t along with increase of the slip ratio during braking shown in FIG. 3, states in which the slip ratio is greater than or equal to its value at which the friction coefficient μ becomes minimum are stable states. On the other hand, states in which the slip ratio is less than its value at which the friction coefficient μ becomes minimum are unstable states.

Now since, as shown in both FIG. 2 and FIG. 3, the relationship between the friction coefficient μ and the slip ratio λ changes according to the state of the road surface, accordingly the slip ratio λ is not uniquely determined according to the friction coefficient μ. However, in the stable regions, if the state of the road surface is the same, as in the examples for a dry road surface shown in FIG. 4 and FIG. 5, and if the difference between one slip ratio $\lambda_A$ and another slip ratio $\lambda_B$ is small, then the relationship between the slip ratio and the friction coefficient μ given by the following Equation (5) approximately holds:

$$\mu_A/\lambda_A = \mu_B/\lambda_B \quad (5)$$

Here, the value $\mu_A$ is the friction coefficient corresponding to the slip ratio $\lambda_A$, and the value $\mu_B$ is the friction coefficient corresponding to the slip ratio $\lambda_B$.

Note that the relationship of Equation (5) also holds for the stable regions in the case of a wet road surface and in the case of a freezing road surface, as will be apparent from the characteristics of a wet road surface and of a freezing road surface shown in FIG. 2 and FIG. 3, although these cases are not particularly shown in the figures.

Figure 6:
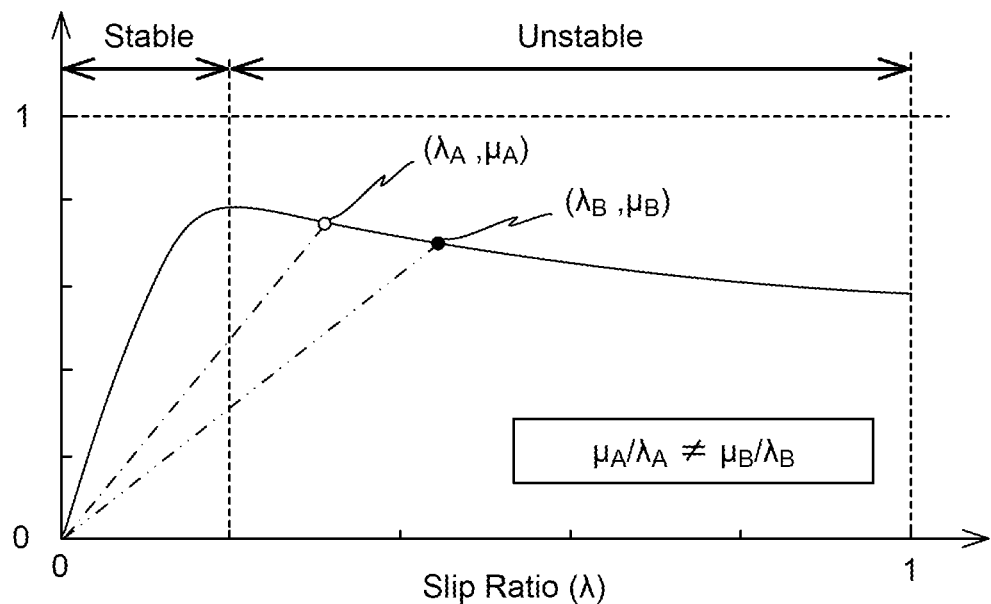
FIG. 6 is a figure for explanation of the ratio between friction coefficient and slip ratio in an unstable region during driving.
Figure 7:
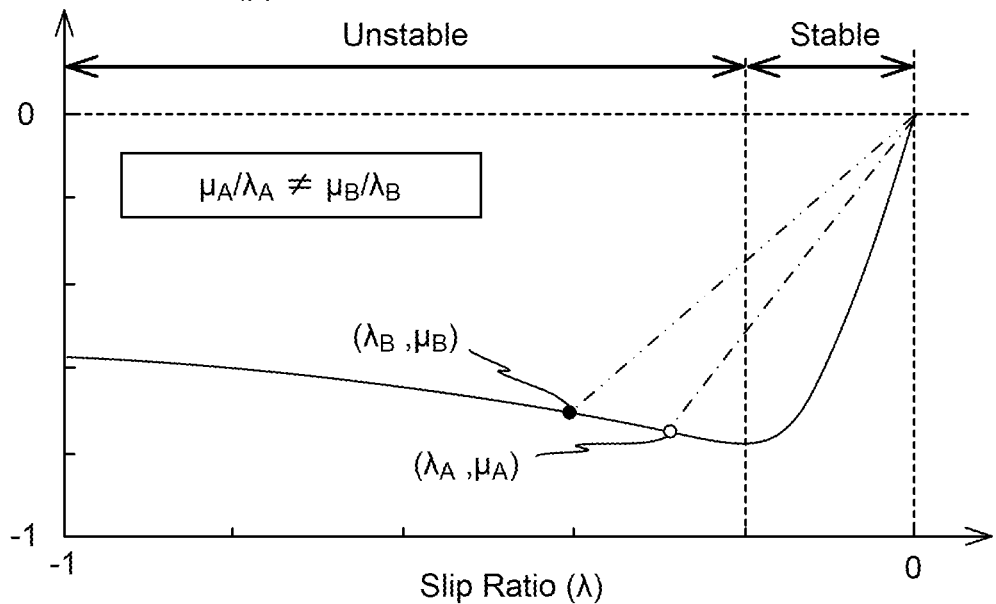
FIG. 7 is a figure for explanation of the ratio between friction coefficient and slip ratio in an unstable region during braking.

Moreover in the unstable regions, if the state of the road surface is the same, as in the examples for a dry road surface shown in FIG. 6 and FIG. 7, even if the difference between one slip ratio $\lambda_A$ and another slip ratio $\lambda_B$ is small, then the relationship between the slip ratio λ and the friction coefficient μ given by Equation (5) described above does not hold. And, as will be understood from the characteristics of a wet road surface and of a freezing road surface shown in FIG. 2 and FIG. 3, it will be apparent that the relationship of Equation (5) does not hold for the unstable regions in the case of a wet road surface and in the case of a freezing road surface either.

With the slip ratio estimation method employed in the embodiment, in the case of a moving vehicle for which it is possible to control a plurality of driving wheels independently, as for example a wheel motor type electric automobile, it may be supposed that at least two different torque instruction values are supplied to the motors. Next, estimated values for the friction coefficients are calculated according to Equation (3) above from the torque instruction values for the motors and from the respective wheel rotational speeds. And the slip ratios are calculated from the friction coefficients that have thus been estimated, and from the values of the rotational speeds of the motors.

In the following, the theory of slip ratio estimation during driving and during braking will be explained. Note that it will be supposed that, among two driving wheels $WH_1$ and $WH_2$, a torque instruction value $T_{m1}$ is specified for the motor that drives the first driving wheel, while a torque instruction value $T_{m2}$ is specified for the motor that drives the second driving wheel. And it will be supposed that, for the first driving wheel, the rotational speed is "$\omega_1$" and the friction coefficient is "$\mu_1$". Moreover it will be supposed that, for the second driving wheel, the rotational speed is "$\omega_2$" and the friction coefficient is "$\mu_2$".

<<Theory of the Method of Estimation During Driving>>

Since during driving the value ($r \cdot \omega_1$) is greater than or equal to the speed v, accordingly the slip ratio $\lambda_1$ of the driving wheel $WH_1$ is given by the following Equation (6):

$$\lambda_1 = (r \cdot \omega_1 - v)/r \cdot \omega_1 \quad (6)$$

Moreover, since during driving the value ($r \cdot \omega_2$) is greater than or equal to the speed v, accordingly the slip ratio $\lambda_2$ of the driving wheel $WH_2$ is given by the following Equation (7):

$$\lambda_2 = (r \cdot \omega - v)/r \cdot \omega_2 \quad 7)$$

Now, since the speed v is the same in Equations (6) and (7), accordingly the relationship given by Equation (8) holds:

$$v = (1-\lambda_1) \cdot r \cdot \omega_1 = (1-\lambda_2) \cdot r \cdot \beta_2 \quad (8)$$

Due to this, according to the relationship given by Equation (5) described above and the relationship given by Equation (8), the relationships given by the following Equations (9) and (10) hold for the slip ratios $\lambda_1$ and $\lambda_2$:

$$(1-\lambda_1) \cdot \omega_1 = (1-(\mu_2/\mu_1) \cdot \lambda_1) \cdot \omega_2 \quad (9)$$

$$(1-(\mu_1/\mu_2)\lambda_2) \cdot \omega_1 = (1-\lambda_2) \cdot \omega_2 \quad (10)$$

Accordingly, by transforming Equations (9) and (10), the slip ratios $\lambda_1$ and $\lambda_2$ can be calculated according to the following Equations (11) and (12):

$$\lambda_1 = (\omega_2 - \omega_1)/((\mu_2/\mu_1) \cdot \omega_2 - \omega_1) \quad (11)$$

$$\lambda_2 = (\omega_2 - \omega_1)/(\omega_2 - \mu_1/\mu_2) \cdot \omega_1) \quad (12)$$

<<Theory of the Method of Estimation During Braking>>

Since during braking the value ($r \cdot \omega_1$) is less than or equal to the speed v, accordingly the slip ratio $\lambda_1$ is given by the following Equation (13):

$$\lambda_1 = (r \cdot \omega_1 - v)/v \quad (13)$$

Moreover, since during braking the value ($r \cdot \omega_2$) is less than or equal to the speed v, accordingly the slip ratio $\lambda_2$ is given by the following Equation (14):

$$\lambda_2 = (r \cdot \omega_2 - v)/v \quad (14)$$

Now, since the speed v is the same in Equations (13) and (14), accordingly the relationship given by Equation (15) holds:

$$v = r \cdot \omega_1/(1+\lambda_1) = r \cdot \omega_2 \cdot (1+\lambda_2) \quad (15)$$

Due to this, according to the relationship given by Equation (5) described above and the relationship given by Equation (15), the relationships given by the following Equations (16) and (17) hold for the slip ratios $\lambda_1$ and $\lambda_2$:

$$\omega_1/(1+\lambda_1)=\omega_2/(1+(\mu_2/\mu_1)\cdot\lambda_1) \quad (16)$$

$$\omega_1/(1+(\mu_1/\mu_2)\cdot\lambda_2)=\omega_2/(1\lambda_2) \quad (17)$$

Accordingly, by transforming Equations (16) and (17), the slip ratios and $\lambda_2$ can be calculated according to the following Equations (18) and (19):

$$\lambda_1=(\omega_2-\omega_1)/((\mu_2/\mu_1)\cdot\omega_1-\omega_2) \quad (18)$$

$$\lambda_2=(\omega_2-\omega_1)/(\omega_1-(\mu_1/\mu_2)\cdot\omega_2) \quad (19)$$

Note that, in the embodiment, the slip ratios $\lambda_1$ and $\lambda_2$ are calculated by one of the following algorithms, according to the relationship between the rotational speed $\omega_1$ and the rotational speed $\omega_2$, and according to the relationship between the friction coefficient $\mu_1$ and the friction coefficient $\mu_2$:

(a) When $|\omega_1|<|\omega_2|$ and also $|\mu_1|<|\mu_2|$

In this case, the slip ratios $\lambda_1$ and $\lambda_2$ are calculated using Equations (11) and (12) described above, or using Equations (18) and (19) described above.

Here, if the two driving wheels $WH_1$ and $WH_2$ are in the relationship of being a front wheel and a rear wheel, then the slip ratios $\lambda_1$ and $\lambda_2$ are calculated for this front wheel and this rear wheel at the same road surface point. In this calculation of the slip ratios $\lambda_1$ and $\lambda_2$, the speed v is calculated according to Equation (8) or Equation (15) described above, and the time period is obtained for progressing over a distance equal to the wheel base. And the slip ratios $\lambda_1$ and $\lambda_2$ for the same road surface point are calculated on the basis of this time period that has been calculated.

(b) When $|\omega_1|\cong|\omega_2|$

Since in this case it is not possible to guarantee a sufficient number of valid digits for the value ($\omega_2-\omega_1$), accordingly it would not be possible to ensure the accuracy of the slip ratios $\lambda_1$ and $\lambda_2$ if they were calculated according to Equations (11) and (12) or according to Equations (18) and (19). Due to this, the slip ratios $\lambda_1$ and $\lambda_2$ are calculated in a similar manner to the case (a) described above, after having increased the difference between the torque $T_{m1}$ for the driving wheel $WH_1$ and the torque $T_{m2}$ for the driving wheel $WH_2$, and thereby bringing the value ($\omega_2-\omega_1$) to be greater than or equal to some predetermined value.

(c) When $|\omega_1|<<|\omega_2|$

According to Equation (4) described above, when the rotational speed to is small, the slip ratio $\lambda$ also becomes small, and conversely, when the rotational speed to is large, the slip ratio $\lambda$ also becomes large. Thus, when the difference between the rotational speed $\omega_1$ and the rotational speed $\omega_2$ is too great, since the difference in also becomes great as will be understood from FIG. 4 and FIG. 5, accordingly the difference in the values of $\mu/\lambda$ also becomes great. Since, as a result, the error of approximation due to Equation (5) described above becomes great, accordingly the errors of the calculated slip ratios $\lambda_1$ and $\lambda_2$ from their true values also become great. Thus, in the case of $|\omega_1|<<|\omega_2|$, the slip ratios $\lambda_1$ and $\lambda_2$ are calculated in a similar manner to the case (a) described above, after having brought the torque $T_{m1}$ and the torque $T_{m2}$ closer together with maintaining the value ($\omega_2-\omega_1$) to be greater than or equal to some predetermined value.

(d) When, although $|\omega_1|<|\omega_2|$, $|\mu_1|>|\mu_2|$ or $|\mu_1|\approx|\mu_2|$ In the case of the relationship "$\omega_1<\omega_2$", according to Equations (6) and (7) described above, or according to Equations (13) and (14) described above, "$|\lambda_1|<|\lambda_2|$" holds. And if, although $|\lambda_1|<|\lambda_2|$, still $|\mu_1|>|\mu_2|$ or $|\mu_1|\approx|\mu_2|$, then, as shown in FIG. 2 through FIG. 7 described above, it is decided that the absolute value of the slip ratio is in the unstable region away from the point at which the absolute value of the friction coefficient reaches its maximum value. Due to this, the slip ratios $\lambda_1$ and $\lambda_2$ are calculated after having reduced the absolute values of the torques $|T_{m1}|$ and $|T_{m2}|$, so that the slip ratios $\lambda_1$ and $\lambda_2$ are brought into the stable region.

Figure 9:
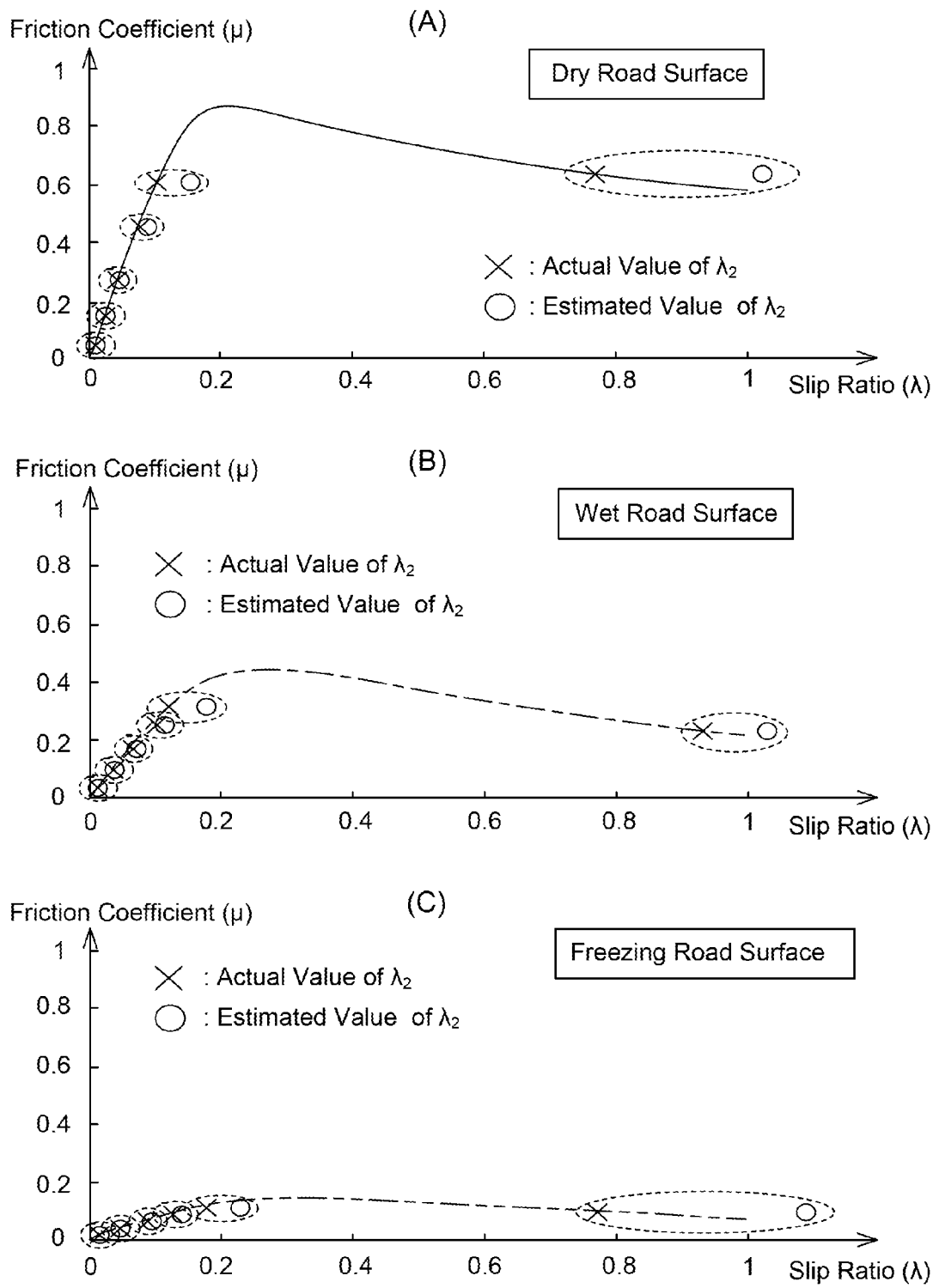
FIG. 9 is a figure for explanation of the difference between an actual value of $\lambda_2$ and an estimated value of $\lambda_2$.
Figure 10:
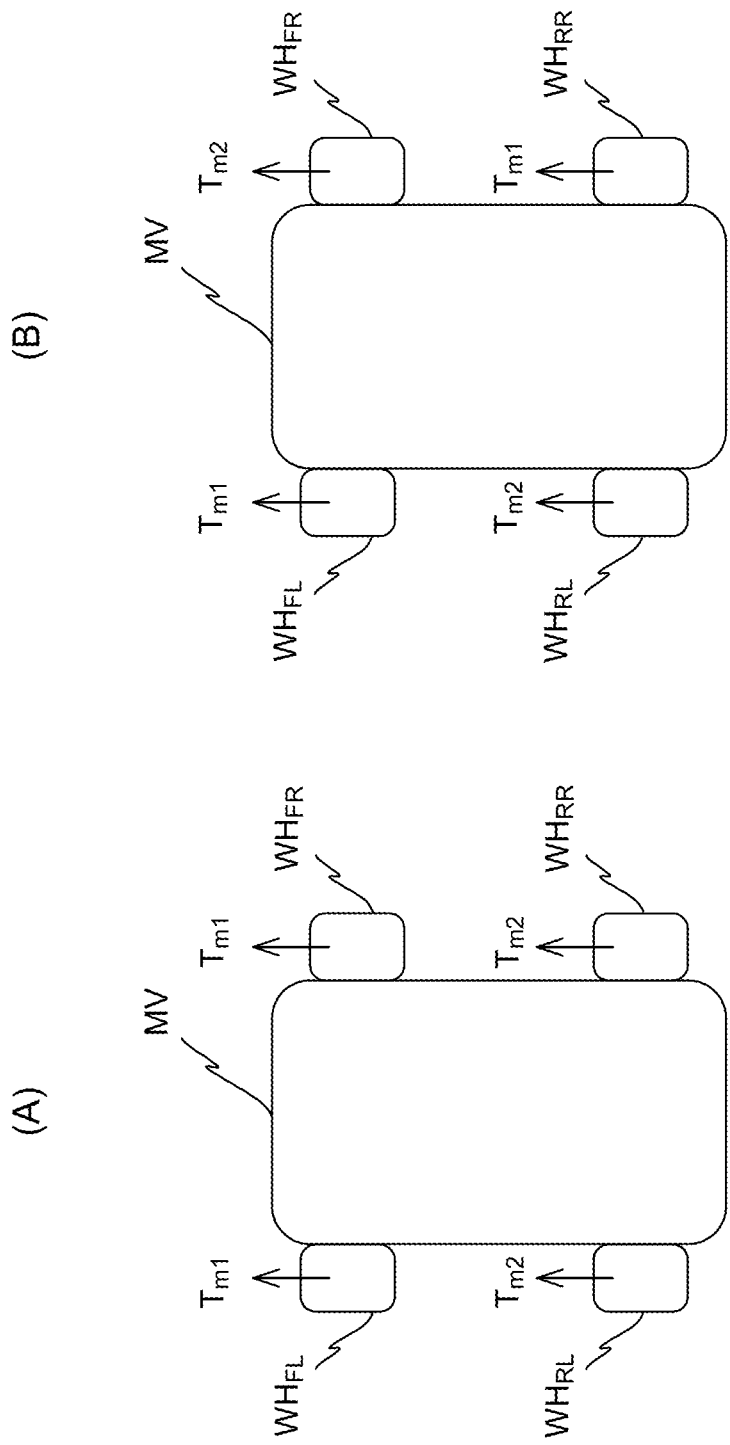
FIG. 10 is a figure for explanation of a torque distribution pattern employed in an embodiment of the present invention.

The results of comparison between the slip ratio values that have been estimated using the above algorithm (hereinafter these will also be termed the "estimated $\lambda$ values". Note that it will be supposed that the estimated slip ratio values for the driving wheels $WH_1$ and $WH_2$ will respectively be termed the "estimated $\lambda_1$ value" and the "estimated $\lambda_2$ value", etc.) and the actual $\lambda$ values are shown in FIG. 8 and FIG. 9. The results of comparison of the estimated values during driving and the actual $\lambda_1$ values (hereinafter also termed $\lambda_1'$) are shown in FIG. 8. Moreover, the results of comparison of the estimated $\lambda_2$ values during driving and the actual $\lambda_2$ values (hereinafter also termed $\lambda_2'$) are shown in FIG. 9.

As shown in FIG. 8 and FIG. 9, during driving, if the slip ratio $\lambda$ is in the range smaller than "0.1", then the actual value of and the estimated value of $\lambda$ are close together. On the other hand, as the slip ratio $\lambda$ becomes larger, the difference between the actual value of $\lambda$ and the estimated value of $\lambda$ becomes larger, since the error of approximation due to Equation (5) becomes greater. And, in this difference between the actual value of $\lambda$ and the estimated value of $\lambda$, the estimated value of $\lambda$ always becomes larger than the actual value of $\lambda$.

This fact will now be explained with reference to the following Equations (20) through (26).

First, instead of an approximate equation like Equation (5), the following Equation (20) is created by using a coefficient k that specifies the ratio between ($\mu_A/\lambda_A$) and ($\mu_n/\lambda_B$). Note that it will be supposed that "$\lambda_A<\lambda_B$".

$$(\mu_A/\lambda_A)=k\cdot(\mu_B/\lambda_B) \quad (20)$$

The actual $\lambda$ values $\lambda_1'$ and $\lambda_2'$ during driving obtained from the relationship specified by this Equation (20) instead of the relationship specified by Equation (5), and from the relationship specified by Equation (8), are given by the following Equations (21) and (22):

$$\lambda_1'=(\omega_2-\omega_1)/(k\cdot(\mu_2/\mu_1)\cdot\omega_2-\omega_1) \quad (21)$$

$$\lambda_2'=(\omega_2-\omega_1)/(\omega_2-(1/k)\cdot(\mu_1/\mu_2)\cdot\omega_1) \quad (22)$$

Now since, from FIG. 2, the closer the slip ratio $\lambda$ and the friction coefficient $\mu$ are to zero, the larger is the value ($\mu/\lambda$), accordingly the coefficient k must certainly have a value greater than "1". Accordingly, when Equations (21) and (22) and Equations (11) and (12) described above are compared together, during driving, it can be determined that the relationships of the following Equations (23) and (24) hold:

$$0<\lambda_1'<\lambda_1 \quad (23)$$

$$0<\lambda_2'<\lambda_2 \quad (24)$$

Accordingly, whatever may be the state of the road surface, the estimated value of $\lambda$ never becomes smaller than the actual value of $\lambda$. Note that a similar explanation can be formulated for the situation during braking, so that the following relationships (25) and (26) hold:

$$|\lambda_1'|<|\lambda_1| \quad (25)$$

$$|\lambda_2'|<|\lambda_2| \quad (26)$$

Due to the above, in the stable region, the absolute values of the slip ratios $\lambda_1$ and $\lambda_2$ as calculated according to Equations (11) and (12), or according to Equations (18) and (19), are certainly greater than the absolute values of the actual slip ratios. As a result, it never happens that, although the system is actually in the unstable region, it is mistakenly supposed to be in the stable region. And, if a control technique is employed that reduces the torque instruction values when it is detected that the system is close to the unstable region, then this procedure cannot be considered as causing any inconvenience, since it operates in the direction to avoid danger even further.

[Configuration]

Next, the configuration of the slip ratio estimation device according to the embodiment will be explained.

Note that, in the embodiment, the slip ratios $\lambda_1$ (where j=FL, FR, RL, and RR) are sometimes estimated by performing "parallel type" torque allocation in which, as shown in FIG. 10(A), along with the torque instruction values for the driving wheel $WH_{FL}$ and for the driving wheel $WH_{FR}$ both being set to a torque instruction value $T_{m1}$, the torque instruction values for the driving wheel $WH_{RL}$ and for the driving wheel $WH_{RR}$ are both set to a torque instruction value $T_{m2}$ (which is not equal to $Tm_1$). Moreover, the slip ratios are sometimes estimated by performing "crossed type" torque allocation in which, as shown in FIG. 10(B), along with the torque instruction values for the driving wheel $WH_{FL}$ and for the driving wheel $WH_{RR}$ both being set to a torque instruction value $T_{m1}$, the torque instruction values for the driving wheel $WH_{FR}$ and for the driving wheel $WH_{RL}$ are both set to a torque instruction value $T_{m2}$ (which is not equal to $Tm_1$).

Note that, in the embodiment, it is arranged for the estimation of the slip ratios $\lambda_j$ for the case of "parallel type" torque allocation and the estimation of the slip ratios $\lambda_j$ for the case of "crossed type" torque allocation to be performed alternatingly.

Figure 11:
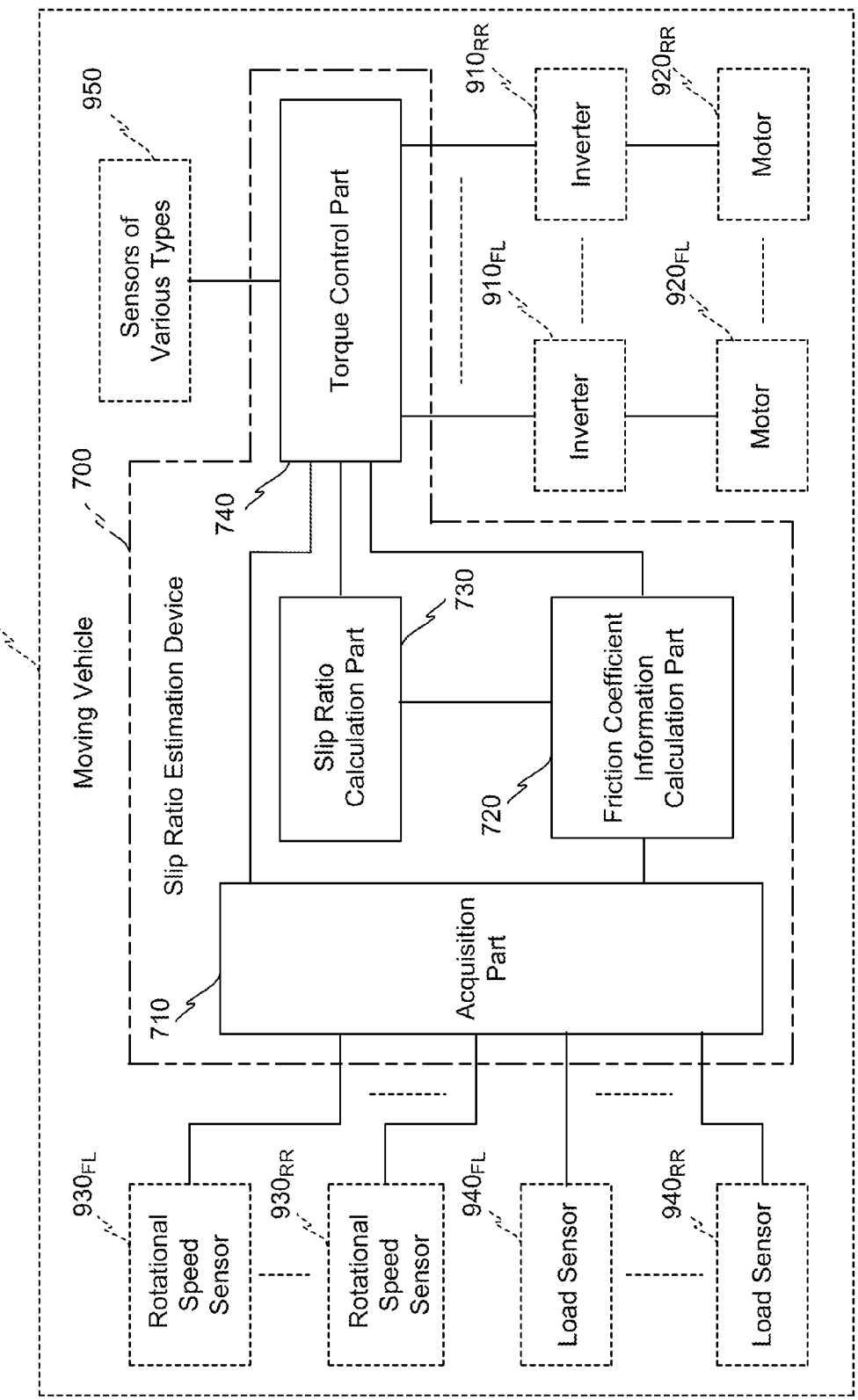
FIG. 11 is a block diagram schematically showing the configuration of a slip ratio estimation device according to the embodiment of the present invention.
Figure 12:
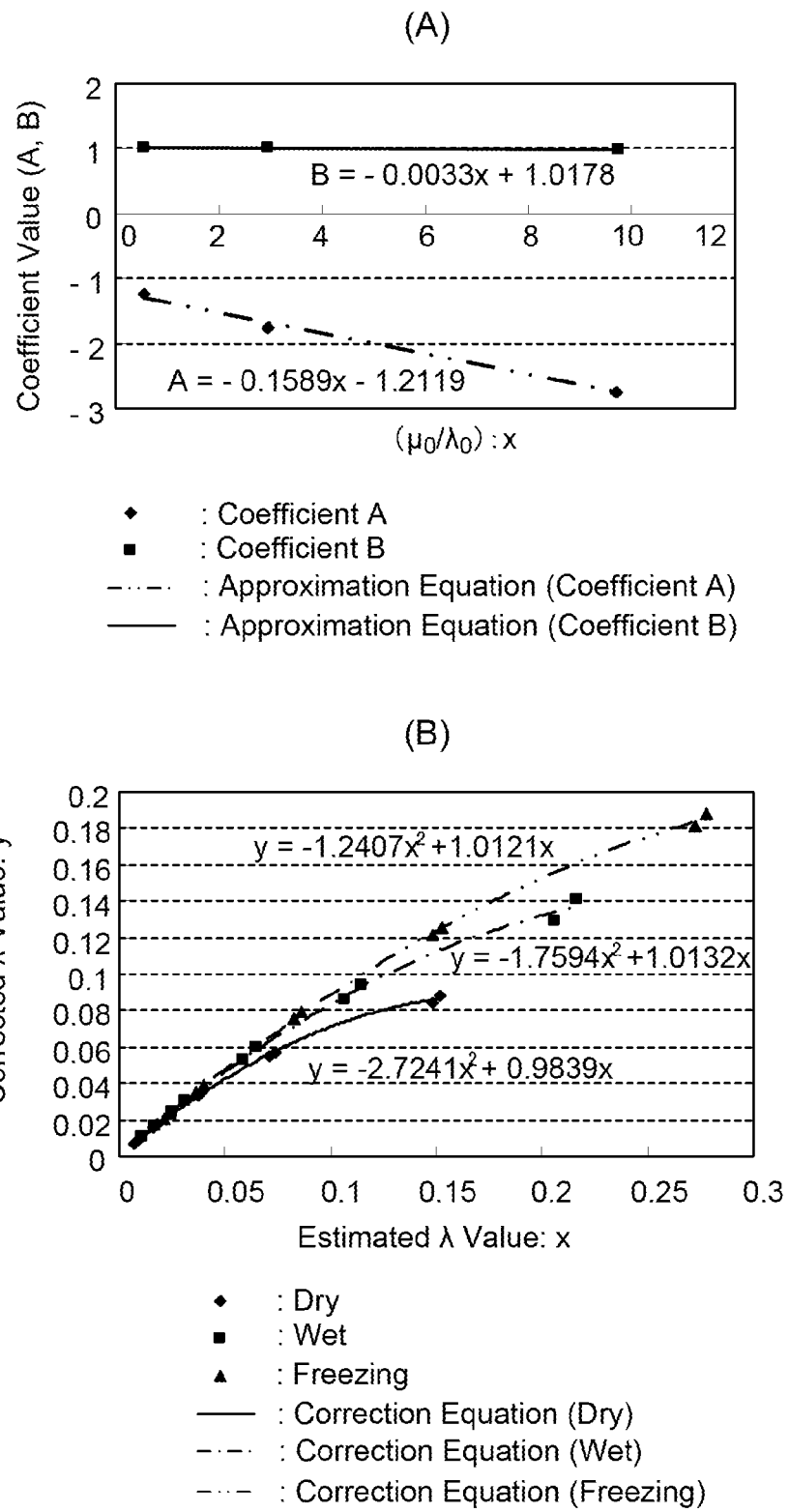
FIG. 12 is a figure for explanation of a correction equation for an estimated $\lambda$ value.

The configuration of a slip ratio estimation device 700 according to the embodiment of the present invention is schematically shown in FIG. 11. As shown in this FIG. 11, this slip ratio estimation device 700 is installed in a moving vehicle MV in which each of four driving wheels, i.e. a left side front driving wheel $WH_{FL}$, a right side front driving wheel $WH_{FR}$, a left side rear driving wheel $WH_{RL}$, and a right side rear driving wheel $WH_{RR}$, can be driven independently by a corresponding electric motor.

Inverters $910_j$ (where j=FL, FR, RL, and RR), motors $920_j$, rotational speed sensors $930_j$, load sensors $940_j$, and various sensors 950 are mounted to the moving vehicle MV. Here, the inverters $910_j$, the motors $920_j$, the rotational speed sensors $930_j$, and the load sensors $940_j$ are installed so as to correspond to the driving wheels $WH_j$.

Each of the inverters $910_j$ receives a torque creation signal sent from the slip ratio estimation device 700, corresponding to a respective torque instruction value. And each of the inverters $910_j$ generates a motor drive signal according to the above respective torque creation signal, and sends this motor drive signal that it has generated to its respective motor $920_j$.

Each of the motors $920_j$ receives the motor drive signal from its corresponding inverter. And each of the motors $920_j$ performs rotational motor motion on the basis of that motor drive signal, thus causing its driving wheel $WH_j$ to rotate. Note that, if the motor drive signal is negative, then regeneration is performed so as to reduce the rotation, and thereby the driving wheel $WH_j$ is caused to perform braking.

Each of the rotational speed sensors $930_j$ detects the rotational speed $\omega_j$ of its corresponding driving wheel $WH_j$. And each of the rotational speed sensors $930_j$ sends the rotational speed $\omega_j$ that it has detected to the slip ratio estimation device 700.

Each of the load sensors $940_j$ detects the load imposed upon its corresponding driving wheel, in other words the normal reaction force $N_j$ thereupon. And each of the load sensors $940_j$ sends this normal reaction force $N_j$ that it has detected to the slip ratio estimation device 700.

And the various sensors 950 include sensors that are employed for torque control, such as an accelerator opening amount sensor, an acceleration sensor, an angular velocity sensor, and so on. The results of detection by these various sensors 950 are sent to the slip ratio estimation device 700.

Next, the configuration of the slip ratio estimation device 700 will be explained. As shown in FIG. 11, the slip ratio estimation device 700 comprises an acquisition part 710 that serves as a rotational speed acquisition part and as a normal reaction force information acquisition part, a friction coefficient information calculation part 720, a slip ratio calculation part 730 that performs calculation of the slip ratios and correction of the slip ratios, and a torque control part 740.

The acquisition part 710 receives the rotational speeds $\theta_j$ sent from the rotational speed sensors $930_j$ and the normal reaction forces $N_j$ sent from the load sensors $940_j$. And the acquisition part 710 sends these rotational speeds $\omega_j$ and these normal reaction forces $N_j$ to the friction coefficient information calculation part 720. Moreover, the acquisition part 710 sends these rotational speeds $\omega_j$ to the torque control part 740.

The friction coefficient information calculation part 720 implements the function of the drive force observer described above. And this friction coefficient information calculation part 720 receives the rotational speeds $\omega_j$ and the normal reaction forces $N_j$ sent from the acquisition part 710. Moreover, the friction coefficient information calculation part 720 receives the torque instruction values $T_{mj}$ for the driving wheels $WH_j$ sent from the torque control part 740. And, when the friction coefficient information calculation part 720 receives a slip ratio estimation instruction sent from the torque control part 740 that includes a specification of the driving state or the braking state and that also includes a specification of which one of the driving wheels is to be the subject of slip ratio estimation, then, using Equation (3) described above, it calculates the friction coefficient of the road surface for the driving wheel that is to be the subject of estimation. The friction coefficient that has been calculated in this manner is sent to the slip ratio calculation part 730, along with the rotational speed at the time point of calculation.

Moreover, the friction coefficient information calculation part 720 makes a decision during slip ratio estimation as to whether or not the respective torque instruction value $T_{m1}$ or $T_{m2}$ is appropriate. If the result of this decision is negative, then the friction coefficient information calculation part 720 requests the torque control part 740 to change the torque instruction value $T_{m1}$ or $T_{m2}$.

The slip ratio calculation part 730 receives the friction coefficient and the rotational speed, the friction coefficient being sent from the friction coefficient information calculation part 720. And, upon receipt of the friction coefficient after having received a slip ratio estimation instruction sent from the torque control part 740, the slip ratio calculation part 730 calculates the slip ratio for the driving wheel that is the subject of estimation. The slip ratio that has been calculated in this manner is sent to the torque control part 740 as an estimated slip ratio.

Note that, during driving, the slip ratio calculation part 730 calculates the slip ratio by employing Equations (11) and (12) described above. Moreover, during braking, the slip ratio calculation part 730 calculates the slip ratio by employing Equations (18) and (19) described above.

The torque control part 740 receives the rotational speed $\omega_j$ sent from the acquisition part 710 and the results of detection sent from the various sensors 950. Moreover, the torque control part 740 receives the slip ratio sent from the slip ratio calculation part 730. And the torque control part 740 determines the torque instruction value $T_{m1}$ or $T_{m2}$ on the basis of the abovementioned rotational speed $\omega_j$, the abovementioned detection results, and the abovementioned slip ratio.

Next, the torque control part 740 generates a torque creation signal on the basis of the torque instruction value $T_{m1}$ or $T_{m2}$ that has thus been determined, and sends this generated torque creation signal to the inverter $910_j$. And the torque control part 740 sends a slip ratio estimation instruction in which a specification of the driving state or of the braking state and a specification of which driving wheel is to be the subject of slip ratio estimation are included to the friction coefficient information calculation part 720 and to the slip ratio calculation part 730.

Moreover, the torque control part 740 receives a request sent from the friction coefficient information calculation part 720 for change of the torque instruction value $T_{m1}$ or $T_{m2}$. And, upon receipt of this request, the torque control part 740 changes the torque instruction value $T_{mj}$, generates a torque creation signal on the basis of the torque instruction value $T_{m1}$ or $T_{m2}$ that has thus been changed, and sends this generated torque creation signal to the inverter $910_j$.

[Operation]

Next, the operation of the slip ratio estimation device 700 having the configuration described above will be explained.

Note that it will be supposed that the rotational speeds $\omega_j$ that have been detected are repeatedly sent from the rotational speed sensors $930_j$ to the acquisition part 710. Moreover, it will be supposed that the normal reaction forces $N_j$ that have been detected are repeatedly sent from the load sensors $940_j$ to the acquisition part 710. Yet further, it will be supposed that the results of detection are repeatedly sent from the various sensors 950 to the torque control part 740.

And it will be supposed that the rotational speeds $\omega_j$ that have been acquired are repeatedly sent from the acquisition part 710 to the friction coefficient information calculation part 720 and to the torque control part 740. Furthermore, it will be supposed that the normal reaction forces $N_j$ that have been acquired are repeatedly sent from the acquisition part 710 to the friction coefficient information calculation part 720.

In the embodiment, slip ratio estimation is performed in the following order: estimation of the slip ratios $\lambda_j$ in the case of "parallel type" torque distribution; and then estimation of the slip ratios $\lambda_j$ in the case of "crossed type" torque distribution. Here, in this estimation of the slip ratios $\lambda_j$ in the case of "parallel type" torque distribution, slip ratio estimation is performed in the following order: estimation of the slip ratios $\lambda_{FL}$ and $\lambda_{RL}$ for the left side driving wheels $WH_{FL}$ and $WH_{RL}$; and then estimation of the slip ratios $\lambda_{FR}$ and $\lambda_{RR}$ for the right side driving wheels $WH_{FR}$ and $WH_{RR}$. Moreover, in estimation of the slip ratios $\lambda_j$ in the case of "crossed type" torque distribution, slip ratio estimation is performed in the following order: estimation of the slip ratios $\lambda_{FL}$ and $\lambda_{FR}$ for the front side driving wheels $WH_{FL}$ and $WH_{FR}$; and then estimation of the slip ratios $\lambda_{RL}$ and $\lambda_{RR}$ for the rear side driving wheels $WH_{RL}$ and $WH_{RR}$.

<<Estimation of the Slip Ratios in the Case of "Parallel Type" Torque Distribution>>

During estimation of the slip ratios in the case of "parallel type" torque distribution, first, estimation is performed of the slip ratios $\lambda_{FL}$ and $\lambda_{RL}$ for the left side driving wheels $WH_{FL}$ and $WH_{RL}$.

During this estimation of the slip ratios $\lambda_{FL}$ and $\lambda_{RL}$ for the left side driving wheels $WH_{FL}$ and $WH_{RL}$, first, based upon the driving wheels $WH_{FL}$ through $WH_{RR}$ at the present time point, the torque control part 740 determines torque instruction values $T_{m1}$ and $T_{m2}$ for the case of "parallel type" torque distribution according to the following Equations (27) and (28):

$$T_{m1} = TT_m/4 - \Delta T_m \qquad (27)$$

$$T_{m2} = TT_m/4 + \Delta T_m \qquad (28)$$

Here, $\Delta T_m$ is set in order to provide a moderate difference between $T_{m1}$ and $T_{m2}$ for calculation of the slip ratios. Moreover, no change takes place in the sum total $TT_m$ of the torque instruction values.

Next, the torque control part 740 generates a torque creation signal on the basis of the torque instruction value $T_{m1}$ that has been determined and sends this torque creation signal that it has generated to the inverters $910_{FL}$ and $910_{FR}$, and also generates a torque creation signal on the basis of the torque instruction value $T_{m2}$ that has been determined and sends this torque creation signal that it has generated to the inverters $910_{RL}$ and $910_{RR}$. And the torque control part 740 sends a slip ratio estimation command in which a specification of the driving state or of the braking state and a specification of the left side driving wheels $WH_{FL}$ and $WH_{RL}$ are included to the friction coefficient information calculation part 720 and to the slip ratio calculation part 730.

Upon receipt of this slip ratio estimation command, the friction coefficient information calculation part 720 takes the driving wheels $WH_{FL}$ and $WH_{RL}$ as being the driving wheels $WH_1$ and $WH_2$ in the theory of slip ratio estimation described above, and calculates the friction coefficients $\mu_{FL}$ and $\mu_{RL}$ at the same road surface position for these driving wheels $WH_1$ and $WH_2$. During this calculation of the friction coefficients $\mu_{FL}$ and $\mu_{RL}$, first, the friction coefficient information calculation part 720 calculates the first friction coefficient $\mu_{FL}$. And next the friction coefficient information calculation part 720 calculates the friction coefficient $\mu_{RL}$ at the time point when the driving wheel $WH_{RL}$ has arrived at the position of the driving wheel $WH_{FL}$ corresponding to the previous moment at which the friction coefficient $\mu_{FL}$ was calculated.

Note that the friction coefficient information calculation part 720 requests the torque control part 740 to change the torque instruction values $T_{m1}$ and $T_{m2}$ if it has been determined that the difference between the rotational speed $\omega_{FL}$ and the rotational speed $\omega_{RL}$ is not appropriate for estimation of the slip ratios $\lambda_{FL}$ and $\lambda_{RL}$. Upon receipt of this request, the torque control part 740 performs change of the torque instruction values $T_{m1}$ and $T_{m2}$.

Next, the torque control part 740 generates a torque creation signal on the basis of the torque instruction value $T_{m1}$ that has been changed and sends this torque creation signal that it has generated to the inverters $910_{FL}$ and $910_{FR}$, and also generates a torque creation signal on the basis of the torque instruction value $T_{m2}$ that has been changed and sends this torque creation signal that it has generated to the inverters $910_{RL}$ and $910_{RR}$. And the torque control part 740 sends a slip ratio estimation command in which a specification of the driving state or of the braking state and a specification of the left side driving wheels $WH_{FL}$ and $WH_{RL}$ are included to the friction coefficient information calculation part 720 and to the slip ratio calculation part 730.

Here, if the difference between the rotational speed $\omega_{FL}$ and the rotational speed $\omega_{RL}$ is too small, then a request is issued to make the difference between the torque instruction value $T_{m1}$ and the torque instruction value $T_{m2}$ greater. On the other hand, if the difference between the rotational speed $\omega_{FL}$ and the rotational speed $\omega_{RL}$ is too great, then a request is issued to make the difference between the torque instruction value $T_{m1}$ and the torque instruction value $T_{m2}$ smaller.

And, when the difference between the rotational speed $\omega_{FL}$ and the rotational speed $\omega_{RL}$ becomes appropriate for estimation of the slip ratios $\lambda_{FL}$ and $\lambda_{RL}$, the friction information calculation part 720 calculates the friction coefficients $\mu_{FL}$ and $\mu_{RL}$.

Next, from the difference between the friction coefficients $\mu_{FL}$ and $\mu_{RL}$ that have been calculated, the friction coefficient information calculation part 720 makes a decision as to whether or not the moving vehicle MV is in a stable state as shown in FIGS. 2 and 3 above. If the result of this decision is affirmative, then the friction coefficient information calculation part 720 sends the friction coefficients $\mu_{FL}$ and $\mu_{RL}$ that have been calculated to the slip ratio calculation part 730, along with the rotational speeds $\omega_{FL}$ and $\omega_{RL}$ at the time points of calculation.

However, if the result of the above decision is negative, then the friction coefficient information calculation part 720 does not send the friction coefficients $\mu_{FL}$ and $\mu_{RL}$ that have been calculated to the slip ratio calculation part 730, but instead sends a report to the torque control part 740 to the effect that the moving vehicle MV is in an unstable state. And, upon receipt of this report, the torque control part 740 performs change to reduce the torque instruction sum total $TT_m$, and calculates new torque instruction values $T_{m1}$ and $T_{m2}$. And the torque control part 740 generates a torque creation signal on the basis of the torque instruction value $T_{m1}$ that has been determined and sends this torque creation signal that it has generated to the inverters 910$_{FL}$ and 910$_{FR}$, and also generates a torque creation signal on the basis of the torque instruction value $T_{m2}$ that has been determined and sends this torque creation signal that it has generated to the inverters 910$_{RL}$ and 910$_{RR}$.

And the torque control part 740 again sends a slip ratio estimation command in which a specification of the driving state or of the braking state and a specification of the left side driving wheels WH$_{FL}$ and WH$_{RL}$ are included to the friction coefficient information calculation part 720 and to the slip ratio calculation part 730. As a result, the calculation processing described above for the friction coefficients $\mu_{FL}$ and $\mu_{RL}$ is executed again.

Upon receipt of the friction coefficients $\mu_{FL}$ and $\mu_{RL}$ sent from the friction coefficient information calculation part 720, first, the slip ratio calculation part 730 calculates estimated values according to Equations (11) and (12) described above, or according to Equations (18) and (19) described above, on the basis of these friction coefficients $\mu_{FL}$ and $\mu_{RL}$, and on the basis of the rotational speeds $\omega_{FL}$ and $\omega_{RL}$ at the time points that these friction coefficients $\mu_{FL}$ and $\mu_{RL}$ were calculated. Next, the slip ratio calculation part 730 performs correction processing upon each of these estimated values of $\lambda$ that have been calculated as described above.

(Processing for Correction of the Calculated Slip Ratios)

Now, the processing for correcting the estimated values of $\lambda$ that have been calculated as described above by the slip ratio calculation part 730 will be explained.

As shown in FIGS. 8(A) through 8(C) above and in FIGS. 9(A) through 9(C) above, not only do the actual value of $\lambda$ and the estimated value of $\lambda$ almost agree with one another when the slip ratio $\lambda$ is close to "0", but also the difference between the actual value of $\lambda$ and the estimated value of $\lambda$ increases along with increase of the slip ratio $\lambda$. A correction equation is formulated so as to make this difference small, thereby bringing the actual value of $\lambda$ and the estimated value of $\lambda$ close to one another. In the embodiment, if "0≤(the estimated $\lambda$ value)<0.2", a corrected value of $\lambda$ is calculated on the basis of the estimated values of the slip ratio that have been calculated by using Equations (11) and (12) described above, or by using Equations (18) and (19) described above, using the following Equation (29) as this correction equation:

$$(\text{corrected } \lambda \text{ value})=A\cdot(\text{estimated } \lambda \text{ value})^2+B\cdot(\text{estimated value}) \qquad (29)$$

Here, the coefficients A and B are values that are determined by the state of the road surface.

Now, as described above, if the slip ratio $\lambda$ is a small value in the neighborhood of "0", then the actual value of $\lambda$ and the estimated value of $\lambda$ are almost the same. And, as shown overall in FIGS. 8(A) through 8(C) and 9(A) through 9(C), when the state of the road surface changes, the friction coefficient becomes different, even though the slip ratio $\lambda$ remains at a small value in the neighborhood of "0" and even though it is the same. Due to this, the value $(\mu_0/\lambda_0)$ of the ratio between the slip ratio and the friction coefficient when the slip ratio $\lambda$ is in the neighborhood of "0" may be said to be a value that accurately reflects the state of the road surface. The result of this is that the coefficients A and B may be considered as being functions of the value $(\mu_0/\lambda_0)$.

Now, as may be read off from FIGS. 8(A) through 8(C) and 9(A) through 9(C), on an example of a dry road surface "$(\mu_0/\lambda_0)$=9.76", on an example of a wet road surface "$(\mu_0/\lambda_0)$=2.96", and on an example of a freezing road surface "$(\mu_0/\lambda_0)$=0.54". Thus, for examples of a dry road surface, a wet road surface, and a freezing road surface, examples of obtaining the coefficients A and B so that the difference between the actual value of and the estimated value of $\lambda$ becomes a minimum are shown in FIG. 12(A). Thus, linear approximation equations for the coefficients A and B obtained in this manner for these three states of the road surface as functions of the variable $(\mu_0/\lambda_0)$ are as shown in the following Equations (30) and (31):

$$A=-0.1589\cdot(\mu_0/\lambda_0)-1.2119 \qquad (30)$$

$$B=-0.0033(\mu_0/\lambda_0)+1.0178 \qquad (31)$$

Note that, in FIG. 12(A), the value $(\mu_0/\lambda_0)$ is shown as "x", so as to represent the linear approximation equations.

Examples of results obtained by performing correction according to Equation (29) described above and using the coefficients A and B obtained according to Equations (30) and (31) described above are shown in FIG. 12(B). As shown in these FIGS. 12(A) and 12(B), it is possible to enhance the accuracy of the estimated value for the slip ratio $\lambda$ by performing the correction described above.

Note that, although the correction equation described above cannot be applied in the range "0.2<$\lambda$", it can be ascertained that processing is required for keeping down the torque instruction values, since this range is already close to the unstable region or is in the state of entering into the unstable region.

Since, when making this correction of the slip ratio, there is a possibility that the state of the road surface has changed if the change in the value $(\mu/\lambda)$ is large, accordingly the correction equation is temporarily cleared. And a new correction equation is generated after having obtained the value $(\mu_0/\lambda_0)$ for a second time.

Figure 13:
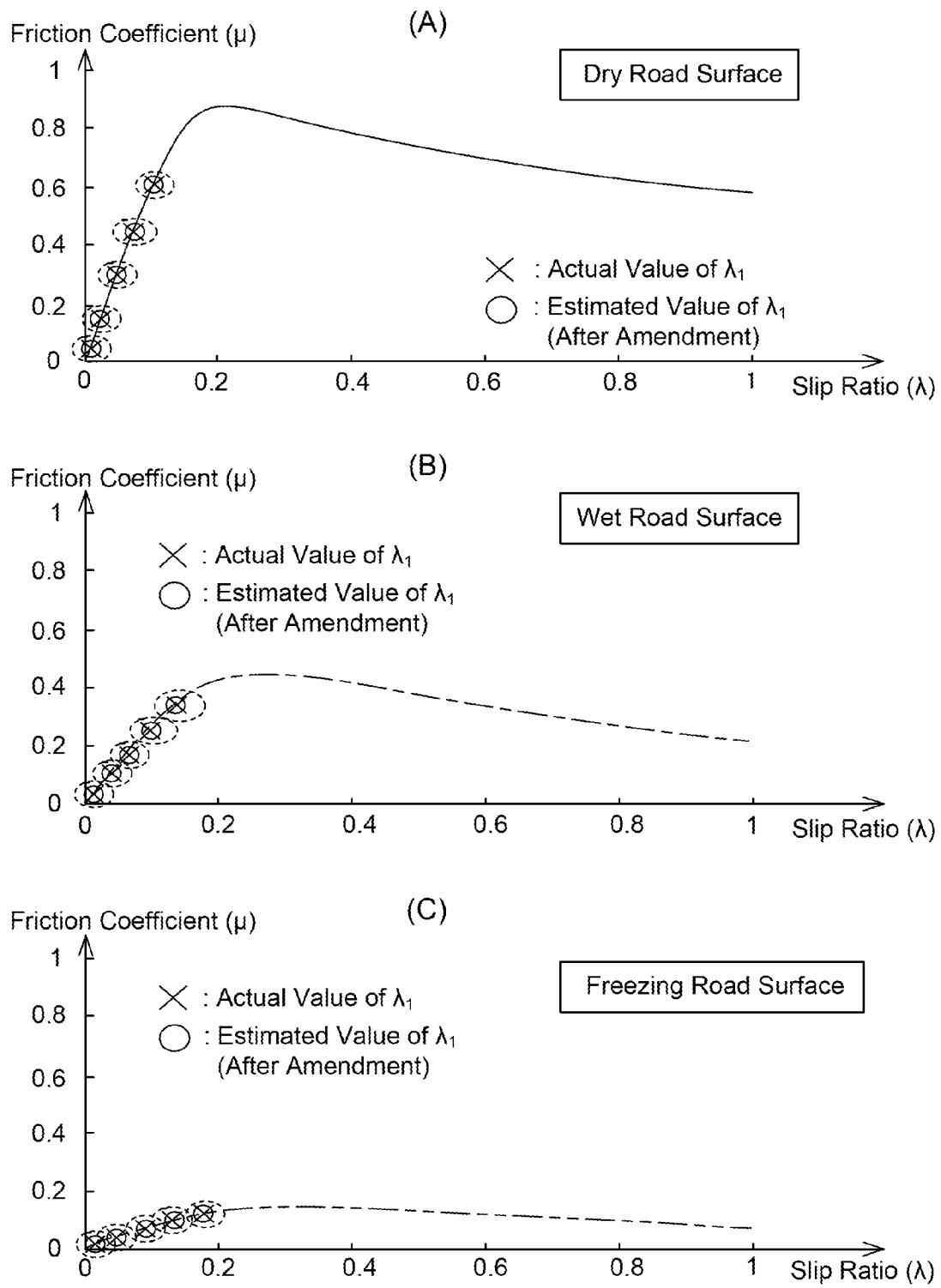
FIG. 13 is a figure for explanation of approaching the actual value of $\lambda_1$ by correcting the estimated value of $\lambda_1$.
Figure 14:
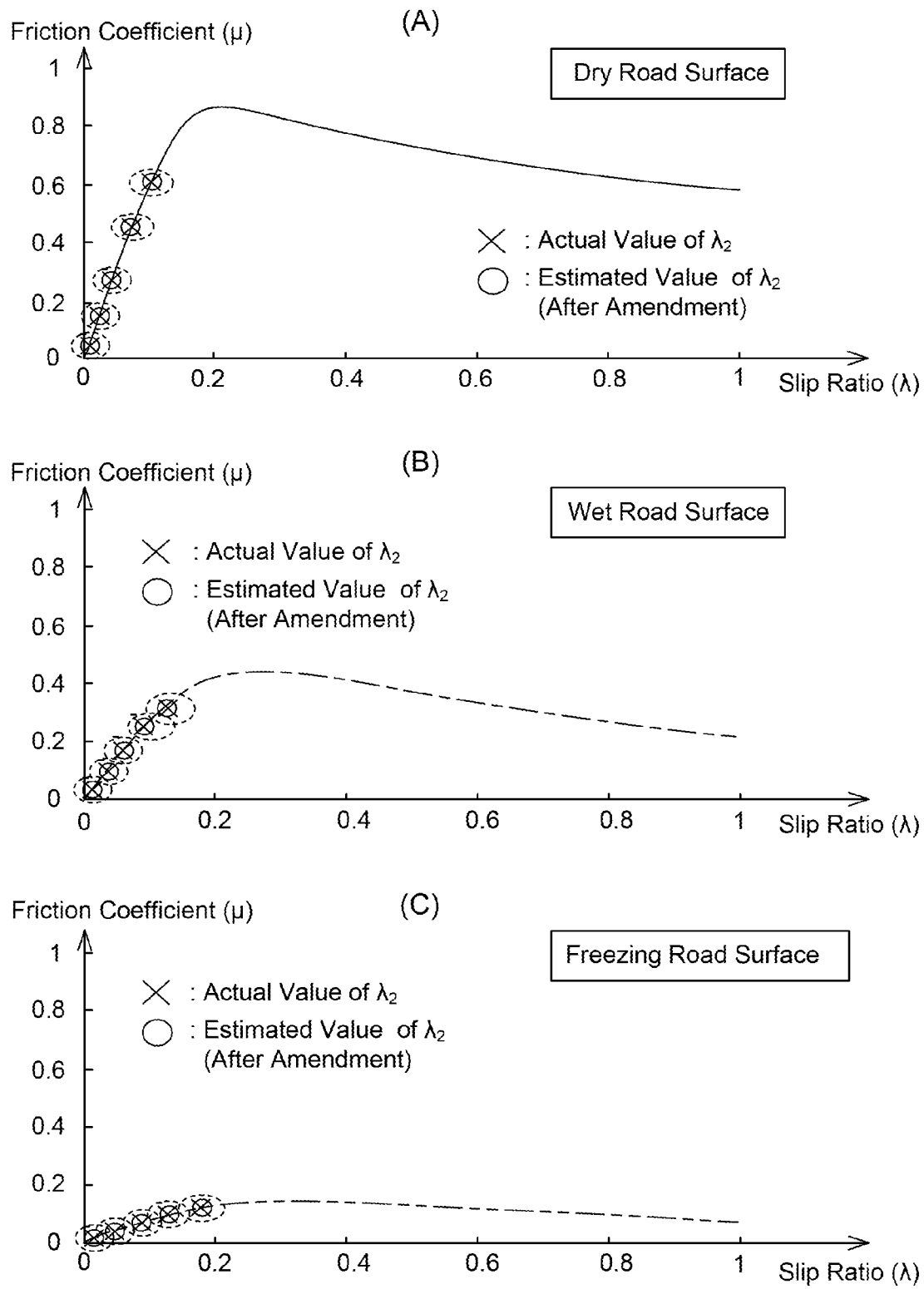
FIG. 14 is a figure for explanation of approaching the actual value of $\lambda_2$ by correcting the estimated value of $\lambda_2$.

The results of applying the correction method described above are shown in FIG. 13 and FIG. 14. As shown in FIG. 13 and FIG. 14, it is possible to enhance the accuracy of the estimated value for the slip ratio $\lambda$ by implementing this correction method.

Note that, during this correction processing, a decision is made as to whether or not the slip ratio that is to be the subject of correction, in other words the estimated value of λ, is a value that belongs to the stable state, and moreover the value $(\mu_0/\lambda_0)$ is being calculated. If the result of this decision is negative, then the estimated value for λ, in other words the slip ratio that has been calculated according to Equation (11) or (12) described above, or that has been calculated according to Equation (18) or (19) described above, is employed as the final slip ratio $\lambda_{FL}$ or $\lambda_{RL}$. On the other hand, if the result of the above decision is affirmative, then the slip ratio that has been corrected according to Equations (29) through (31) is employed as the final slip ratio $\lambda_{FL}$ or $\lambda_{RL}$.

Next, the slip ratio calculation part 730 sends these slip ratios $\lambda_{FL}$ and $\lambda_{R2L}$ to the torque control part 740. And then the slip ratio estimation processing for the left side driving wheels terminates.

Next, estimation is performed of the slip ratios $\lambda_{FR}$ and $\lambda_{RR}$ for the right side driving wheels $WH_{FR}$ and $WH_{RR}$. During this estimation of the slip ratios $\lambda_{FR}$ and $\lambda_{RR}$ for the right side driving wheels $WH_{FR}$ and $WH_{RR}$, in a similar manner to the case for the driving wheels $WH_{FL}$ and $WH_{RL}$, the friction information calculation part 720 takes the driving wheels $WH_{FR}$ and $WH_{RR}$ as the driving wheels $WH_1$ and $WH_2$ in the slip ratio estimation theory described above, and calculates the friction coefficients $\mu_{FR}$ and $\mu_{RR}$. And the friction coefficient information calculation part 720 sends the friction coefficients $\mu_{FR}$ and $\mu_{RR}$ that have been calculated to the slip ratio calculation part 730, along with the rotational speeds $\omega_{FR}$ and $\omega_{RR}$ at the time points of calculation.

Upon receipt of the friction coefficients $\mu_{FR}$ and $\mu_{RR}$ sent from the friction coefficient information calculation part 720, the slip ratio calculation part 730 obtains the slip ratios $\lambda_{FR}$ and $\lambda_{RR}$ on the basis of those friction coefficients $\mu_{FR}$ and $\mu_{RR}$ and the rotational speeds $\omega_{FR}$ and $\omega_{RR}$ at the time points of calculation of those friction coefficients $\mu_{FR}$ and $\mu_{RR}$, in a similar manner to the case of the driving wheels $WH_{FL}$ and $WH_{RL}$ described above. At this time, if possible, the correction processing described above is also performed. And the slip ratio calculation part 730 sends these slip ratios $\lambda_{FR}$ and $\lambda_{RR}$ that it has obtained to the torque control part 740.

Upon receipt of the slip ratios $\lambda_{FL}$, $\lambda_L$, $\lambda_R$, and $\lambda_{RR}$ for the case of "parallel type" torque distribution that have been calculated in this manner, the torque control part 740 makes a decision as to whether or not the difference between the average value of the slip ratios $\lambda_{FL}$ and $\lambda_{RL}$ on the left side and the average value of the slip ratios $\lambda_{FR}$ and $\lambda_{RR}$ on the right side is small. If the result of this decision is affirmative, then the processing described hereinafter during "crossed type" torque distribution is executed.

On the other hand, if the result of the above decision is negative, then the torque control part 740 determines that the average value of the slip ratio is on the large side so that there is a puddle or a freezing spot on the road surface, and performs changing to reduce the sum total $TT_m$, in order to prevent the running state of the vehicle from becoming unstable before it even happens. And then the processing described hereinafter during "crossed type" torque distribution is executed.

<<Estimation of the Slip Ratios in the Case of "Crossed Type" Torque Distribution>>

When the estimation processing described above for the slip ratios $\lambda_j$ in the case of "parallel type" torque distribution has been completed, estimation processing for the slip ratios $\lambda_j$ in the case of "crossed type" torque distribution is started. During this estimation of the slip ratios in the case of "crossed type" torque distribution, first, estimation is performed of the slip ratios $\lambda_{FL}$ and $\lambda_{FR}$ for the front side driving wheels $WH_{FL}$ and $WH_{FR}$.

During this estimation of the slip ratios $\lambda_{FL}$ and $\lambda_{FR}$ for the front side driving wheels $WH_{FL}$ and $WH_{FR}$, first, on the basis of the sum total $TT_m$ of the torque instruction values for the driving wheels $WH_{FL}$ through $WH_{RR}$ at the present time point, the torque control part 740 determines torque instruction values $T_{m1}$ and $T_{m2}$ for the case of "crossed type" torque distribution, in a similar manner to that in the case of "parallel type" torque distribution.

Next, the torque control part 740 generates a torque creation signal on the basis of the torque instruction value $T_{m1}$ that has been determined and sends this torque creation signal that it has generated to the inverters $910_{FL}$ and $910_{RR}$, and also generates a torque creation signal on the basis of the torque instruction value $T_{m2}$ that has been determined and sends this torque creation signal that it has generated to the inverters $910_{FR}$ and $910_{RL}$. And the torque control part 740 sends a slip ratio estimation command in which a specification of the driving state or of the braking state and a specification of the front side driving wheels $WH_{FL}$ and $WH_{FR}$ are included to the friction coefficient information calculation part 720 and to the slip ratio calculation part 730.

Upon receipt of this slip ratio estimation command, the friction coefficient information calculation part 720 takes the driving wheels $WH_{FL}$ and $WH_{FR}$ as being the driving wheels $WH_1$ and $WH_2$ in the theory of slip ratio estimation described above, and calculates the friction coefficients $\mu_{FL}$ and $\mu_{FR}$ at the same time point for these driving wheels $WH_1$ and $WH_2$. And the friction coefficient information calculation part 720 sends the friction coefficients $\mu_{FL}$ and $\mu_{FR}$ that it has calculated to the slip ratio calculation part 730, along with the rotational speeds $\omega_{FL}$ and $\omega_{FR}$ at the time point that these friction coefficients $\mu_{FL}$ and $\mu_{FR}$ became the subjects of calculation.

Note that, if the difference between the rotational speed $\omega_{FL}$ and the rotational speed $\omega_{FR}$ is not appropriate for estimation of the slip ratios $\lambda_{FL}$ and $\lambda_{FR}$, then processing similar to that performed the case of "parallel type" torque distribution described above is executed. Moreover, if it has been decided from the difference between the friction coefficients $\mu_{FL}$ and $\mu_{FR}$ that have been calculated that the moving vehicle MV is in an unstable state, then processing similar to that performed the case of "parallel type" torque distribution described above is also executed.

Upon receipt of the friction coefficients $\mu_{FL}$ and $\mu_{FR}$ sent from the friction coefficient information calculation part 720, the slip ratio calculation part 730 obtains the slip ratios $\lambda_{FL}$, and $\lambda_R$ on the basis of those friction coefficients $\mu_{FL}$ and $\mu_{FR}$ and the rotational speeds $\omega_{FL}$ and $\omega_{FR}$ at the time points of calculation of those friction coefficients $\mu_{FL}$ and $\mu_{FR}$, using Equations (11) and (12) described above, or using Equations (18) and (19) described above. Note that at this time as well, if possible, the correction processing described above is also performed, in a similar manner to the "parallel type" case described above.

Next, estimation is performed of the slip ratios $\lambda_{RL}$ and $\lambda_{RR}$ for the rear side driving wheels $WH_{RL}$ and $WH_{RR}$. During this estimation of the slip ratios $\lambda_{TL}$ and $\lambda_{RR}$ for the rear side driving wheels $WH_{RL}$ and $WH_{RR}$, the friction coefficient information calculation part 720 takes the driving wheels $WH_{RL}$ and $WH_{RR}$ as being the driving wheels $WH_1$ and $WH_2$ in the theory of slip ratio estimation described above, and calculates the friction coefficients $\mu_{RL}$ and $\mu_{RR}$ at the time point that these driving wheels $WH_{RL}$ and $WH_{RR}$ became the subject of calculation, in a similar manner to the case of the driving wheels $WH_{FL}$ and $WH_{FR}$. And the friction coefficient information calculation part 720 sends the friction coefficients $\mu_{RL}$ and $\mu_{RR}$ that it has calculated to the slip ratio calculation part 730, along with the rotational speeds $\omega_{RL}$ and $\omega_{RR}$ at the time point that these friction coefficients $\mu_{RL}$ and $\mu_{RR}$ became the subjects of calculation.

Upon receipt of the friction coefficients $\mu_{RL}$ and $\mu_{RR}$ sent from the friction coefficient information calculation part 720, the slip ratio calculation part 730 obtains the slip ratios $\lambda_{RL}$ and $\lambda_{RR}$ on the basis of those friction coefficients $\mu_{RL}$ and $\mu_{RR}$ and the rotational speeds $\omega_{RL}$ and $\omega_{RR}$ at the time points of calculation of those friction coefficients $\mu_{RL}$ and $\mu_{RR}$, in a similar manner to the case of the driving wheels $WH_{FL}$ and $WH_{FR}$ described above. And the slip ratio calculation part 730 sends these slip ratios $\lambda_{RL}$ and $\lambda_{RR}$ that it has obtained to the torque control part 740.

Upon receipt of the slip ratios $\lambda_{FL}$, $\lambda_{FR}$, $\lambda_{RL}$, and $\lambda_{RR}$ for the case of "crossed type" torque distribution that have been calculated in this manner, the torque control part 740 makes a decision as to whether or not the difference between the average value of the slip ratios $\lambda_{FL}$ and $\lambda_{FR}$ on the front side and the average value of the slip ratios $\lambda_{RL}$ and $\lambda_{RR}$ on the rear side is small. If the result of this decision is affirmative, then the processing described above during "parallel type" torque distribution and the processing during "crossed type" torque distribution are sequentially executed for a second time.

On the other hand, if the result of the above decision is negative, then the torque control part 740 decides that the state of the road surface has changed, and performs changing to reduce the sum total $TT_m$, in order to prevent the running state of the vehicle becoming unstable before it even happens. For example, if the slip ratio for the front wheel side is larger than the slip ratio for the rear wheel side, then it is predicted that the vehicle is entering onto a road surface upon which slipping can easily occur, and processing is performed to reduce the total torque value, or the like. And then the processing described above during "parallel type" torque distribution is executed.

As has been explained above, in this embodiment, the acquisition part 710 acquires the rotational speeds $\omega_{FL}$, $\omega_{FR}$, $\omega_{RL}$, and $\omega_{RR}$ of the plurality of driving wheels $WH_{FL}$, $WH_{FR}$, $WH_{RL}$, and $WH_{RR}$ of the moving vehicle MV, and the normal reaction forces $N_{FL}$, $N_{FR}$, $N_{RL}$, and $N_{RR}$ acting upon this plurality of driving wheels $WH_{FL}$, $WH_{FR}$, $WH_{RL}$, and $WH_{RR}$. And next, the friction coefficient information calculation part 720 calculates the friction coefficients $\mu_{FL}$, $\mu_{FR}$, $\mu_{RL}$, and $\mu_{RR}$ related to this plurality of driving wheels $WH_{FL}$, $WH_{FR}$, $WH_{RL}$, and $WH_{RR}$, on the basis of torque instruction values for the plurality of driving wheels $WH_{FL}$, $WH_{FR}$, $WH_{RL}$, and $WH_{RR}$ sent from the torque control part 740, and the results of acquisition by the acquisition part 710. Moreover, the slip ratio calculation part 730 calculates the slip ratios $\lambda_{FL}$, $\lambda_{FR}$, $\lambda_{RL}$, and $\lambda_{RR}$ of the plurality of driving wheels $WH_{FL}$, $WH_{FR}$, $WH_{RL}$, and $WH_{RR}$, on the basis of the friction coefficients $\mu_{FL}$, $\mu_{FR}$, $\mu_{RL}$, and $\mu_{RR}$ that have been calculated and the rotational speeds $\omega_{FL}$, $\omega_{FR}$, $\omega_{RL}$, and $\omega_{RR}$ that were acquired by the acquisition part 710.

Thus, according to this embodiment, it is possible to estimate the slip ratio for each of the driving wheels easily and rapidly, and moreover with good accuracy.

In the embodiment, by performing torque control, the torque control part 740 performs slip ratio estimation for the case of "parallel type" torque allocation and slip ratio estimation for the case of "crossed type" torque allocation. Due to this, according to the embodiment, it is possible to perform torque control that corresponds to the state of the road surface upon which the moving vehicle MV is traveling.

Furthermore, in the embodiment, the slip ratio calculation part 730 performs correction processing upon the initially calculated slip ratio on the basis of the ratio of the friction coefficient to the slip ratio (i.e. on the basis of $\mu/\lambda$) in the vicinity of where the slip ratio is "0". Due to this, it is possible to estimate the slip ratio with extremely good accuracy, corresponding to the state of the road surface at the position of the driving wheel at the time point when this slip ratio is calculated.

Modification of Embodiments

The present invention is not to be considered as being limited to the embodiment described above; it could be altered in various different ways.

For example, in the embodiment described above, it is arranged for the friction information calculation part 720 to calculate the friction coefficients $\mu_1$ and $\mu_2$ according to the theory described above of the slip ratio estimation method, and to send the friction coefficients $\mu_1$ and $\mu_2$ that it has calculated to the slip ratio calculation part 730. By contrast, it would also be acceptable to arrange for the friction coefficient information calculation part 720 to calculate the ratio ($\mu_2/\mu_1$) from the ratio ($F_{d2}/F_{d1}$) of the drive force $F_{d2}$ to the drive force $F_{d1}$ and from the ratio ($N_1/N_2$) of the normal reaction force $N_1$ to the normal reaction force $N_2$ according to the following Equation (32), and to send the ratio that it has calculated to the slip ratio calculation part 730:

$$(\mu_2/\mu_1)=(F_{d2}/N_2)/(F_{d1}/N_1)=(F_{d2}/F_{d1})\cdot(N_1/N_2) \quad (32)$$

This is done because, as will be understood by reference to Equations (11) and (12) described above and by reference to Equations (18) and (19) described above, the values used for calculation by the slip ratio calculation part 730 are not the friction coefficients $\mu_1$ and $\mu_2$ themselves, but the ratio between them. Note that it would also be acceptable to arrange for the friction coefficient information calculation part 720 to calculate the ratio ($\mu_1/\mu_2$) which is the reciprocal of the ratio ($\mu_2/\mu_1$), and to send this ratio that it has calculated to the slip ratio calculation part 730.

Furthermore, in the embodiment, it is arranged for the slip ratio calculation part 730 to calculate the slip ratios both during "parallel type" torque distribution and during "crossed type" torque distribution, so that the torque control part 740 is enabled to calculate the torque instruction values $T_{m1}$ and $T_{m2}$ for slip ratio estimation on the basis of the rotational speeds $\omega_j$, the results of detection sent from the various sensors 950, and the slip ratios sent from the slip ratio calculation part 730, both during "parallel type" torque distribution and during "crossed type" torque distribution. By contrast, it would also be acceptable to arrange for the slip ratio calculation part 730 to perform calculation of the slip ratios only according to one or the other of "parallel type" torque distribution and "crossed type" torque distribution.

Moreover, without being over-punctilious about "parallel type" torque distribution or "crossed type" torque distribution, it would also be acceptable to arrange for the torque control part to generate torque instruction values for each of the driving wheels for performing traction control (for example, model tracking control) in order to suppress free spinning of each of the driving wheels, on the basis of the rotational speeds $\omega_j$, the results of detection sent from the various sensors 950, the slip ratios sent from the slip ratio calculation part, and the torque instruction values at the present time point for each of the driving wheels, so that the slip ratio calculation part can calculate the slip ratios according to Equations (11) and (12), or according to Equations (18) and (19), for each combination of two driving wheels for which it is estimated that it would be appropriate to perform slip ratio calculation based upon the difference of their rotational speeds. In other words, it would be acceptable to arrange to estimate the slip ratio for each of the driving wheels, within the range of possibility, while still performing traction control in order to ensure safe traveling.

Furthermore, in the embodiment, the present invention was applied to a case in which the moving vehicle MV had four driving wheels that were driven independently of one another. By contrast, it would also be possible to apply the present invention to a case in which the moving vehicle has any plural number of driving wheels capable of being driven independently of one another, and it would also be possible to estimate the slip ratios in any such case as well.

<Estimation of the Normal Reaction Forces without Employing Load Sensors>

Furthermore, in the embodiment, it is arranged to calculate the friction coefficients $\mu_j$ on the basis of the normal reaction forces $N_j$ that are detected by the load sensors 940$_j$ (where j=FL, FR, RL, and RR). By contrast, if the weight M of the moving vehicle and the position of the center of mass of the moving vehicle are already known, it would also be acceptable not to employ any load sensors, but instead to arrange to estimate the normal reaction forces $N_j$ on the basis of the results of detection by an acceleration sensor, by an angular velocity sensor, and by a gyro sensor mounted to the moving vehicle. In this case, the normal reaction forces $N_j$ may be calculated as described below.

<<When the Vehicle is Traveling at Constant Speed>>

Figure 15:
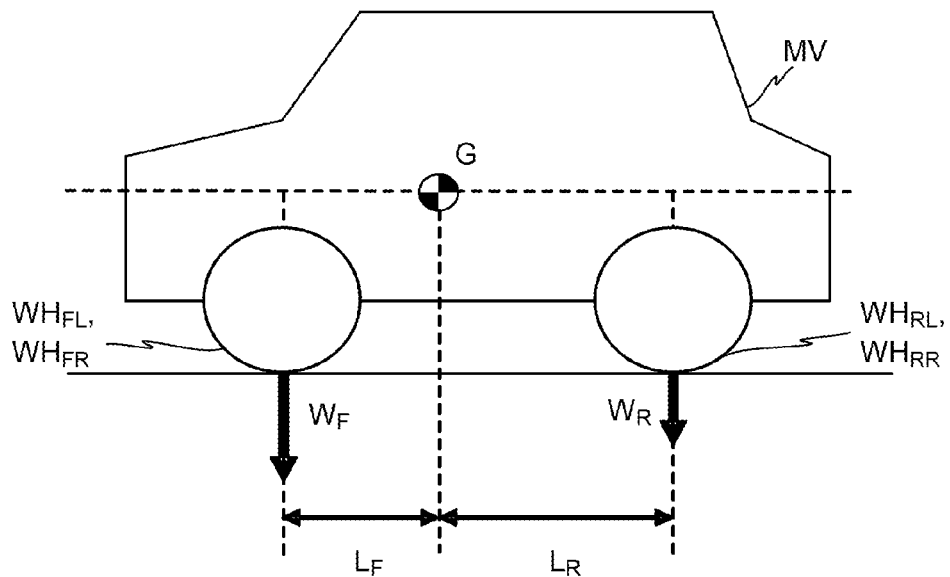
FIG. 15 is the first figure for explanation of estimation of normal reaction forces when no load sensor is employed.

When a moving vehicle is traveling at constant speed on a road surface that is almost parallel to the horizontal plane, then the positional relationship between the front side load $W_F$ that is the sum of the loads imposed upon the two front side driving wheels $WH_{FL}$ and $WH_{FR}$, and the rear side load $W_R$ that is the sum of the loads imposed upon the two front side driving wheels $WH_{RL}$ and $WH_{RR}$, is as shown in FIG. 15. Here, the sum of the front side load $W_F$ and the rear side load $W_R$ is equal to the weight M of the moving vehicle. In other words, the following Equation (33) holds:

$$W_F + W_R = M \tag{33}$$

Moreover, in the case shown in FIG. 15, the equilibrium condition for the rotational moments related to the forces operating in the longitudinal direction around the center of mass of the moving vehicle becomes the following Equation (34):

$$W_F \times L_F = W_R \times L_R \tag{34}$$

Here, the value $L_F$ is the distance along the forward direction from the center of mass position to the front side driving wheels. Moreover, the value $L_R$ is the distance along the rearward direction from the center of mass position to the rear side driving wheels.

Accordingly, the front side load WF and the rear side load WR may be calculated according to the following Equations (35) and (36):

$$W_F = M \cdot (L_R/(L_F + L_R)) \tag{35}$$

$$W_R = M \cdot (L_F/(L_F + L_R)) \tag{36}$$

Due to this, after having calculated the front side load $W_F$ according to Equation (35), the friction coefficient information calculation part is able to calculate the normal reaction forces $N_{FL}$ and $N_{FR}$ according to the following Equation (37):

$$N_{FL} = N_{FR} = W_F/2 \tag{37}$$

Moreover, after having calculated the rear side load $W_R$ according to Equation (36), the friction coefficient information calculation part is able to calculate the normal reaction forces $N_{RL}$ and $N_{RR}$ according to the following Equation (38):

$$N_{RL} = N_{RR} = W_R/2 \tag{38}$$

<<When the Vehicle is Accelerating or Decelerating>>

Figure 16:
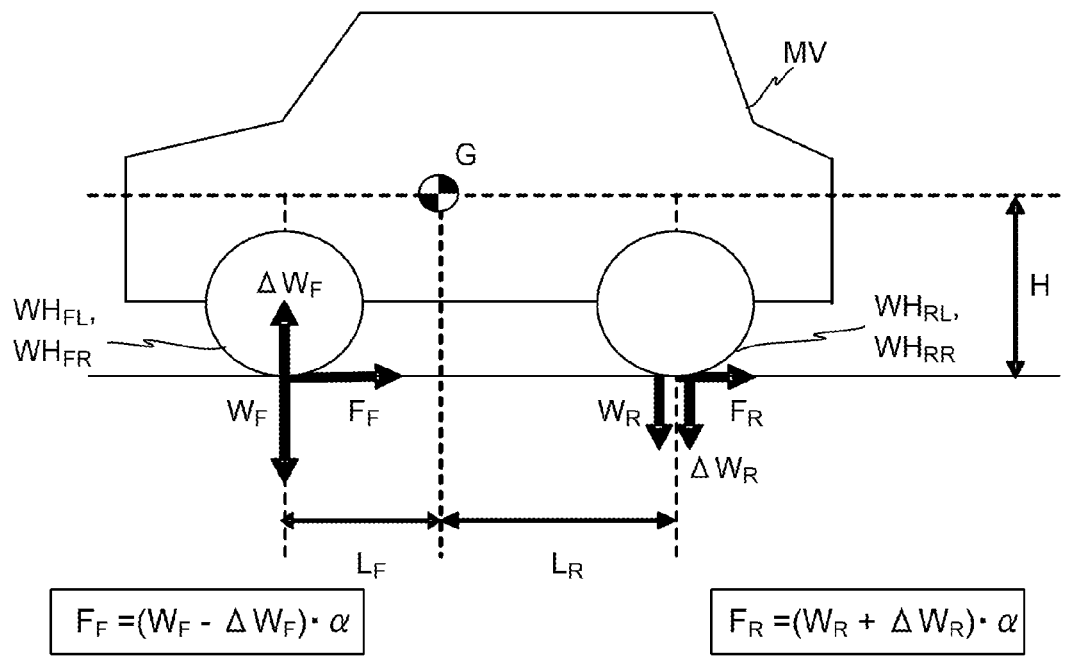
FIG. 16 is the second figure for explanation of estimation of normal reaction forces when no load sensor is employed.

Let it be supposed that the moving vehicle is traveling along a road surface that is almost parallel to the horizontal plane while accelerating or decelerating, and that the result of detection by the acceleration sensor of the acceleration of the moving vehicle in its longitudinal direction is $\alpha$. In this case, as shown in FIG. 16, in addition to the state shown in FIG. 15, a load shift $\Delta W_F$ toward the front direction and a load shift $\Delta W_R$ toward the rear direction occur. Moreover, in this case, along with a total force $F_F (=(W_F-\Delta W_F) \cdot \alpha)$ operating at the contact point between the front side driving wheels $WH_{FL}$ and $WH_{FR}$ and the road surface, also a total force $F_R (=(W_R + \Delta W_R) \cdot \alpha)$ operates at the contact point between the rear side driving wheels $WH_{RL}$ and $WH_{RR}$ and the road surface. Here, since the weight M of the moving vehicle is constant, accordingly the following Equation (39) holds:

$$\Delta W_F = \Delta W_R \tag{39}$$

Moreover, in the case shown in FIG. 16, the equilibrium condition for the rotational moments related to the forces operating in the longitudinal direction around the center of mass when the load change that takes place due to acceleration or deceleration of the moving vehicle is considered becomes the following Equation (40):

$$(F_F + F_R) \times H = \Delta W_F \times g \times L_F + \Delta W_R \times g \times L_R \tag{40}$$

Here, the value H is the distance between the center of mass of the moving vehicle and the road surface, and the value g is the magnitude of the acceleration due to gravity.

Accordingly, the load shift amount $\Delta W_F$ and the load shift amount $\Delta W_R$ may be calculated according to the following Equations (41) and (42):

$$\Delta W_F = (H/(L_F + L_R)) \cdot M \cdot (\alpha/g) \tag{41}$$

$$\Delta W_R = (H/(L_F + L_R)) \cdot M \cdot (\alpha/g) \tag{42}$$

Due to this, after having calculated the load shift $\Delta W_F$ according to Equation (41), the friction coefficient information calculation part is able to calculate the normal reaction forces $N_{FL}$ and $N_{FR}$ according to the following Equation (43):

$$N_{FL} = N_{FR} = (W_F - \Delta W_F)/2 \tag{43}$$

Moreover, after having calculated the load shift $\Delta W_R$ according to Equation (42), the friction coefficient information calculation part is able to calculate the normal reaction forces $N_{RL}$ and $N_{RR}$ according to the following Equation (44):

$$N_{RL} = N_{RR} = (W_R + \Delta W_R)/2 \tag{44}$$

<<When the Vehicle is Traveling on a Sloping Road Surface>>

Figure 17:
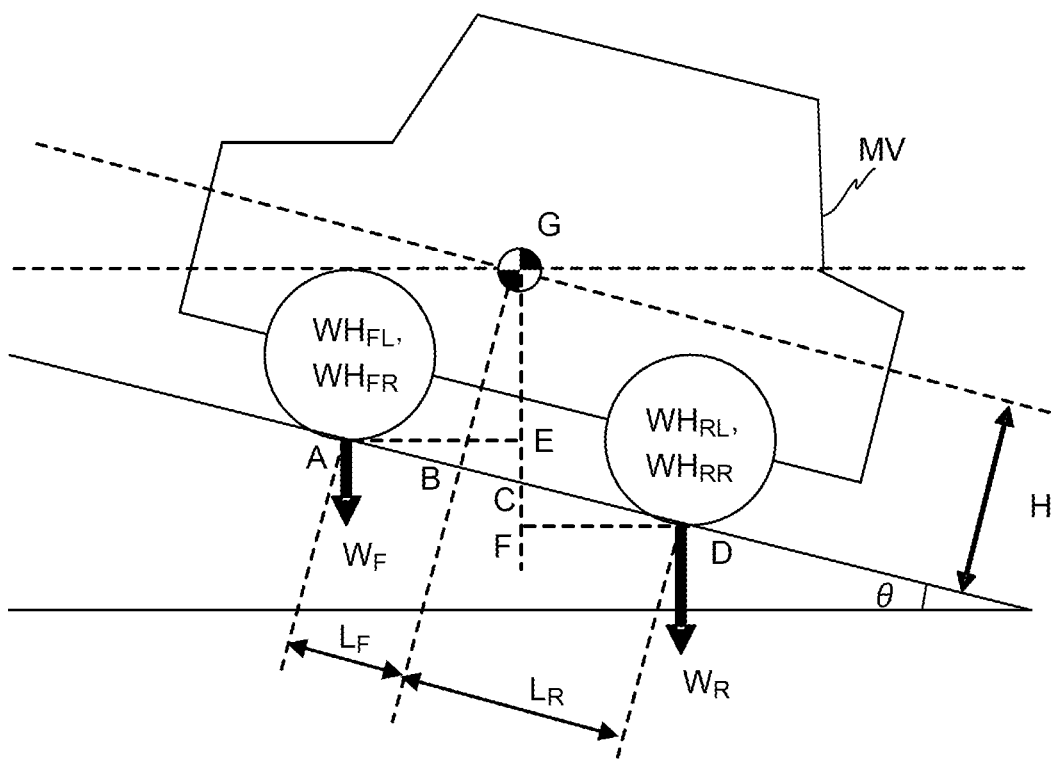
FIG. 17 is the third figure for explanation of estimation of normal reaction forces when no load sensor is employed.

Let it be supposed that the moving vehicle is traveling upon a road whose surface is inclined, and that the result of detection of the gradient of the road surface by a gradient sensor such as a gyro sensor or the like is an angle $\theta$. In this case, the positional relationship between the front side load $W_F$ and the rear side load $W_R$ is as shown in FIG. 17. Note that Equation (33) described above is valid in this case as well.

Moreover, in the case shown in FIG. 17, the equilibrium conditions for the rotational moments related to the forces operating in the longitudinal direction of the moving vehicle around its center of mass become the following Equations (45) and (46):

$$W_F \times (L_F + BC) \times \cos \theta = W_R \times (L_R - BC) \times \cos \theta \tag{45}$$

$$BC = H \times \tan \theta \tag{46}$$

Accordingly, the front side load $W_F$ and the rear side load $W_R$ can be calculated according to the following Equations (47) and (48):

$$W_F = M \cdot ((L_R - H \cdot \tan\theta)/(L_F + L_R)) \quad (47)$$

$$W_R = M \cdot ((L_F + H \cdot \tan\theta)/(L_F + L_R)) \quad (48)$$

Due to this, after having calculated the front side load $W_F$ according to Equation (47), the friction coefficient information calculation part is able to calculate the normal reaction forces $N_{FL}$ and $N_{FR}$ according to Equation (37) described above. Moreover, after having calculated the rear side load $W_R$ according to Equation (48), the friction coefficient information calculation part is able to calculate the normal reaction forces $N_{RL}$ and $N_{RR}$ according to Equation (38) described above.

<<When the Vehicle is Going Around a Curve and is Subjected to Centrifugal Force>>

Figure 18:
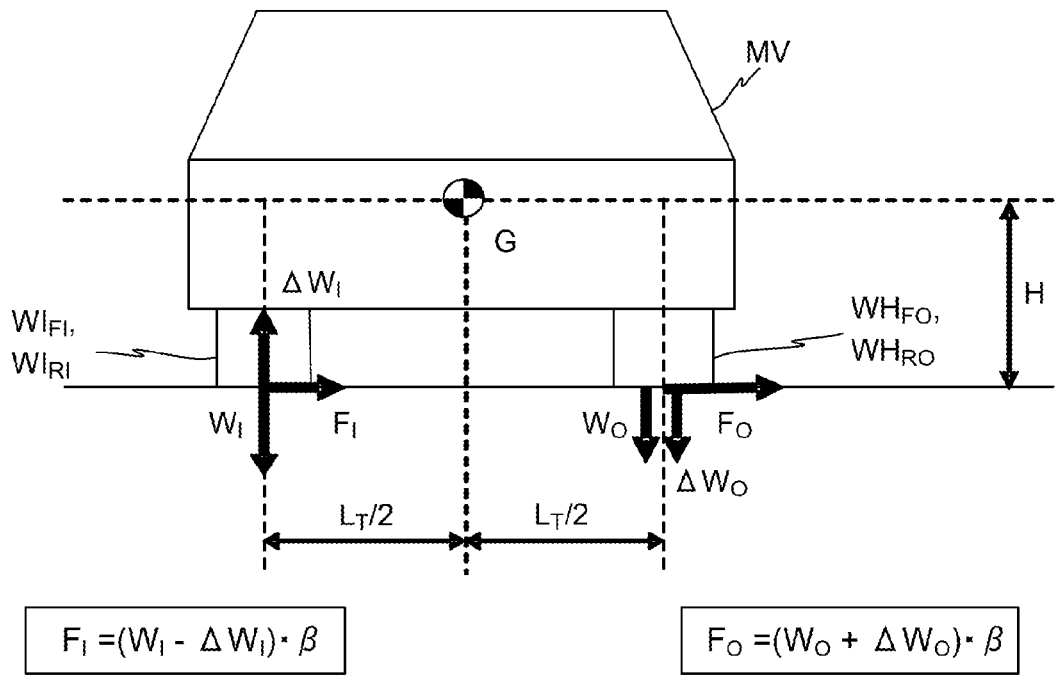
FIG. 18 is the fourth figure for explanation of estimation of normal reaction forces when no load sensor is employed.

Let it be supposed that the moving vehicle is traveling upon the surface of a road that is almost parallel to the horizontal plane and that is curved, and that the result of detection by an acceleration sensor of the acceleration of the moving vehicle in the transverse direction is $\beta$. In this case, the positional relationship of the inside load $W_I$ that is the sum of the loads imposed upon the two driving wheels $WH_{FI}$ and $WH_{RI}$ on the inside of the curve (where I=L or R) and the outside load $W_O$ that is the sum of the loads imposed upon the two driving wheels $WH_{FO}$ and $WH_{RO}$ on the outside of the curve (where O=L or R) is as shown in FIG. 18. Here, the sum of the inside load $W_I$ and the outside load $W_O$ is equal to the weight M of the moving vehicle. In other words, the following Equation (49) holds:

$$W_I + W_O = M \quad (49)$$

Furthermore, if it is considered that the moving vehicle is traveling at constant speed upon a road surface that is almost parallel to the horizontal plane, then the equilibrium condition for the rotational moments related to the forces operating in the transverse direction of the moving vehicle around its center of mass becomes the following Equation (50):

$$W_I \cdot g \cdot L_T / 2 \cdot W_O \cdot g \cdot L_T / 2 \quad (50)$$

Accordingly, the inside load $W_I$ and the outside load $W_O$ can be calculated according to the following Equation (51):

$$W_I = W_O = M/2 \quad (51)$$

Moreover, if the result of detection of the acceleration of the moving vehicle in the transverse direction by the acceleration sensor is the acceleration $\beta$, then, as shown in FIG. 18, a load shift $\Delta W_I$ toward the inside and a load shift $\Delta W_O$ toward the outside are generated. Yet further, along with a total force $F_1$ ($=(W_I - \Delta W_I) \cdot \beta$) acting at the contact points between the inside driving wheels $WH_{FI}$ and $WH_{RI}$ and the road surface, also a total force $F_O$ ($=(W_O + \Delta W_O) \cdot \beta$) acts at the contact points between the outside driving wheels $WH_{FO}$ and $WH_{RO}$ and the road surface. Here, since the weight M of the moving vehicle is constant, accordingly the following Equation (52) holds:

$$\Delta W_I = \Delta W_O \quad (52)$$

Yet further, from the resemblance between this state and the state shown in FIG. 16 described above, in the case shown in FIG. 18, when attention is given to the changes of load generated due to centrifugal force, the equilibrium condition for the rotational moments related to the forces operating in the transverse direction of the moving vehicle around its center of mass becomes the following Equation (53):

$$(F_T + F_O) \times H = \Delta W_I \times g \times L_T / 2 + \Delta W_O \times g \times L_T / 2 \quad (53)$$

Here, the value $L_T$ is the distance between the driving wheels in the horizontal direction.

Accordingly, the load shift $\Delta W_I$ and the load shift $\Delta W_O$ can be calculated according to the following Equations (54) and (55):

$$\Delta W_I = (H/L_T) \cdot M \cdot (\beta/g) \quad (54)$$

$$\Delta W_O = (H/L_T) \cdot M \cdot (\beta/g) \quad (55)$$

Due to this, if the inside direction of the curve is the left side direction, after having calculated the load shifts $\Delta W_I$ and $\Delta W_O$ according to Equations (54) and (55), the friction coefficient information calculation part is able to calculate the normal reaction forces $N_{FL}$ and $N_{RF}$ according to the following Equations (56) and (56-2), and is also able to calculate the normal reaction forces $N_{FR}$ and $N_{RR}$ according to the following Equations (57) and (57-2):

$$N_{FL} = (W_I - \Delta W_I) \cdot (W_F / M) \quad (56)$$

$$N_{RL} = (\Delta W_I - \Delta W_I) \cdot (W_R / M) \quad (56\text{-}2)$$

$$N_{FR} = (W_I + \Delta W_I) \cdot (W_F / M) \quad (57)$$

$$N_{RR} = (W_I + \Delta W_I) \cdot (W_R / M) \quad (57\text{-}2)$$

Moreover, if the inside direction of the curve is the right side direction, the friction coefficient information calculation part is able to calculate the normal reaction forces $N_{FL}$ and $N_{RL}$ according to the following Equations (58) and (58-2), and is also able to calculate the normal reaction forces $N_{FR}$ and $N_{RR}$ according to the following Equations (59) and (59-2):

$$N_{FL} = (W_I + \Delta W_I) \cdot (W_F / M) \quad (58)$$

$$N_{RL} = (W_I + \Delta W_I) \cdot (W_R / M) \quad (58\text{-}2)$$

$$N_{FR} = (W_I + \Delta W_I) \cdot (W_F / M) \cdot (W_F / M) \quad (59)$$

$$N_{RR} = (W_I + \Delta W_I) \cdot (W_R / M) \quad (59\text{-}2)$$

<<When the Vehicle is Traveling Upon a Road Surface that is Canted>>

Figure 19:
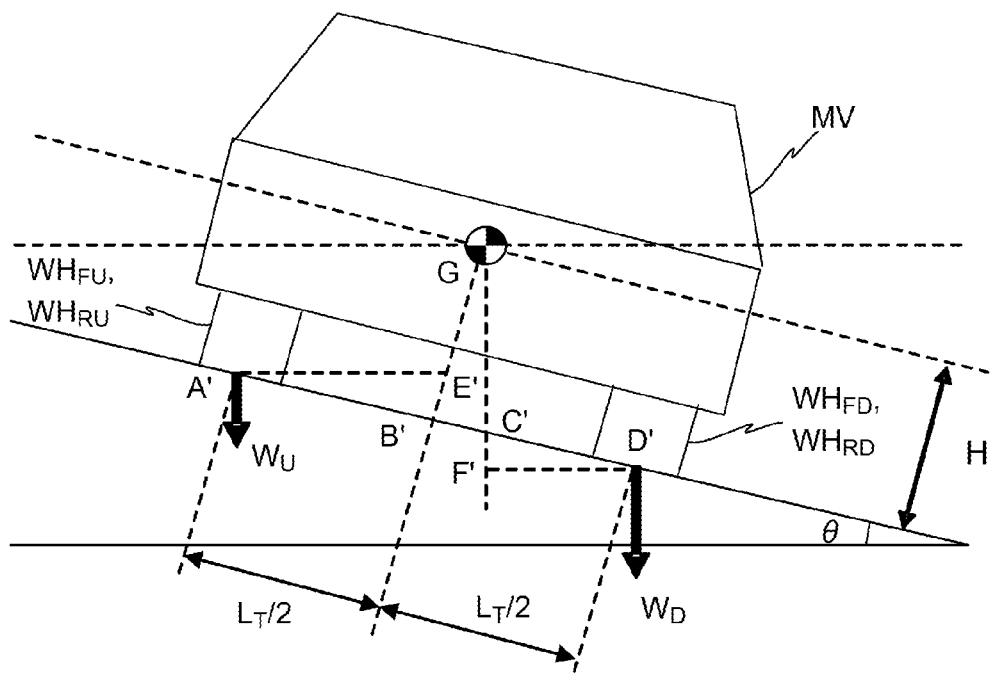
FIG. 19 is the fifth figure for explanation of estimation of normal reaction forces when no load sensor is employed.

Let it be supposed that the moving vehicle is traveling upon the surface of a road that is canted in the transverse horizontal direction, and that the result of detection of the gradient angle of the road surface in the transverse direction by a gyro sensor or the like is $\theta$. In this case, the positional relationship of the lower side load $W_D$ that is the sum of the loads imposed upon the two driving wheels $WH_{FD}$ and $WH_{RD}$ on the lower side of the road (where D=L or R) and the upper side load $W_U$ that is the sum of the loads imposed upon the two driving wheels $WH_{FU}$ and $WH_{RU}$ on the upper side of the road (where U=L or R) is as shown in FIG. 19. Here, the sum of the lower side load $W_D$ and the upper side load $W_U$ is equal to the weight M of the moving vehicle. In other words, the following Equation (60) holds:

$$W_D + W_U = M \quad (60)$$

Furthermore, from the resemblance between this state and the state shown in FIG. 17 described above, in the case shown in FIG. 19, the equilibrium conditions for the rotational moments related to the forces operating in the transverse direction of the moving vehicle around its center of mass become the following Equations (61) and (62):

$$W_D \times ((L_T/2)) - B'C') \times \cos\theta = W_O \times ((L_T/2) + B'C') \times \cos\theta \quad (61)$$

$$B'C' = H \times \tan\theta \quad (62)$$

Accordingly, the lower side load $W_D$ and the upper side load $W_U$ can be calculated according to the following Equations (63) and (64):

$$W_D = M \cdot ((L_T/2 + H \cdot \tan\theta)/L_T) \quad (63)$$

$$W_U = M \cdot ((L_T/2 - H \cdot \tan\theta)/L_T) \quad (64)$$

Due to this, if the downward canted direction of the curve is the right side direction, after having calculated the lower side load $W_D$ and the upper side load $W_U$ according to Equations (63) and (64), the friction coefficient information calculation part is able to calculate the normal reaction forces $N_{FL}$ and $N_{RL}$ according to the following Equations (65) and (65-2), and is also able to calculate the normal reaction forces $N_{FR}$ and $N_{RR}$ according to the following Equations (66) and (66-2):

$$N_{FL} = W_U \cdot (W_F/M) \quad (65)$$

$$N_{RL} = W_U \cdot (W_R/M) \quad (65\text{-}2)$$

$$N_{FR} = W_D \cdot (W_F/M) \quad (66)$$

$$N_{RR} = W_D \cdot (W_R/M) \quad (66\text{-}2)$$

Moreover, if the downward canted direction of the curve is the left side direction, the friction coefficient information calculation part is able to calculate the normal reaction forces $N_{FL}$ and $N_{RL}$ according to the following Equations (67) and (67-2), and is also able to calculate the normal reaction forces $N_{FR}$ and $N_{RR}$ according to the following Equations (68) and (68-2):

$$N_{FL} = W_D \cdot (W_F/M) \quad (67)$$

$$N_{RL} = W_D \cdot (W_R/M) \quad (67\text{-}2)$$

$$N_{FR} = W_U \cdot (W_F/M) \quad (68)$$

$$N_{RR} = W_U \cdot (W_R/M) \quad (68\text{-}2)$$

Note that if the weight M of the moving vehicle and the position of the center of mass of the moving vehicle are already known, then, even if no load sensors are mounted to the moving vehicle, it would still be possible to arrange to calculate the ratio ($\mu_2/\mu_1$) according to Equation (32) above by using the results of detection by an acceleration sensor, an angular velocity sensor, and a gyro sensor that are mounted to the moving vehicle and the normal reaction forces $N_1$ and $N_2$ that have been calculated as described above, and to send this ratio that has been calculated to the slip ratio calculation part.

Moreover it would also be acceptable, without performing calculation of the normal reaction forces $N_1$ and $N_2$, to calculate the ratio ($\mu_2/\mu_1$) on the basis of the parameter values that are employed for calculation of the normal reaction forces $N_1$ and $N_2$ and the results of detection by a drive force observer, and to send this ratio that has been calculated to the slip ratio calculation part. For example, if as described above the vehicle is traveling at a constant speed upon a road surface that is almost parallel to the horizontal plane, then, if the front side driving wheel friction coefficient is termed $\mu_1$ and the rear side driving wheel friction coefficient is termed $\mu_2$, then it is possible to calculate the ratio ($\mu_2/\mu_1$) from the ratio ($F_{d2}/F_{d1}$) between the drive force $F_{d2}$ and the drive force $F_{d1}$ and the ratio between the distance $L_R$ and the distance $L_F$, according to the following Equation (69):

$$\mu_2/\mu_1 = (F_{d2}/N_2)/(F_{d1}/N_1) = (F_{d2}/F_{d1}) \cdot (L_R/L_F) \quad (69)$$

In this case as well, it would be acceptable to arrange for the friction coefficient information calculation part to calculate the ratio ($\mu_1/\mu_2$) which is the reciprocal of the ratio ($\mu_2/\mu_1$), and to send this ratio that it has calculated to the slip ratio calculation part.

<Slip Ratio Estimation without Imposing a Difference Upon the Torque Instruction Values>

Furthermore, in the embodiment described above, it is arranged to perform estimation of the slip ratios by imposing an appropriate difference upon the torque instruction values. By contrast, in the following cases, it is possible to perform estimation of the slip ratios even without imposing any difference upon the torque instruction values.

(i) If the position of the center of mass is not centered between the front side driving wheels and the rear side driving wheels, then, even if all of the torque instruction values are the same, usually the normal reaction force acting upon the front side driving wheels and the normal reaction force acting upon the rear side driving wheels are different from one another. Due to this, it is possible to perform slip ratio estimation in a similar manner to the case of "parallel type" torque allocation described above, even though the torque instruction values are all the same.

Note that, since shifting of the load occurs when the vehicle is accelerating or decelerating or when the vehicle is traveling upon an inclined road surface, as a result, it will be acceptable to arrange not to perform slip ratio estimation if the friction coefficient of the front side driving wheels and the friction coefficient of the rear side driving wheels almost agree with one another, or if the rotational speed of the front side driving wheels and the rotational speed of the rear side driving wheels almost agree with one another.

(ii) Even if the position of the center of mass is centered between the front side driving wheels and the rear side driving wheels, since shifting of the load occurs during acceleration or deceleration, when going around a curve, and when traveling upon an inclined road surface, accordingly, even if all the torque instruction values are the same, still a difference is present between the drive force for the front side driving wheels and the drive force for the rear side driving wheels. Accordingly it is possible to estimate the slip ratios, since a difference is created between the friction coefficients. In this case, while it is not possible to estimate the slip ratio during constant speed traveling upon a flat road surface, since it is very important to determine whether or not the road surface is one upon which it is easy to slip, as for example when the vehicle is accelerating or decelerating, when it is going around a curve, or when it is traveling upon an inclined road surface, accordingly it is extremely useful to calculate the slip ratios for these running states.

EXAMPLES

Next, an example of the present invention will be explained with reference to FIG. 20 through FIG. 24.

[Configuration]

Figure 20:
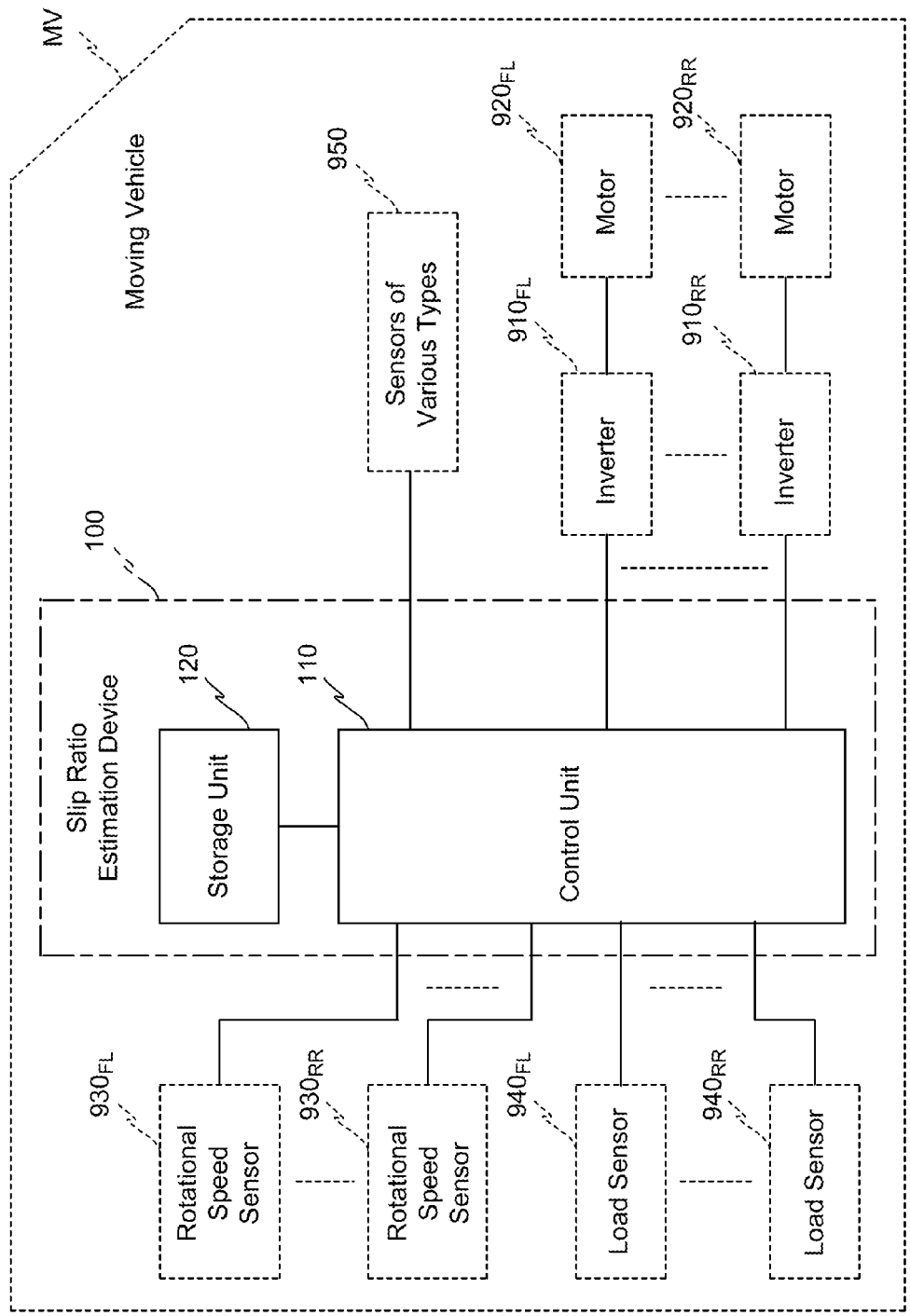
FIG. 20 is a block diagram schematically showing the configuration of a slip ratio estimation device according to an example of the present invention.

FIG. 20 schematically shows the configuration of a slip estimation device 100 according to the example of the present invention. Note that this slip estimation device 100 is one particular implementation of the slip estimation device 700 of the embodiment described above.

As shown in FIG. 20, this slip estimation device 100 comprises a control unit 110 and a storage unit 120. And inverters 910$_j$ (where j=FL, FR, RL, and RR), rotational speed sensors 930$_j$, load sensors 940$_j$, and various sensors 950 are provided to the moving vehicle MV and are connected to the control unit 110.

The control unit 110 comprises a central processing device (i.e. a CPU) that serves as a calculation unit. By executing a program, this control unit 110 fulfills the functions of and serves as the acquisition part 710, as the friction coefficient information calculation part 720, as the slip ratio calculation part 730, and as the torque control part 740 in the slip estimation device 700 of the embodiment described above.

The program that is executed by the control unit 110 is stored in the storage unit 120, and is executed by being loaded from the storage unit. It would also be acceptable to arrange to acquire this program in a format in which it is recorded upon a transportable recording medium such as a CD-ROM, a DVD or the like, or to acquire it via a method in which it is distributed via a network such as the internet or the like.

Note that the processing executed by the control unit 110 will be described hereinafter.

The storage unit 120 stores information and data of various types employed by the control unit 110, such as the program described above. The control unit 110 is adapted to be capable of accessing this storage unit 120.

[Operation]

Next, the operation of the slip estimation device 100 having the configuration described above will be explained.

Note that, in this example, the slip ratio estimation for the state of "parallel type" torque allocation shown in FIG. 10(A) and described above, and the slip ratio estimation for the state of "crossed type" torque allocation shown in FIG. 10(B) and described above, are performed alternatingly.

Moreover, it will be supposed that the rotational speeds $\omega_j$ that are detected are repeatedly sent from the rotational speed sensors $930_j$ to the control unit 110. Moreover, it will be supposed that the normal reaction forces $N_j$ that are detected are repeatedly sent from the load sensors $940_j$ to the control unit 110.

Yet further, it will be supposed that the detection results from the various sensors 950 are sequentially sent to the control unit 110. Furthermore, it will be supposed that the function of a drive force observer is performed by the control unit 110, so that the drive force for each of the driving wheels $WH_j$ is repeatedly calculated.

Figure 21:
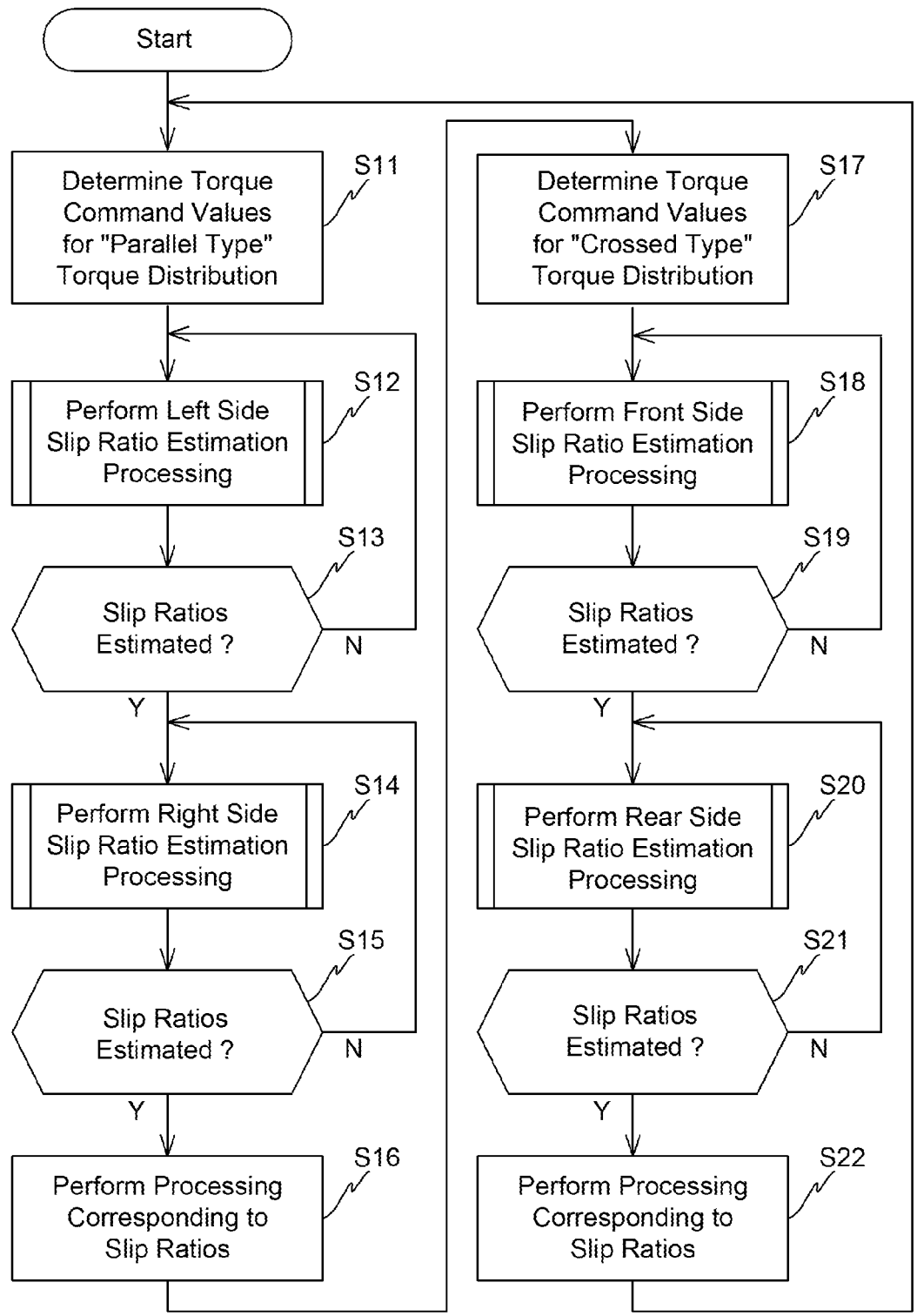
FIG. 21 is a flow chart for explanation of slip ratio estimation processing performed by the device of FIG. 20.

In this example, as shown in FIG. 21, first, during estimation of the slip ratios $\lambda_j$, in a step S11, the control unit 110 determines torque instruction values $T_{m1}$ and $T_{m2}$ for the case of "parallel type" torque distribution. During this determination of the torque instruction values $T_{m1}$ and $T_{m2}$, the torque instruction values $T_{m1}$ and $T_{m2}$ for the case of "parallel type" torque distribution are determined according to Equations (27) and (28) described above, on the basis of the sum total $TT_m$ of the torque instruction values for the driving wheels $WH_{FL}$ through $WH_{RR}$ at the present time point.

Next, the control unit 110 generates torque creation signals on the basis of the torque instruction value $T_{m1}$ that has been determined, and sends these torque creation signals that it has generated to the inverters $910_{FL}$ and $910_{FR}$. Moreover, the control unit 110 generates torque creation signals on the basis of the torque instruction value $T_{m2}$ that has been determined, and sends these torque creation signals that it has generated to the inverters $910_{RL}$ and $910_{RR}$.

Next, in a step S12, the control unit 110 performs estimation processing for the slip ratios $\lambda_{FL}$, and $\lambda_{RL}$ for the left side driving wheels $WH_{FL}$ and $WH_{RL}$. The details of this estimation processing for the slip ratios $\lambda_{FL}$ and $\lambda_{RL}$ will be described hereinafter.

Next, in a step S13, the control unit 110 makes a decision as to whether or not the slip ratios $\lambda_{FL}$ and $\lambda_{RL}$ have been successfully estimated in the directly preceding step S12. If the result of this decision is affirmative (Y in the step S13), then the flow of control proceeds to a step S14 that will be described hereinafter.

But if the result of the decision in the step S13 is negative (N in the step S13), then the flow of control returns to the step S12. And then the processing of the steps S12 and S13 is repeated. Subsequently when the slip ratios $\lambda_{FL}$ and $\lambda_{RL}$ have been estimated and the result of the decision in the step S13 becomes affirmative (Y in the step S13), the flow of control proceeds to the step S14.

In the step S14, the control unit 110 performs estimation processing for the slip ratios $\lambda_{FR}$ and $\lambda_{RR}$ for the right side driving wheels $WH_{FR}$ and $WH_{RR}$. The details of this estimation processing for the slip ratios $\lambda_{FR}$ and $\lambda_{RR}$ will be described hereinafter.

Next, in a step S15, the control unit 110 makes a decision as to whether or not the slip ratios $\lambda_{FR}$ and $\lambda_{RR}$ have been successfully estimated in the directly preceding step S14. If the result of this decision is affirmative (Y in the step S15), then the flow of control proceeds to a step S16 that will be described hereinafter.

But if the result of the decision in the step S15 is negative (N in the step S15), then the flow of control returns to the step S14. And then the processing of the steps S14 and S15 is repeated. Subsequently when the slip ratios $\lambda_{FR}$ and $\lambda_{RR}$ have been estimated and the result of the decision in the step S15 becomes affirmative (Y in the step S15), the flow of control proceeds to the step S16.

In the step S16, the control unit 110 performs processing (hereinafter termed "slip ratio corresponding processing") corresponding to the slip ratios $\lambda_{FL}$, $\lambda_{RL}$, $\lambda_{FR}$, and $\lambda_{RR}$ that have been estimated. During this slip ratio corresponding processing in the step S16, in this example, first, the control unit 110 makes a decision as to whether or not the difference between the average value of the slip ratios $\lambda_{FL}$ and $\lambda_{RL}$ on the left side and the average value of the slip ratios $\lambda_{FR}$ and $\lambda_{RR}$ on the right side is small. If the result of this decision is affirmative, then the flow of control proceeds to a step S17 that will be described hereinafter.

On the other hand, if the result of this decision is negative, then the control unit 110 decides that there is a puddle or a freezing spot on the side on which the average value of the slip ratio is the larger, and changes the sum total $TT_m$ by reducing it according thereto, in order to prevent the running state becoming unstable before it even happens. And then the flow of control proceeds to the step S17.

In the step S17, the control unit 110 determines torque instruction values $T_{m1}$ and $T_{m2}$ for the case of "crossed type" torque distribution in the same manner as in the case of "parallel type" torque distribution described above, on the basis of the sum total $TT_m$ of the torque instruction values for the driving wheels $WH_{FL}$ through $WH_{RR}$ at the present time point. And next, the control unit 110 generates torque creation signals on the basis of the torque instruction value $T_{m1}$ that has been determined, and sends these torque creation signals that have been generated to the inverters $910_{FL}$ and $910_{RR}$. Moreover, the control unit 110 generates torque creation signals on the basis of the torque instruction value $T_{m2}$ that has been determined, and sends these torque creation signals that have been generated to the inverters $910_{FR}$ and $910_{RL}$.

Next, in a step S18, the control unit 110 performs estimation processing for the slip ratios $\lambda_{FL}$ and $\lambda_{FR}$ for the front side driving wheels $WH_{FL}$ and $WH_{FR}$. The details of this estimation processing for the slip ratios $\lambda_{FL}$ and $\lambda_{FR}$ will be described hereinafter.

And next, in a step S19, the control unit 110 makes a decision as to whether or not the slip ratios $\lambda_{FL}$ and $\lambda_{FR}$ in the directly preceding step S18 have been successfully estimated.

If the result of this decision is affirmative (Y in the step S19), then the flow of control proceeds to a step S20 that will be described hereinafter.

But if the result of the decision in the step S19 is negative (N in the step S19), then the flow of control returns to the step S18. And then the processing of the steps S18 and S19 is repeated. Subsequently when the slip ratios $\lambda_{FL}$ and $\lambda_{FR}$ have been estimated and the result of the decision in the step S19 becomes affirmative (Y in the step S19), the flow of control proceeds to the step S20.

In the step S20, the control unit 110 performs estimation processing for the slip ratios $\Delta_{RL}$ and $\lambda_{RR}$ for the rear side driving wheels $WH_A$, and $WH_{RR}$. The details of this estimation processing for the slip ratios $\lambda_{RL}$ and $\lambda_{RR}$ will be described hereinafter.

Next, in a step S21, the control unit 110 makes a decision as to whether or not the slip ratios $\lambda_{RL}$ and $\lambda_{RR}$ in the directly preceding step S20 have been successfully estimated. If the result of this decision is affirmative (Y in the step S21), then the flow of control proceeds to a step S22 that will be described hereinafter.

But if the result of the decision in the step S21 is negative (N in the step S21), then the flow of control returns to the step S20. And then the processing of the steps S20 and S21 is repeated. Subsequently when the slip ratios $\lambda_{RL}$ and $\lambda_{RR}$ have been estimated and the result of the decision in the step S21 becomes affirmative (Y in the step S21), the flow of control proceeds to the step S22.

In the step S22, the control unit 110 performs slip ratio corresponding processing. During this slip ratio corresponding processing in the step S22, in this example, first, the control unit 110 makes a decision as to whether or not the difference between the average value of the slip ratios $\lambda_{FL}$ and $\lambda_{FR}$ on the front side and the average value of the slip ratios $\lambda_{RL}$ and $\lambda_{RR}$ on the rear side is small. If the result of this decision is affirmative, then the flow of control returns to the step S11 described above.

On the other hand, if the result of this decision is negative, then the control unit 110 decides that the state of the road surface has changed, and accordingly changes the sum total $TT_m$, in order to prevent the running state becoming unstable before it even happens. And then the flow of control returns to the step S11.

Subsequently, the processing of the steps S11 through S22 is repeated. As a result, estimation of the slip ratios $\lambda_1$ is sequentially performed.

<Processing for Estimation of the Left Side Slip Ratios and the Right Side Slip Ratios>

Next, the estimation processing for the left side slip ratios $\lambda_{FL}$ and $\lambda_{RL}$ performed in the step S12, and the estimation processing for the right side slip ratios $\lambda_{FR}$ and $\lambda_{RR}$ performed in the step S14, will be explained.

<<Processing for Estimation of the Left Side Slip Ratios>>

First, the processing for estimation of the slip ratios $\lambda_{FL}$ and $\lambda_{RL}$ on the left side will be explained.

Figure 22:
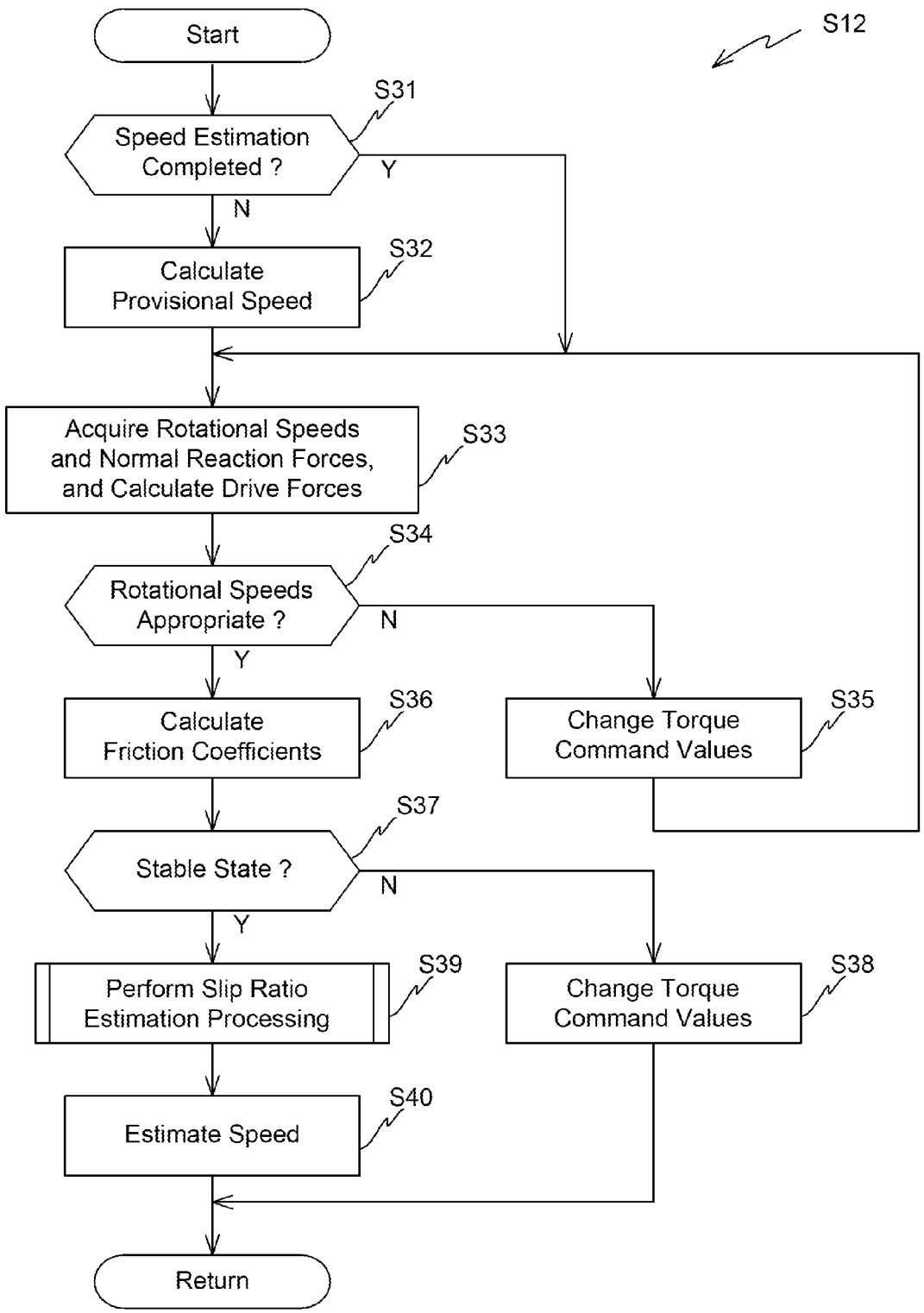
FIG. 22 is a flow chart for explanation of left side slip ratio estimation processing in FIG. 21.

During this processing for estimation of the slip ratios $\lambda_{FL}$ and $\lambda_{RL}$ on the left side, as shown in FIG. 22, first in a step S31 the control unit 110 makes a decision as to whether or not estimation of the speed of the moving vehicle MV is completed performed. If the result of this decision is affirmative (Y in the step S31), then the flow of control is transferred to a step S33 that will be described hereinafter.

But if the result of this decision in the step S31 is negative (N in the step S31), then the flow of control proceeds to a step S32. In this step S32, the control unit 110 calculates a provisional speed $v_T$ ($=r \cdot \omega_{FL}$) on the basis of the rotational speed $\omega_{FL}$ that has been received most recently and the radius r of the driving wheel $WH_{FL}$ which is already known. Then the flow of control proceeds to the step S33.

Note that, as will be described hereinafter, the control unit 110 considers the provisional speed $v_T$ as being the speed v until the speed v is estimated.

In the step S33, the control unit 110 acquires the rotational speed $W_{FL}$ and the normal reaction force $N_{FL}$ of the driving wheel $WH_{FL}$ at its present position, and also calculates the drive force of the driving wheel $WH_{FL}$ at its current position. Next, on the basis of the speed v and the distance along the direction of travel of the driving wheel $WH_{FL}$ and the driving wheel $WH_{RL}$ which are already known, the control unit 110 acquires the rotational speed $\omega_{RL}$ and the normal reaction force $N_{RL}$ of the driving wheel $WH_{RL}$ at the time point that it is decided that the driving wheel $WH_{RL}$ has arrived at the same position as the position at which the rotational speed $\omega_{FL}$ was acquired, and calculates the drive force of the driving wheel $WH_{RL}$.

Then in a step S34 the control unit 110 compares together the rotational speed $\omega_{FL}$ that has been acquired and the rotational speed $\omega_{RL}$, and makes a decision as to whether or not the difference between the rotational speed $\omega_{FL}$ and the rotational speed $W_{RL}$ is appropriate for estimation of the slip ratios $\lambda_{FL}$ and $\lambda_{RL}$. Here, the control unit 110 determines the appropriateness or otherwise of the rotational speed $\omega_n$, and the rotational speed $\omega_{RL}$ by making a decision as to whether or not the difference between the rotational speed $\omega_{FL}$ and the rotational speed $\omega_{RL}$ is within a first predetermined range. This first predetermined range is determined in advance from the standpoint of performing estimation of the slip ratios $\lambda_{FL}$ and $\lambda_{RL}$ with good accuracy.

If the result of the decision in the step S34 is affirmative (Y in the step S34), then the flow of control is transferred to a step S36 that will be described hereinafter. On the other hand, if the result of the decision in the step S34 is negative (N in the step S34), then the flow of control proceeds to a step S35.

In the step S35, the control unit 110 performs changing of the torque instruction values $T_{m1}$ and $T_{m2}$. Here, if the difference between the rotational speed $\omega_{FL}$ and the rotational speed $\omega_{RL}$ is too small, then the control unit 110 performs changing so as to increase the difference between the torque instruction value $T_{m1}$ and the torque instruction value $T_{m2}$. Moreover, if the difference between the rotational speed $\omega_{FL}$ and the rotational speed $\omega_{RL}$ is too great, then the control unit 110 performs changing so as to reduce the difference between the torque instruction value $T_{m1}$ and the torque instruction value $T_{m2}$.

Next, the control unit 110 generates torque creation signals on the basis of the torque instruction value $T_{m1}$ that has been changed, and sends these torque creation signals that it has generated to the inverters $910_{FL}$ and $910_{FR}$. Moreover, the control unit 110 generates torque creation signals on the basis of the torque instruction value $T_{m2}$ that has been changed, and sends these torque creation signals that it has generated to the inverters $910_{RL}$ and $910_{RR}$. Then the flow of control returns to the step S33.

Subsequently the processing of the steps S33 through S35 is repeated. And, when the result of the decision in the step S34 becomes affirmative (Y in the step S34), the flow of control is transferred to the step S36.

In the step S36, the control unit 110 calculates the friction coefficients $\mu_{FL}$ and $\mu_{RL}$ on the basis of the normal reaction forces $N_{FL}$ and $N_{RL}$ that have been acquired and the drive forces of the driving wheels $WH_{FL}$ and $WH_{RL}$ that have been calculated. This calculation is performed by using Equation (3) described above.

Next in a step S37 the control unit 110 compares together the frictional coefficient $\mu_{FL}$ that has been calculated and the frictional coefficient $\mu_{RL}$, and makes a decision as to whether or not the moving vehicle MV is in a stable state. Here, the control unit 110 makes this decision as to whether or not the moving vehicle MV is in a stable state by making a decision as to whether or not the difference between the frictional coefficient $\mu_{FL}$ and the frictional coefficient $\mu_{RL}$ is within a second predetermined range. This second predetermined range is determined in advance from the standpoint of being able to determine that the moving vehicle MV is in a stable state with good accuracy.

If the result of the decision in the step S37 is negative (N in the step S37), then the flow of control proceeds to a step S38. And, in this step S38, the control unit 110 performs changing to reduce the sum total $TT_m$, in order to eliminate this situation in which the moving vehicle MV is in an unstable state.

When the processing of the step S38 ends, the processing of the step S12 terminates. And the flow of control proceeds to the step S13 of FIG. 21 described above.

If the result of the decision in the step S37 described above is affirmative (Y in the step S37), then the flow of control is transferred to a step S39. In this step S39, the control unit 110 performs calculation processing for the slip ratios $\lambda_{FL}$ and $\lambda_{RL}$ on the basis of the friction coefficients $\mu_{FL}$ and $\mu_{RL}$ that have been calculated, and on the basis of the rotational speeds $\omega_{FL}$ and $\omega_{RL}$ at the position of calculation of those friction coefficients $\mu_n$, and $\mu_{RL}$. This calculation processing for the slip ratios will be described hereinafter.

And next, in a step S40, the control unit 110 performs estimation of the speed v. During this estimation of the speed v, the control unit 110 calculates an estimated value for the speed v using Equation (8) described above or Equation (15) described above, on the basis of the pair of the rotational speed $\omega_{FL}$ and the slip ratio $\lambda_{FL}$, or on the basis of the pair of the rotational speed $\omega_{RL}$, and the slip ratio $\lambda_{RL}$. When the estimation of the speed v in this manner has been completed, the processing of the step S12 terminates. And then the flow of control is transferred to the step S13 of FIG. 21 described above.

(Processing for Calculating the Slip Ratios)

Next, the slip ratio estimation processing performed in the step S39 described above will be explained.

Figure 23:
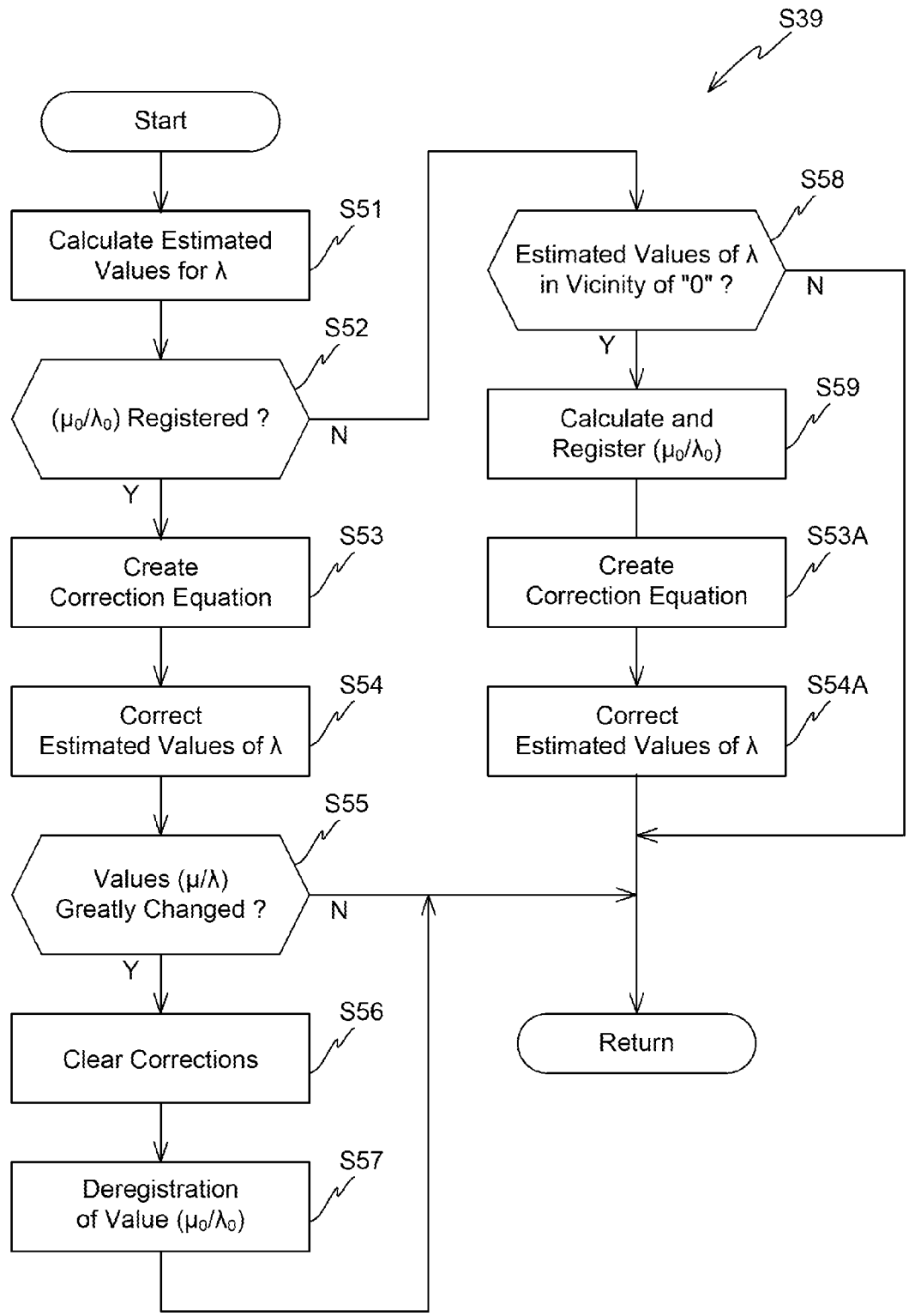
FIG. 23 is a flow chart for explanation of the left side slip ratio estimation processing in FIG. 22.

During this slip ratio estimation processing, as shown in FIG. 23, first in a step S51, using Equations (11) and (12) or using Equations (18) and (19) above, the control unit 110 calculates estimated values of $\lambda$ for the driving wheels $WH_{FL}$ and $WH_{RL}$. Next, in a step S52, the control unit 110 makes a decision as to whether or not the value of the ratio $(\mu_0/\lambda_0)$ between the slip ratio and the friction coefficient in the vicinity of slip ratio $\lambda$ being "0" is registered. If the result of this decision is affirmative (Y in the step S52), the flow of control proceeds to a step S53.

In this step S53, on the basis of the value $(\mu_0/\lambda_0)$, and using Equations (30) and (31), the control unit 110 determines the coefficients A and B in Equation (29), and thus creates a correction equation. And next, in a step S54, the control unit 110 calculates corrected values for by correcting the estimated values of $\lambda$ according to this correction equation that has been created.

Next, in a step S55, the control unit 110 makes a decision as to whether or not the value of the ratio $(\mu/\lambda)$ between the slip ratio and the friction coefficient at the present time point is greatly changed from the value $(\mu_0/\lambda_0)$. If the result of this decision is negative (N in the step S55), then the control unit 110 determines the final slip ratios $\lambda_{FL}$ and $\lambda_{RL}$ as being the corrected values for $\lambda$. And then the processing of the step S39 terminates. Subsequently, the flow of control proceeds to the step S40 of FIG. 22 described above.

But if the result of the decision in the step S55 is affirmative (Y in the step S55), then the flow of control proceeds to a step S56. In this step S56, the control unit 110 clears the correction in the step S54, and determines the final slip ratios) $\lambda_{FL}$ and $\lambda_{RL}$ as being the estimated values for $\lambda$.

And next, in a step S57, the control unit 110 performs deregistration of the value $(\mu_0/\lambda_0)$. And then the processing of the step S39 terminates. Subsequently, the flow of control proceeds to the step S40 of FIG. 22 described above.

But if the result of the decision in the step S52 described above is affirmative (Y in the step S52), then the flow of control proceeds to a step S58. In this step S58, the control unit 110 makes a decision as to whether or not the estimated values of in this cycle of the program are in the vicinity of "0". If the result of this decision is negative (N in the step S58), then the final slip ratios $\lambda_{FL}$ and $\lambda_{RL}$ are determined as being the estimated values for $\lambda$. And then the processing of the step S39 terminates. Subsequently, the flow of control proceeds to the step S40 of FIG. 22 described above.

But if the result of the decision in the step S58 is affirmative (Y in the step S58), then the flow of control proceeds to a step S59. In this step S59, the value $(\mu/\lambda)$ at the present time point is calculated as being the value $(\mu_0/\lambda_0)$, and is registered.

Next in a step S53A the control unit 110 creates a correction equation, in a similar manner to the case in the step S53 described above. And next in a step S54A, in a similar manner to the case in the step S54 described above, the control unit 110 calculates corrected values for $\lambda$ by correcting the estimated values of $\lambda$ according to this correction equation that has been created, and determines the final slip ratios $\lambda_{FL}$ and $\lambda_{RL}$ as being the corrected values for $\lambda$ that have thus been calculated. And then the processing of the step S39 terminates. Subsequently, the flow of control proceeds to the step S40 of FIG. 22 described above.

<<Processing for Estimation of the Right Side Slip Ratios>>

Next, the processing in the step S14 for the estimation of the slip ratios $\lambda_{FR}$ and $\lambda_{RR}$ on the right side will be explained.

During this estimation of the slip ratios $\lambda_{FR}$ and $\lambda_{RR}$ for the driving wheels $WH_{FR}$ and $WH_{RR}$ on the right side, the estimation processing is performed in a similar manner to that for the slip ratios $\lambda_{FL}$ and $\lambda_{RL}$ described above, except for the fact that the driving wheels that are the subjects for slip ratio estimation are changed from the left side driving wheels $WH_{FL}$ and $WH_{RL}$ to the right side driving wheels $WH_{FR}$ and $WH_{RR}$. In other words, when estimating the slip ratios $\lambda_{FR}$ and $\lambda_{RR}$, the control unit 110 executes processing similar to that shown in FIG. 22 and described above.

<Processing for Estimation of the Front Side Slip Ratios and the Rear Side Slip Ratios>

Next, the processing in the step S18 for the estimation of the slip ratios $\lambda_{FL}$ and $\lambda_{FR}$ on the front side and the processing in the step S20 for the estimation of the slip ratios $\lambda_{RL}$ and $\lambda_{RR}$ on the rear side will be explained.

<<Processing for Estimation of the Front Side Slip Ratios>>

First, the processing in the step S18 for the estimation of the slip ratios $\lambda_{FL}$ and $\lambda_{FR}$ on the front side will be explained.

Figure 24:
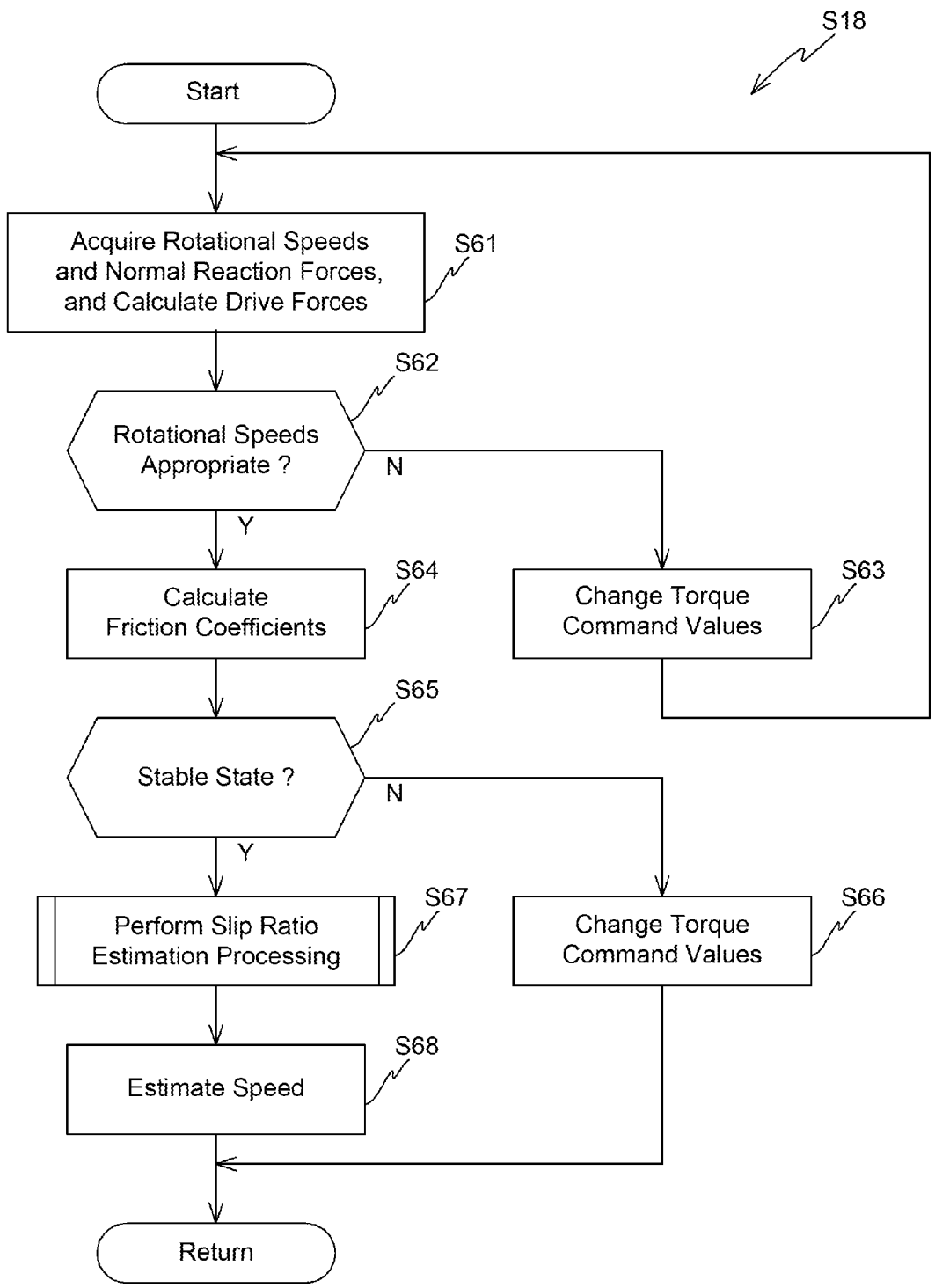
FIG. 24 is a flow chart for explanation of front side slip ratio estimation processing in FIG. 21.

During this processing for estimation of the slip ratios $\lambda_{FL}$ and $\lambda_{FR}$ on the front side, as shown in FIG. 24, first in a step S61 the control unit 110 acquires the rotational speed $\omega_n$, and the normal reaction force $N_{FL}$ of the driving wheel $WH_{FL}$ at the current time point, and calculates the drive force of the driving wheel $WH_{FL}$ at its current position. Moreover, the control unit 110 acquires the rotational speed $\omega_{FR}$ and the normal reaction force $N_{FR}$ of the driving wheel $WH_{FR}$ at the current time point, and calculates the drive force of the driving wheel $WH_{FR}$ at its current position.

Next in the step S62 the control unit 110 compares together the rotational speed $\omega_{FL}$ and the rotational speed $\omega_{FR}$, and makes a decision as to whether or not the difference between the rotational speed $\omega_{FL}$ and the rotational speed $\omega_{FR}$ is appropriate for estimation of the slip ratios $\lambda_{FL}$ and $\lambda_{FR}$, in a similar manner to the case for the decision as to the appropriateness of the rotational speed $\omega_{FL}$ and the rotational speed $\omega_{RL}$ in the step S34 described above (refer to FIG. 22).

If the result of this decision in the step S62 is affirmative (Y in the step S62), then the flow of control is transferred to a step S64 that will be described hereinafter. On the other hand, if the result of this decision in the step S62 is negative (N in the step S62), then the flow of control proceeds to a step S63.

In the step S63, the control unit 110 performs changing of the torque instruction values $T_{m1}$ and $T_{m2}$, in a similar manner to the case in the step S35 described above (refer to FIG. 22). Subsequently the processing of the steps S61 through S63 is repeated. And when the result of the decision in the step S62 becomes affirmative (Y in the step S62), the flow of control proceeds to the step S64.

Subsequently, in the steps S64 through S68, the control unit 110 performs processing that is similar to the processing in the steps S36 through S40 described above (refer to FIG. 22). And, when the processing of the step S18 terminates, the flow of control is transferred to the step S19 of FIG. 21 described above.

<<Processing for Estimation of the Rear Side Slip Ratios>>

Next, the processing in the step S20 for the estimation of the slip ratios $\lambda_{RL}$ and $\lambda_{RR}$ on the rear side will be explained.

During this estimation of the slip ratios $\lambda_{U}$, and $\lambda_{RR}$ for the driving wheels $WH_{RL}$ and $WH_{RR}$ on the rear side, the estimation processing is performed in a similar manner to that for the slip ratios $\lambda_{FL}$ and $\lambda_{FR}$ described above, except for the fact that the driving wheels that are the subjects for slip ratio estimation are changed from the front side driving wheels $WH_{FL}$ and $WH_{FR}$ to the rear side driving wheels $WH_{RL}$ and $WH_{RR}$. In other words, when estimating the slip ratios $\lambda_{RL}$ and $\lambda_{RR}$, the control unit 110 executes processing similar to that shown in FIG. 24 and described above.

As has been explained above, in this example, the control unit acquires the rotational speeds $\omega_{FL}$, $\omega_{FR}$, $\omega_{RL}$, and $\omega_{RR}$ of the plurality of driving wheels $WH_{FL}$, $WH_{FR}$, $WH_{RL}$, and $WH_{RR}$ possessed by the moving vehicle MV, and the normal reaction forces $N_{FL}$, $N_{FR}$, $N_{RL}$, and $N_{RR}$ acting upon the plurality of driving wheels $WH_{FL}$, $WH_{FR}$, $WH_{RL}$, and $WH_{RR}$. Next, the control unit 110 calculates the friction coefficients $\mu_{FL}$, $\mu_{FR}$, $\mu_{RL}$, and $\mu_{RR}$ relating to the plurality of driving wheels $WH_{FL}$, $WH_{FR}$, $WH_{RL}$, and $WH_{RR}$, on the basis of the torque instruction values for the plurality of driving wheels $WH_{FL}$, $WH_{FR}$, $WH_{RL}$, and $WH_{RR}$, and their rotational speeds $\omega_{FL}$, $\omega_{FR}$, $\omega_{RL}$, and $\omega_{RR}$ and the normal reaction forces $N_{FL}$, $N_{FR}$, $N_{RL}$, and $N_{RR}$ that have been acquired. And the control unit 110 calculates the slip ratios $\lambda_{FL}$, $\lambda_{FR}$, $\lambda_{RL}$, and $\lambda_{RR}$ for the plurality of driving wheels $WH_{FL}$, $WH_{FR}$, $WH_{RL}$, and $WH_{RR}$ on the basis of the friction coefficients $\mu_{FL}$, $\mu_{FR}$, $\mu_{RL}$, and $\mu_{RR}$ that have been calculated and the rotational speeds $\omega_{FL}$, $\omega_{FR}$, $\omega_{RL}$, and $\omega_{RR}$ that have been acquired.

Thus, according to this example, it is possible to estimate the slip ratio for each of the driving wheels easily and rapidly, and with good accuracy.

In this example, by performing torque control, the control unit 110 performs slip ratio estimation for the case of "parallel type" torque allocation and performs slip ratio estimation for the case of "crossed type" torque allocation. Due to this, according to this example, it is possible to perform torque control corresponding to the state of the road surface upon which the moving vehicle MV is traveling.

Moreover, in this example, the control unit performs correction processing for the slip ratios that are initially calculated on the basis of the ratio ($\mu/\lambda$) of the friction coefficient to the slip ratio in the neighborhood of equal to "0". Due to this, it is possible to perform estimation of the slip ratios in correspondence to the states of the road surface at the positions of the driving wheels at the time points at which the slip ratios are calculated with extremely good accuracy.

Modification of the Example

The present invention is not to be considered as being limited to the example described above; it may be altered in various ways.

For example, in the example, the present invention was applied to a case in which the moving vehicle had four driving wheels that were capable of being driven independently. By contrast, the present invention is not limited to such a case in which the moving vehicle has four driving wheels; it is possible to estimate the slip ratios by applying the present invention, provided that the moving vehicle has any plurality of driving wheels that are capable of being driven independently.

Moreover, in the example, it is arranged for the control unit 110 to calculate slip ratios during "parallel type" torque distribution and during "crossed type" torque distribution, after has calculated the torque instruction values $T_{m1}$ and $T_{m2}$ for slip ratio estimation during "parallel type" torque distribution and during "crossed type" torque distribution on the basis of the rotational speeds $\omega_j$ the results of detection sent from the various sensors 950, and the slip ratios that have been calculated. By contrast, as the modification of the embodiment, as described above, it would also be acceptable to arrange for the control unit to calculate slip ratios while performing only one or the other of "parallel type" torque distribution and during "crossed type" torque distribution, and to estimate a slip ratio for each of the driving wheels with the range of practicability, while performing traction control in order to ensure safe traveling.

Moreover, in the example, it was arranged to calculate the friction coefficients $\mu_j$ on the basis of the normal reaction forces $N_j$ detected by the load sensors $940_j$ (where j=FL, FR, RL, and RR). By contrast, if the weight M of the moving vehicle and the position of the center of mass of the moving vehicle are already known, then it would also be acceptable not to employ any load sensors, but rather to arrange to estimate the normal reaction forces $N_j$ on the basis of the results of detection by an acceleration sensor, an angular velocity sensor, and a gyro sensor that are mounted to the moving vehicle. In this case it would be possible to calculate the normal reaction forces $N_j$, as described in the above explanation of an embodiment.

In other words, if the moving vehicle is traveling at constant speed on a road surface that is almost parallel to the horizontal plane, then it would be acceptable to calculate the normal reaction forces by employing Equations (35) through (38) described above. Moreover, if the moving vehicle is traveling on a road surface that is almost parallel to the horizontal plane while accelerating or decelerating, then it would be acceptable to calculate the normal reaction forces by employing Equations (41) through (44) described above.

Furthermore, if the moving vehicle is traveling on a road surface that is inclined at a gradient, then it would be acceptable to calculate the normal reaction forces by employing Equations (37), (38), (47), and (48) described above. Yet further, if the moving vehicle is traveling around a curve upon a road surface that is almost parallel to the horizontal plane, then it would be acceptable to calculate the normal reaction forces by employing Equations (54) through (59-2) described above. Even further, if the moving vehicle is traveling upon a road surface that is canted sideways, then it would be acceptable to calculate the normal reaction forces by employing Equations (63) through (68-2) described above.

Moreover, in the example, it was arranged to perform slip ratio estimation while imposing an appropriate difference upon the torque instruction values. By contrast, as described in the embodiment explained above, in the following cases, it is possible to perform slip ratio estimation without imposing any difference upon the torque instruction values.

(i) If the position of the center of mass is not centered between the front side driving wheels and the rear side driving wheels.

This case is when the distance $L_F$ and the distance $L_R$ in FIG. 15 through FIG. 17 described above are different. In this case, as explained in connection with the modification of the embodiment described above, it is possible to perform slip ratio estimation even if all the torque instruction values are the same.

Figure 25:
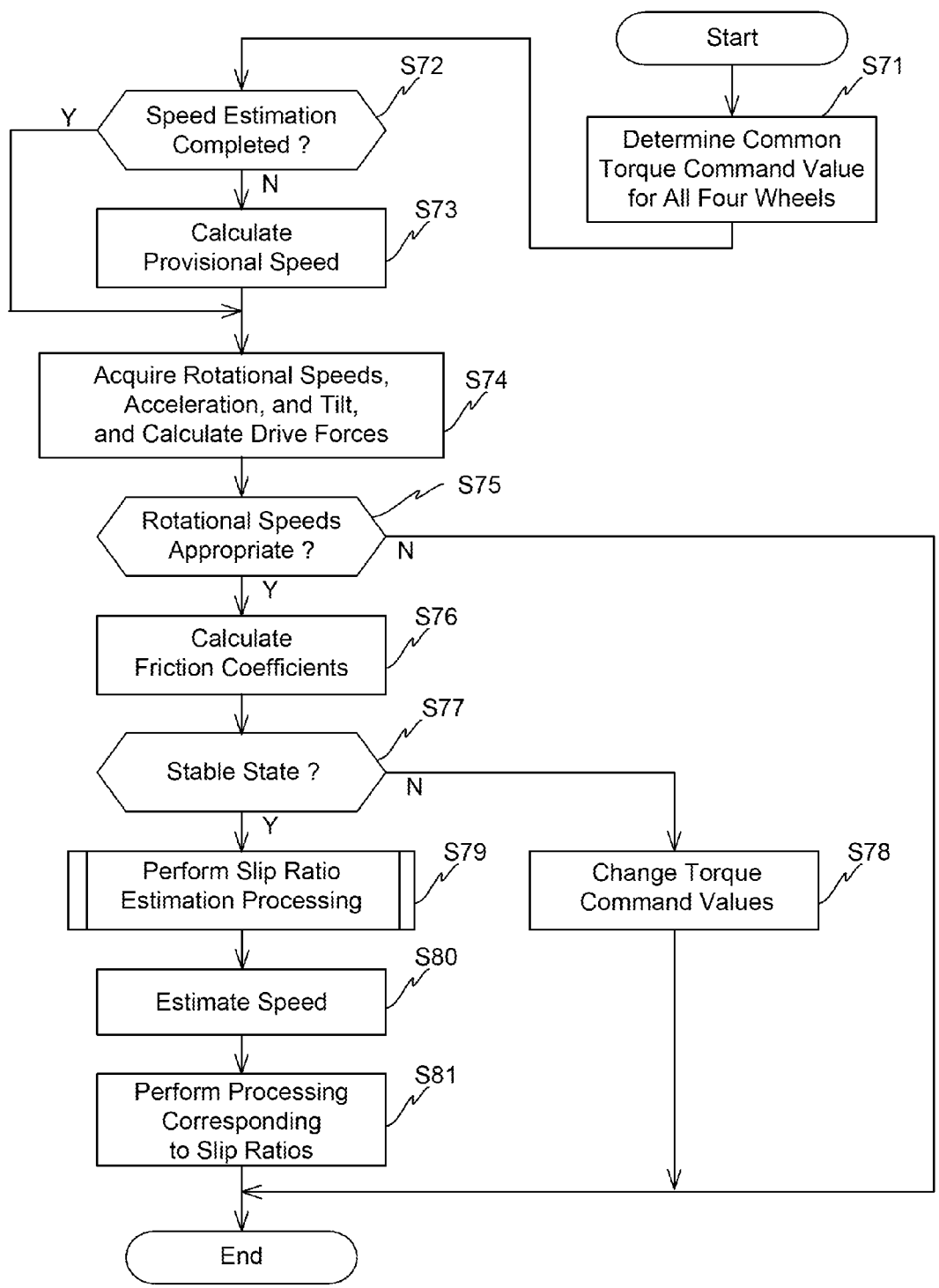
FIG. 25 is a flow chart for explanation of the first variant embodiment of slip ratio estimation processing.

In this slip ratio estimation, as shown in FIG. 25, first in a step S71 the control unit determines a common torque instruction value for all the four wheels, and designates that torque instruction value for all the motors.

And next, in steps S72 and S73, the speed v is estimated by performing processing similar to that performed in the case of the steps S31 and S32 in FIG. 22 described above. And then, in a step S74, the control unit acquires the rotational speeds of the front side driving wheels at the present time point, the acceleration as detected by an acceleration sensor, and the tilt angle as detected by a tilt sensor such as a gyro sensor or the like, and calculates the drive forces for the front side driving wheels. Moreover, on the basis of the speed v and the distance along the direction of travel between the front side driving wheels and the rear side driving wheels which are already known, the control unit acquires the rotational speeds of the rear side driving wheels at the time point that it is decided that the rear side driving wheels have arrived at the same position as the position at which the rotational speeds of the front side driving wheels were acquired, and calculates the drive forces for the rear side driving wheels.

Note that, since in general the acceleration and the tilt angle do not change greatly between the time point of acquisition of the rotational speeds of the front side driving wheels and the time point of acquisition of the rotational speeds of the rear side driving wheels, accordingly acquisition of the acceleration and the tilt angle at the time point of acquisition of the rotational speeds of the rear side driving wheels is omitted.

Next, in a step S75, in a similar manner to the case for the step S34 of FIG. 22 described above, a decision is made as to whether or not the difference between the rotational speeds of the driving wheels is appropriate for slip ratio estimation. If the result of this decision is negative (N in the step S75), then the control unit does not perform slip ratio estimation, and the flow of control terminates.

But if the result of this decision in the step S75 is affirmative (Y in the step S75), then the flow of control proceeds to a step S76. In this step S76, the control unit calculates the friction coefficients.

During this calculation of the friction coefficients, first, the control unit calculates the normal reaction forces upon the driving wheels by employing Equations (35) through (38), Equations (41) through (44), Equations (47) and (48), Equations (54) through (59-2), and/or Equations (63) through (68-2), as appropriate. And next, the control unit calculates the friction coefficients for the front side driving wheels and for the rear side driving wheels according to Equation (3) described above.

Next, in steps S77 through S80, similar processing is executed to that in the case of the steps S37 through S40 in FIG. 22 described above. And, when the slip ratios have been estimated in the step S79, after the processing of the step S80 has been performed, in a step S81 similar processing is performed to that in the case of the step S16 of FIG. 21 described above.

(ii) If, even though the position of the center of mass is centered between the front side driving wheels and the rear side driving wheels, load shifting is taking place during acceleration or deceleration, while the vehicle is going around a curve, or during traveling upon an inclined road surface.

This case is when the distance $L_F$ and the distance $L_R$ in FIG. 15 through FIG. 17 described above are the same. In this case, as explained in connection with the modification of the embodiment described above, even though all the torque instruction values are the same, a difference between the drive forces for the various drive wheels is generated, except for when the vehicle is traveling upon a flat road surface at a constant speed. Accordingly, it is possible to estimate the slip ratios, since there is a difference between the friction coefficients.

Figure 26:
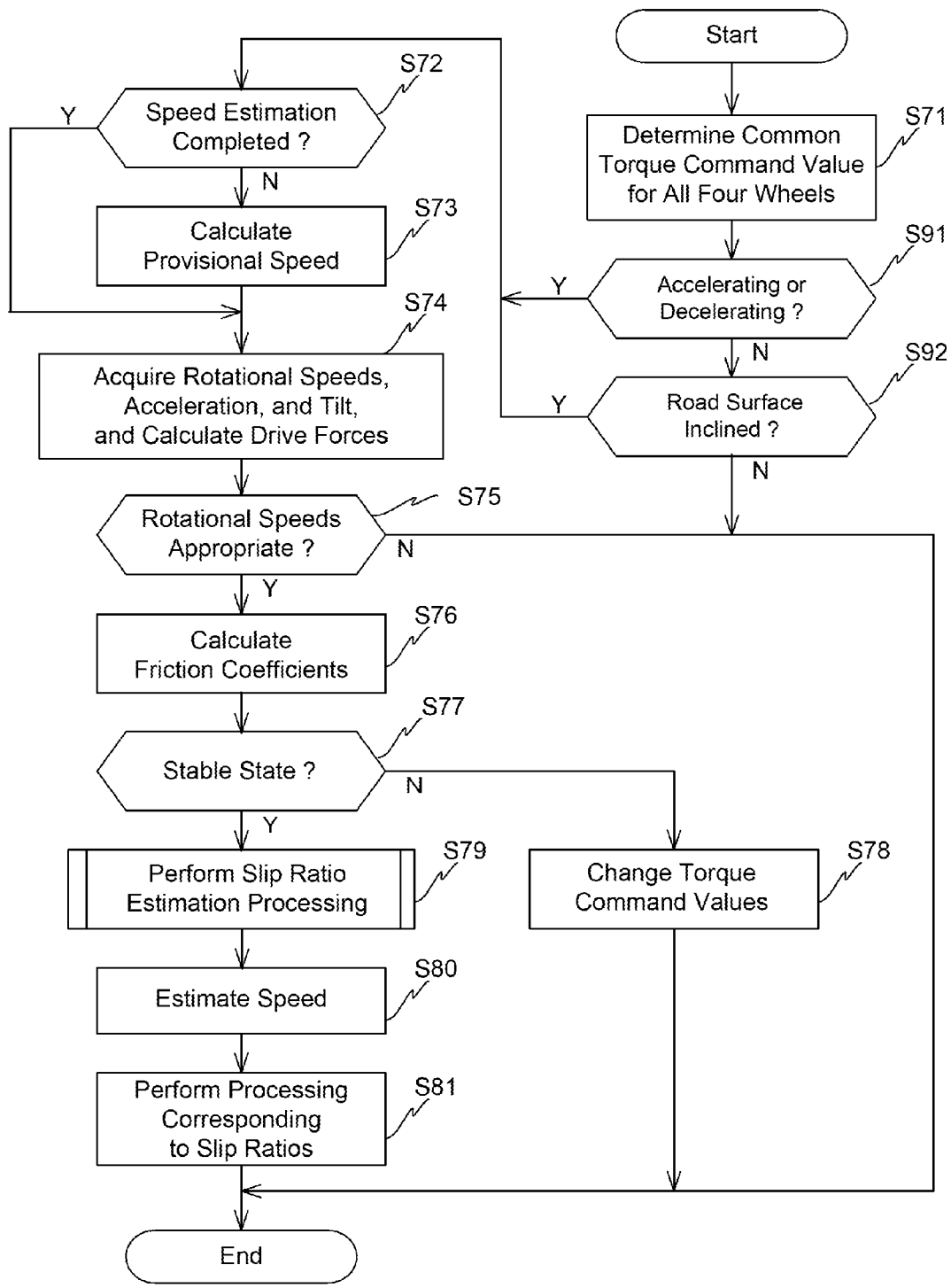
FIG. 26 is a flow chart for explanation of the second variant embodiment of slip ratio estimation processing.

During this estimation of the slip ratios, as shown in FIG. 26, first, in a similar manner to the case with FIG. 25 described above, in a step S71, the control unit determines a common torque instruction value for all the four wheels, and designates that torque instruction value for all the motors. And next, in a step S91, on the basis of the results of acceleration detection from the acceleration sensor, the control unit makes a decision as to whether or not the moving vehicle is accelerating or is decelerating, or is traveling around a curve.

If the result of the decision in the step S91 is negative (N in the step S91), then the flow of control proceeds to a step S92. In this step S92, on the basis of the tilt angle as detected by a tilt sensor, the control unit makes a decision as to whether or not the moving vehicle is traveling upon a road surface that is inclined. If the result of this decision is negative (N in the step S92), then the control unit does not perform slip ratio estimation, and the flow of control terminates.

But if the result of the decision in the step S91 or the step S92 is affirmative (Y in the step S91 or Y in the step S92), then the flow of control is transferred to the step S72. And subsequently, in a similar manner to the case in FIG. 25 described above, the processing of steps S72 through S81 is executed.

As will be clear from the details explained above, it should be understood that, whatever the values of the torque values supplied to the driving wheels may be, it still becomes possible to calculate the slip ratios, provided that some predetermined condition is satisfied. In other words, if the rotational speeds $\omega_{FL}$, $\omega_{FR}$, $\omega_{RL}$, and $\omega_{RR}$ of the plurality of driving wheels $WH_{FL}$, $WH_{FR}$, $WH_{RL}$, and $WH_{RR}$ possessed by the moving vehicle are acquired and the friction coefficients $\mu_{FL}$, $\mu_{FR}$, $\mu_{RL}$, and $\mu_{RR}$ are calculated, provided that there is a combination of driving wheels for which the difference of rotational speeds as shown in the step S34 of FIG. 22 is within the first predetermined range and also the difference of friction coefficients as shown in the step S37 of FIG. 22 is within the second predetermined range, then it is possible to calculate the slip ratios from this combination of the driving wheels, by using Equations (11) and (12), or by using Equations (18) and (19). Accordingly, even if for example anti-slip control or the like is implemented independently for all of the driving wheels and the torque values supplied to all of the driving wheels are not approximately equal to one another, it still becomes possible to calculate the slip ratios from the rotational speeds of the driving wheels and the values of their friction coefficients.

The invention claimed is:

1. A slip ratio estimation device that estimates a slip ratio of each of a plurality of driving wheels possessed by a moving vehicle, comprising:
   a rotational speed acquisition part that acquires a rotational speed of each of said plurality of driving wheels;
   a normal reaction force information acquisition part that acquires an information of normal reaction force upon each of said plurality of driving wheels;
   a torque control part configured to determine a torque instruction value for each of said plurality of driving wheels, and to control a torque amount for each of said plurality of driving wheels on the basis of said torque instruction values that have been determined;
   a friction coefficient information calculation part configured to calculate friction coefficient information related to each of said plurality of driving wheels, on the basis of a torque instruction value for each of said plurality of driving wheels, results of acquisition by said rotational speed acquisition part, and results of acquisition by said normal reaction force information acquisition part; and
   a slip ratio calculation part configured to calculate the slip ratio of each of said plurality of driving wheels, on the basis of the rotational speeds acquired by said rotational speed acquisition part and the results of calculation by said friction coefficient information calculation part, wherein,
   said slip ratio calculation part calculates a slip ratio of a first object wheel and a slip ratio of a second object wheel based on i) a first rotational speed of the first object wheel, ii) a second rotational speed of the second object wheel, iii) a difference between the first rotational speed and the second rotational speed, and iv) a ratio of a friction coefficient of the first object wheel and a friction coefficient of the second object wheel, the first object wheel being included in at least one of first driving wheels among said plurality of driving wheels, the second object wheel included in at least one of second driving wheels among said plurality of driving wheels, said second driving wheels being different from said first driving wheels, and
   said slip ratio calculation part calculates the slip ratio of each of said plurality of driving wheels in at least one of manners of the following (a) and (b):
   (a) when said torque control part determines i) to give the same torque instruction values to both said first driving wheels and said second driving wheels, and ii) that the normal reaction force upon said first object wheel and the normal reaction force upon said second object wheel are different, said slip ratio calculation part performs a slip ratio calculating processing for each of said plurality of driving wheels, and
   (b) when said torque control part determines to give mutually different torque instruction values for said first driving wheels and for said of second driving wheels, said slip ratio calculation part performs the slip ratio calculating processing for each of said plurality of driving wheels without considering that the normal reaction force upon said first object wheel and the normal reaction force upon said second object wheel are different or not different.

2. The slip ratio estimation device according to claim 1, wherein
   said plurality of driving wheels are a left side front driving wheel, a right side front driving wheel, a left side rear driving wheel, and a right side rear driving wheel, when taking the forward direction as reference,
   said first driving wheels are said left side front driving wheel and said right side front driving wheel, and said second driving wheels are said left side rear driving wheel and said right side rear driving wheel.

3. The slip ratio estimation device according to claim 1, wherein
   said plurality of driving wheels are a left side front driving wheel, a right side front driving wheel, a left side rear driving wheel, and a right side rear driving wheel, when taking the forward direction as reference,
   said first driving wheels are said left side front driving wheel and said right side rear driving wheel; and
   said second driving wheels are said left side rear driving wheel and said right side front driving wheel.

4. The slip ratio estimation device according to claim 1, further comprising:
   a slip ratio correction part that corrects the slip ratios calculated by said slip ratio calculation part according to a correction equation that is determined according to the friction coefficient information calculated by said friction coefficient information calculation part and said calculated slip ratios.

5. The slip ratio estimation device according to claim 1, wherein,
   (a) when said torque control part determines i) to give the same torque instruction values to both said first driving wheels and said second driving wheels, and ii) that the normal reaction force upon said first object wheel and the normal reaction force upon said second object wheel are different, said slip ratio calculation part performs the slip ratio calculating processing for each of said plurality of driving wheels, and
   (b) when said torque control part determines to give mutually different torque instruction values for said first driving wheels and for said of second driving wheels, said slip ratio calculation part performs the slip ratio calculating processing for each of said plurality of driving wheels without considering that the normal reaction force upon said first object wheel and the normal reaction force upon said second object wheel are different or not different.

6. The slip ratio estimation device according to claim 1, wherein,
   using the following equations:

$$\lambda_1 = (\omega_2 - \omega_1)/(\mu_2/\mu_1) \cdot \omega_2 - \omega_1)$$

$$\lambda_2 = (\omega_2 - \omega_1)/(\omega_2 - (\mu_1/\mu_2) \cdot \omega_1)$$

where $\lambda_1$ is the slip ratio for said first driving wheels, $\lambda_2$ is the slip ratio for said second driving wheels, $\mu_1$ is the friction coefficient corresponding to the slip ratio for said first driving wheels, $\mu_2$ is the friction coefficient corresponding to the slip ratio for said second driving wheels, $\omega_1$ is the rotational speed of the said first driving wheels, and $\omega_2$ is the rotational speed of the said second driving wheels,
   (a) when said torque control part determines i) to give the same torque instruction values to both said first driving wheels and said second driving wheels, and ii) that the normal reaction force upon said first object wheel and the normal reaction force upon said second object wheel are different, said slip ratio calculation part performs the slip ratio calculating processing for each of said plurality of driving wheels, and (b) when said torque control part determines to give mutually different torque instruction values for said first driving wheels and for said of second driving wheels, said slip ratio calculation part performs the slip ratio calculating processing for each of said plurality of driving wheels without considering that the normal reaction force upon said first object wheel and the normal reaction force upon said second object wheel are different or not different.

7. The slip ratio estimation device according to claim 1, wherein, using the following equations:

$$\lambda_1 = (\omega_2 - \omega_1)/((\mu_2/\mu_1)\cdot\omega_1 - \omega_2)$$

$$\lambda_2 = (\omega_2 - \omega_1)/(\omega_1 - (\mu_1/\mu_2)\cdot\omega_2)$$

where $\lambda_1$ is the slip ratio for said first driving wheels, $\lambda_2$ is the slip ratio for said second driving wheels, $\mu_1$ is the friction coefficient corresponding to the slip ratio for said first driving wheels, $\mu_2$ is the friction coefficient corresponding to the slip ratio for said second driving wheels, $\omega_1$ is the rotational speed of the said first driving wheels, and $\omega_2$ is the rotational speed of the said second driving wheels, (a) when said torque control part determines i) to give the same torque instruction values to both said first driving wheels and said second driving wheels, and ii) that the normal reaction force upon said first object wheel and the normal reaction force upon said second object wheel are different, said slip ratio calculation part performs the slip ratio calculating processing for each of said plurality of driving wheels, and (b) when said torque control part determines to give mutually different torque instruction values for said first driving wheels and for said of second driving wheels, said slip ratio calculation part performs the slip ratio calculating processing for each of said plurality of driving wheels without considering that the normal reaction force upon said first object wheel and the normal reaction force upon said second object wheel are different or not different.

8. A slip ratio estimation method for estimating a slip ratio of each of a plurality of driving wheels possessed by a moving body, comprising the steps of:

a rotational speed acquisition step of acquiring the rotational speed of each of said plurality of driving wheels;

a normal reaction force information acquisition step of acquiring information corresponding to the normal reaction force upon each of said plurality of driving wheels;

a torque control step of determining the torque instruction value for each of said plurality of driving wheels, and controlling a torque amount for each of said plurality of driving wheels on the basis of said torque instruction values that have been determined;

a friction coefficient information calculation step of calculating friction coefficient information related to each of said plurality of driving wheels, on the basis of a torque instruction value for each of said plurality of driving wheels, the results of acquisition by said rotational speed acquisition process, and the results of acquisition by said normal reaction force information acquisition process; and a slip ratio calculation step of calculating the slip ratio of each of said plurality of driving wheels, on the basis of the rotational speeds acquired by said rotational speed acquisition process and the results of calculation by said friction coefficient information calculation process, wherein said slip ratio calculation step includes calculating a slip ratio of a first object wheel and a slip ratio of a second object wheel based on i) a first rotational speed of the first object wheel, ii) a second rotational speed of the second object wheel, iii) a difference between the first rotational speed and the second rotational speed, and iv) a ratio of a friction coefficient of the first object wheel and a friction coefficient of the second object wheel, the first object wheel being included in at least one of first driving wheels among said plurality of driving wheels, the second object wheel included in at least one of second driving wheels among said plurality of driving wheels, said second driving wheels being different from said first driving wheels, and the slip ratio of each of said plurality of driving wheels is calculated in at least one of manners of the following (a) and (b) in said slip ratio calculation step:

(a) when i) the same torque instruction values are determined to be given to both said first driving wheels and said second driving wheels, and ii) the normal reaction force upon said first object wheel and the normal reaction force upon said second object wheel are different, a slip ratio calculating processing is performed by a slip ratio calculating part for each of said plurality of driving wheels, and (b) when mutually different torque instruction values are determined to be given to said first driving wheels and to said of second driving wheels, a slip ratio calculating processing is performed by said slip ratio calculating part for each of said plurality of driving wheels without considering that the normal reaction force upon said first object wheel and the normal reaction force upon said second object wheel are different or not.

9. The slip ratio estimation method according to claim 8, wherein, a) when i) the same torque instruction values are determined to be given to both said first driving wheels and said second driving wheels, and ii) the normal reaction force upon said first object wheel and the normal reaction force upon said second object wheel are different, the slip ratio calculating processing is performed by the slip ratio calculating part for each of said plurality of driving wheels, and (b) when mutually different torque instruction values are determined to be given to said first driving wheels and to said of second driving wheels, the slip ratio calculating processing is performed by said slip ratio calculating part for each of said plurality of driving wheels without considering that the normal reaction force upon said first object wheel and the normal reaction force upon said second object wheel are different or not.

10. The slip ratio estimation method according to claim 8, wherein, using the following equations:

$$\lambda_1 = (\omega_2 - \omega_1)/((\mu_2/\mu_1)\cdot\omega_2 - \omega_1)$$

$$\lambda_2 = (\omega_2 - \omega_1)/(\omega_2 - (\mu_1/\mu_2)\cdot\omega_1)$$

where $\lambda_1$ is the slip ratio for said first driving wheels, $\lambda_2$ is the slip ratio for said second driving wheels, $\mu_1$ is the friction coefficient corresponding to the slip ratio for said first driving wheels, $\mu_2$ is the friction coefficient corresponding to the slip ratio for said second driving wheels, $\omega_1$ is the rotational speed of the said first driving wheels, and $\omega_2$ is the rotational speed of the said second driving wheels, a) when i) the same torque instruction values are determined to be given to both said first driving wheels and said second driving wheels, and ii) the normal reaction force upon said first object wheel and the normal reaction force upon said second object wheel are different, the slip ratio calculating processing is performed by the slip ratio calculating part for each of said plurality of driving wheels, and (b) when mutually different torque instruction values are determined to be given to said first driving wheels and to said of second driving wheels, the slip ratio calculating processing is performed by said slip ratio calculating part for each of said plurality of driving wheels without considering that the normal reaction force upon said first object wheel and the normal reaction force upon said second object wheel are different or not.

11. The slip ratio estimation method according to claim 8, wherein, using the following equations:

$$\lambda_1 = (\omega_2 - \omega_1)/((\mu_2/\mu_1)\cdot\omega_1 - \omega_2)$$

$$\lambda_2 = (\omega_2 - \omega_1)/(\omega_1 - (\mu_1/\mu_2)\cdot\omega_2)$$

where $\lambda_1$ is the slip ratio for said first driving wheels, $\lambda_2$ is the slip ratio for said second driving wheels, $\mu_1$ is the friction coefficient corresponding to the slip ratio for said first driving wheels, $\mu_2$ is the friction coefficient corresponding to the slip ratio for said second driving wheels, $\omega_1$ is the rotational speed of the said first driving wheels, and $\omega_2$ is the rotational speed of the said second driving wheels, a) when i) the same torque instruction values are determined to be given to both said first driving wheels and said second driving wheels, and ii) the normal reaction force upon said first object wheel and the normal reaction force upon said second object wheel are different, the slip ratio calculating processing is performed by the slip ratio calculating part for each of said plurality of driving wheels, and (b) when mutually different torque instruction values are determined to be given to said first driving wheels and to said of second driving wheels, the slip ratio calculating processing is performed by said slip ratio calculating part for each of said plurality of driving wheels without considering that the normal reaction force upon said first object wheel and the normal reaction force upon said second object wheel are different or not.

12. A non-transient computer readable medium having recorded thereon a slip ratio estimation program that, when executed on a computer, causes a calculation part of the computer to execute the slip ratio estimation method estimating a slip ratio of each of a plurality of driving wheels possessed by a moving body, the slip ratio estimation method comprising the steps of:

a rotational speed acquisition step of acquiring the rotational speed of each of said plurality of driving wheels;

a normal reaction force information acquisition step of acquiring information corresponding to the normal reaction force upon each of said plurality of driving wheels;

a torque control step of determining the torque instruction value for each of said plurality of driving wheels, and controlling a torque amount for each of said plurality of driving wheels on the basis of said torque instruction values that have been determined;

a friction coefficient information calculation step of calculating friction coefficient information related to each of said plurality of driving wheels, on the basis of a torque instruction value for each of said plurality of driving wheels, the results of acquisition by said rotational speed acquisition process, and the results of acquisition by said normal reaction force information acquisition process; and a slip ratio calculation step of calculating the slip ratio of each of said plurality of driving wheels, on the basis of the rotational speeds acquired by said rotational speed acquisition process and the results of calculation by said friction coefficient information calculation process, wherein said slip ratio calculation step includes calculating a slip ratio of a first object wheel and a slip ratio of a second object wheel based on i) a first rotational speed of the first object wheel, ii) a second rotational speed of the second object wheel, iii) a difference between the first rotational speed and the second rotational speed, and iv) a ratio of a friction coefficient of the first object wheel and a friction coefficient of the second object wheel, the first object wheel being included in at least one of first driving wheels among said plurality of driving wheels, the second object wheel included in at least one of second driving wheels among said plurality of driving wheels, said second driving wheels being different from said first driving wheels, and the slip ratio of each of said plurality of driving wheels is calculated in at least one of manners of the following (a) and (b) in said slip ratio calculation step:

(a) when i) the same torque instruction values are determined to be given to both said first driving wheels and said second driving wheels, and ii) the normal reaction force upon said first object wheel and the normal reaction force upon said second object wheel are different, a slip ratio calculating processing is performed for each of said plurality of driving wheels, and (b) when mutually different torque instruction values are determined to be given to said first driving wheels and to said of second driving wheels, a slip ratio calculating processing is performed for each of said plurality of driving wheels without considering that the normal reaction force upon said first object wheel and the normal reaction force upon said second object wheel are different or not.

* * * * *